United States Patent
Wan et al.

(10) Patent No.: US 11,119,642 B2
(45) Date of Patent: Sep. 14, 2021

(54) DEVICE, METHOD, AND GRAPHICAL USER INTERFACE FOR ADJUSTING A DISPLAY PROPERTY OF AN AFFORDANCE OVER CHANGING BACKGROUND CONTENT

(71) Applicant: Apple Inc., Cupertino, CA (US)

(72) Inventors: Wan Si Wan, Sunnyvale, CA (US); Chanaka G. Karunamuni, San Jose, CA (US); Marcos Alonso Ruiz, San Francisco, CA (US); Bartosz Ciechanowski, Sunnyvale, CA (US); Benjamin E. Nielsen, Sunnyvale, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 16/877,298

(22) Filed: May 18, 2020

(65) Prior Publication Data

US 2020/0278787 A1 Sep. 3, 2020

Related U.S. Application Data

(63) Continuation of application No. 15/878,276, filed on Jan. 23, 2018, now Pat. No. 10,691,321.

(Continued)

(51) Int. Cl.
*G06F 3/048* (2013.01)
*G06F 3/0484* (2013.01)
(Continued)

(52) U.S. Cl.
CPC .......... *G06F 3/04847* (2013.01); *G06F 3/016* (2013.01); *G06F 3/0482* (2013.01); *G06F 3/04883* (2013.01); *G06F 2203/04803* (2013.01)

(58) Field of Classification Search
CPC .... G06F 3/04847; G06F 3/016; G06F 3/0482; G06F 3/04883; G06F 2203/04803
See application file for complete search history.

(56) References Cited

U.S. PATENT DOCUMENTS

| 4,831,434 A | 5/1989 | Fuchsberger |
| 7,343,566 B1 | 3/2008 | Chaudhri et al. |
| 8,091,038 B1* | 1/2012 | Johnson ................ G06F 3/0481 715/768 |

(Continued)

FOREIGN PATENT DOCUMENTS

| WO | WO 2008/076816 A2 | 6/2008 |
| WO | WO 2014/149474 A1 | 9/2014 |

OTHER PUBLICATIONS

Innovation Patent, dated Apr. 1, 2020, received in Australian Patent Application No. 2020100060, which corresponds with U.S. Appl. No. 15/878,276, 4 page.

(Continued)

*Primary Examiner* — Hugo Molina
(74) *Attorney, Agent, or Firm* — Morgan, Lewis & Bockius LLP

(57) ABSTRACT

A value of a display property of an affordance changes based a value of the same display property of a portion of content over which the affordance is displayed. The value of the display property of the affordance is constrained to vary within a second value range smaller than a first value range over which the value of the display property of the content is permitted to vary. If the change in appearance of the content meets range-switching criteria, the value of the display property of the affordance is changed within a third value range. The third value range is different from the second value range and is smaller than the first value range. If the change in appearance of the content does not meet the range-switching criteria, the value of the display property of the affordance is changed within the second value range.

33 Claims, 46 Drawing Sheets
(25 of 46 Drawing Sheet(s) Filed in Color)

Related U.S. Application Data

(60) Provisional application No. 62/556,402, filed on Sep. 9, 2017.

(51) Int. Cl.
*G06F 3/0482* (2013.01)
*G06F 3/0488* (2013.01)
*G06F 3/01* (2006.01)

(56) References Cited

U.S. PATENT DOCUMENTS

| | | | |
|---|---|---|---|
| 9,355,472 | B2 | 5/2016 | Kocienda et al. |
| 2004/0207589 | A1 | 10/2004 | Kim et al. |
| 2006/0082677 | A1 | 4/2006 | Donomae et al. |
| 2010/0088639 | A1 | 4/2010 | Yach et al. |
| 2011/0084913 | A1 | 4/2011 | Wirtanen |
| 2011/0209093 | A1 | 8/2011 | Hinckley et al. |
| 2011/0296344 | A1 | 12/2011 | Habib et al. |
| 2012/0127198 | A1 | 5/2012 | Gundavarapu |
| 2012/0162366 | A1 | 6/2012 | Ninan et al. |
| 2013/0198666 | A1* | 8/2013 | Matas .............. G06F 3/04842 715/766 |
| 2013/0215138 | A1 | 8/2013 | Suzuki |
| 2014/0362105 | A1 | 12/2014 | Kocienda et al. |
| 2015/0194105 | A1 | 7/2015 | Han et al. |
| 2015/0205488 | A1 | 7/2015 | Yi et al. |
| 2015/0205505 | A1* | 7/2015 | Conn .................. G06F 1/1626 715/765 |
| 2015/0215565 | A1 | 7/2015 | Kondo et al. |
| 2015/0220218 | A1 | 8/2015 | Jeon et al. |
| 2015/0247807 | A1 | 9/2015 | Wakita et al. |
| 2016/0246475 | A1* | 8/2016 | Garcia .................... G09G 5/02 |
| 2016/0306533 | A1 | 10/2016 | Agarwal et al. |
| 2017/0031583 | A1* | 2/2017 | Levieux ............... G06F 3/0482 |
| 2017/0094242 | A1 | 3/2017 | Yamaguchi et al. |
| 2017/0148191 | A1 | 5/2017 | Huang |
| 2017/0277258 | A1 | 9/2017 | Ma et al. |
| 2017/0311403 | A1 | 10/2017 | Tatavoosian et al. |
| 2019/0079662 | A1 | 3/2019 | Wan et al. |

OTHER PUBLICATIONS

Office Action, dated May 9, 2020, received in Chinese Patent Application No. 201910756761.2, which corresponds with U.S. Appl. No. 15/878,276, 9 pages.

Office Action, dated May 19, 2020, received in European Patent Application No. 18703462.4, which corresponds with U.S. Appl. No. 15/878,276, 12 pages.

Innovation Patent, dated Jun. 3, 2020, received in Australian Patent Application No. 2020100722, which corresponds with U.S. Appl. No. 15/878,276, 5 pages.

Office Action, dated May 31, 2018, received in U.S. Appl. No. 15/878,276, 27 pages.

Final Office Action, dated Oct. 18, 2018, received in U.S. Appl. No. 15/878,276, 24 pages.

Office Action, dated Mar. 21, 2019, received in U.S. Appl. No. 15/878,276, 27 pages.

Final Office Action, dated Sep. 18, 2019, received in U.S. Appl. No. 15/878,276, 28 pages.

Notice of Allowance, dated Dec. 4, 2019, received in U.S. Appl. No. 15/878,276, 7 pages.

Notice of Allowance, dated Feb. 12, 2020, received in U.S. Appl. No. 15/878,276, 7 pages.

Innovation Patent, dated Jan. 29, 2020, received in Australian Patent Application. No. 2020100060, which corresponds with U.S. Appl. No. 15/878,276, 1 page.

Office Action, dated Feb. 13, 2018, received in Danish Patent Application No. 201770711, which corresponds with U.S. Appl. No. 15/878,276, 5 pages.

Office Action, dated Feb. 5, 2019, received in Danish Patent Application No. 201770711, which corresponds with U.S. Appl. No. 15/878,276, 6 pages.

Intention to Grant, dated Jul. 4, 2019, received in Danish Patent Application No. 201770711, which corresponds with U.S. Appl. No. 15/878,276, 2 pages.

Notice of Allowance, dated Aug. 21, 2019, received in Danish Patent Application. No. 201770711, which corresponds with U.S. Appl. No. 15/878,276, 2 pages.

Patent, dated Oct. 11, 2019, received in Danish Patent Application No. 201770711, which corresponds with U.S. Appl. No. 15/878,276, 5 pages.

International Search Report and Written Opinion, dated Apr. 6, 2018, received in International Patent Application No. PCT/US2018/015195, which corresponds with U.S. Appl. No. 15/878,276, 11 pages.

Office Action, dated Apr. 13, 2021, received in Korean Patent Application No. 2020-7002910, which corresponds with U.S. Appl. No. 15/878,276, 2 pages.

* cited by examiner

Multiple Filters Used to Generate the Affordance Appearance Based on Underlying Content

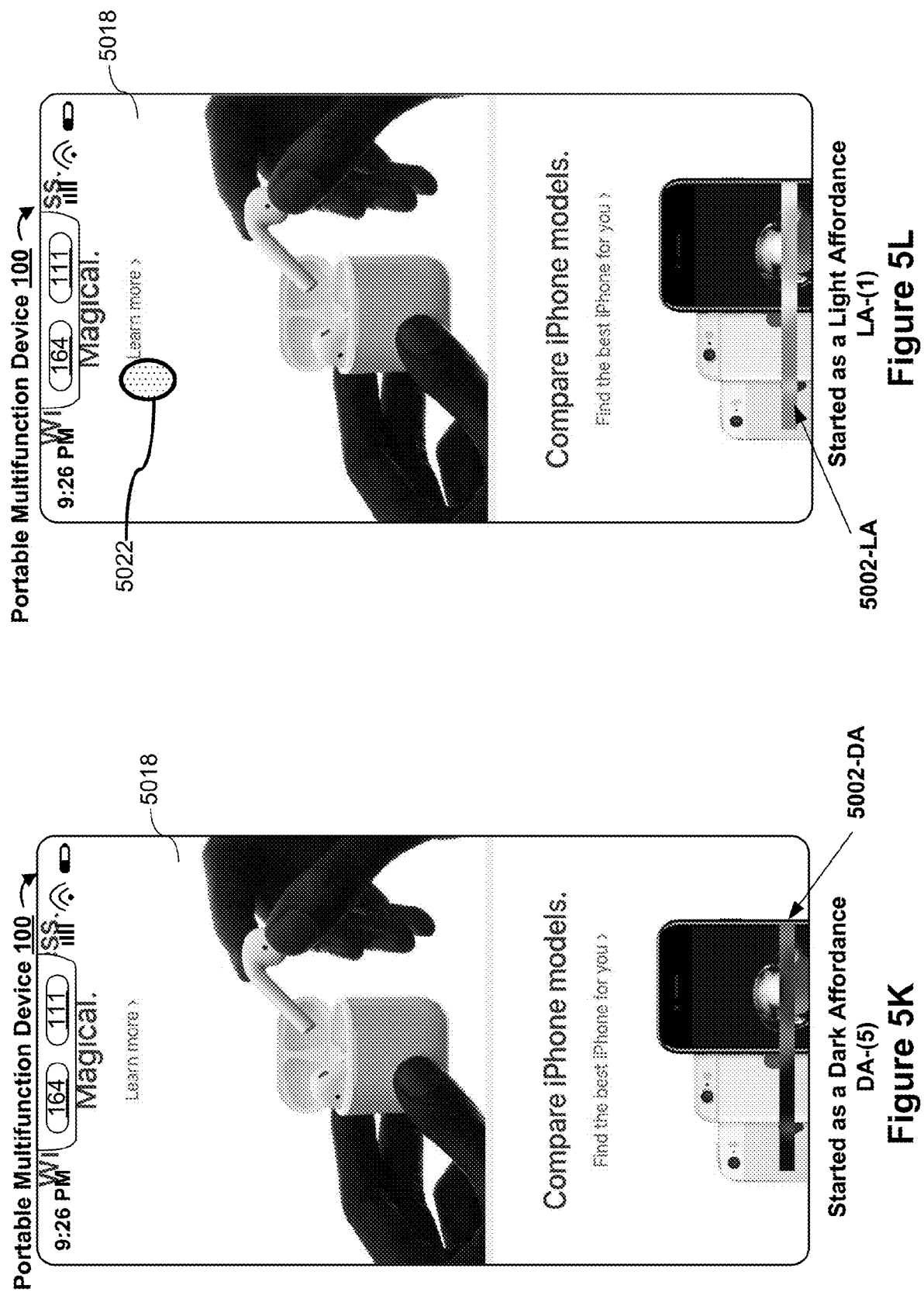

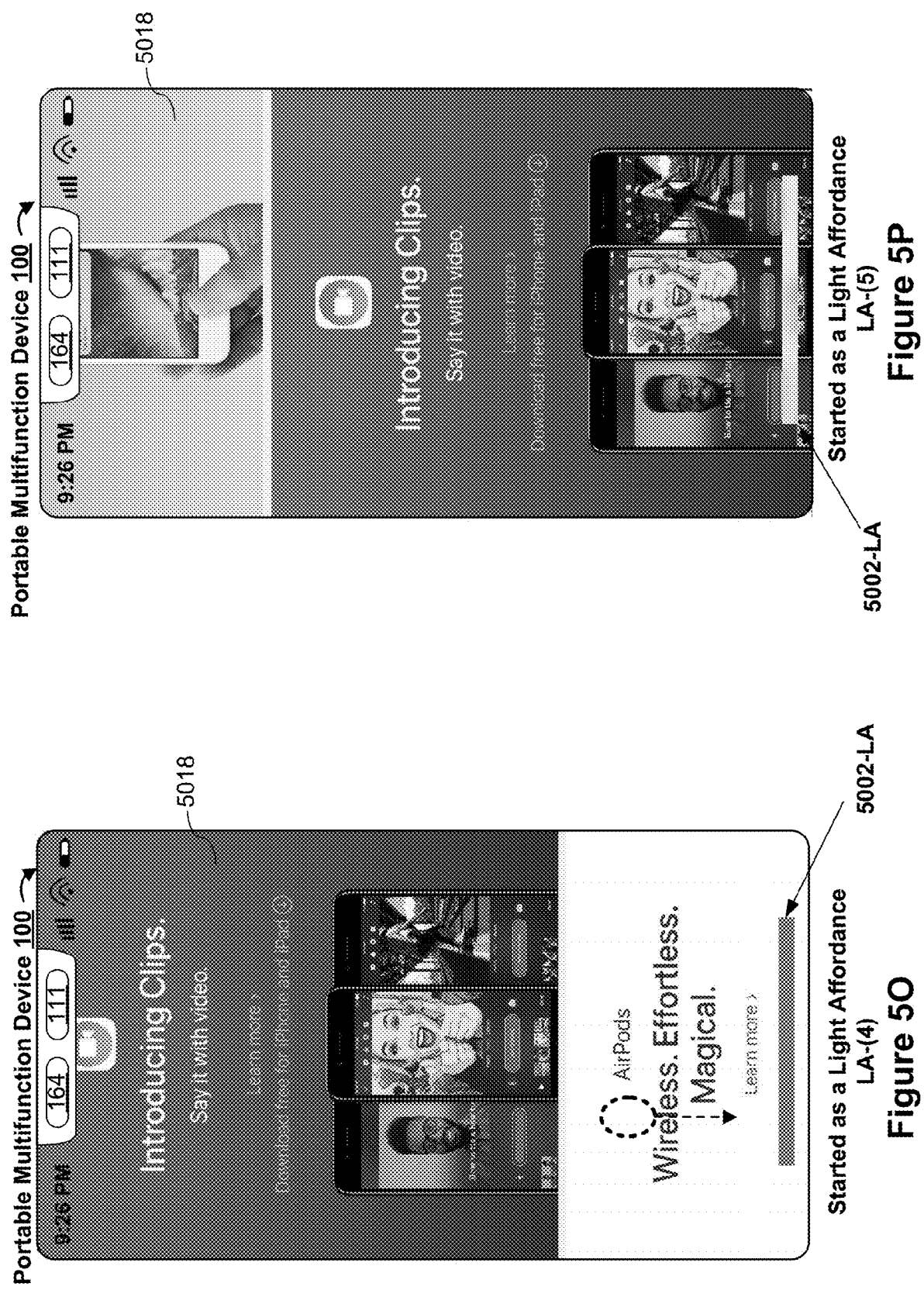

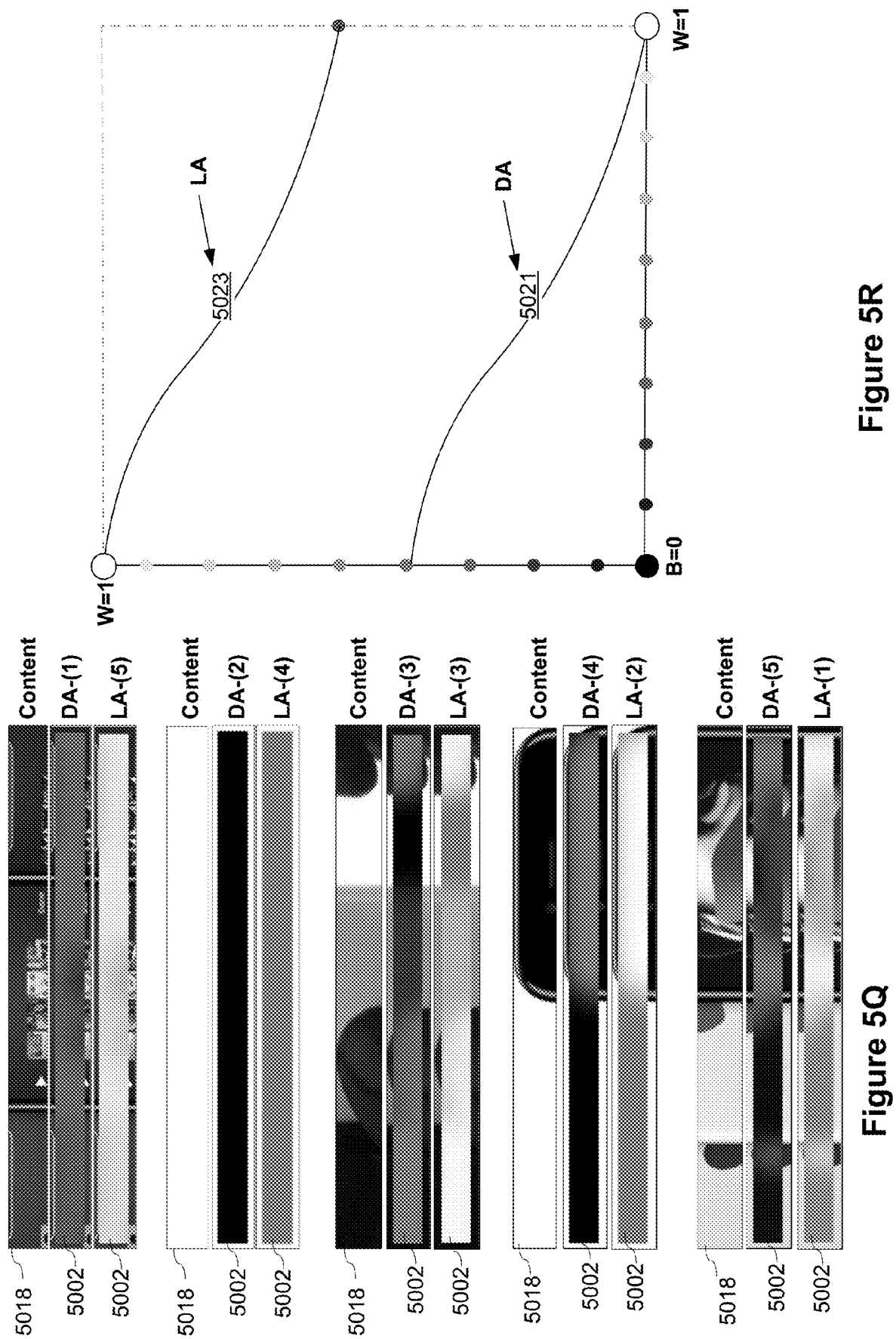

6000

6002 Display, on the display, content and an affordance, wherein:
 the affordance is displayed over a portion of the content;
  a value of a display property of the affordance is determined based a value of the same display property of the portion of the content over which the affordance is displayed; and
  the value of the display property of the content is permitted to vary within a first range of values, and the value of the display property of the affordance is constrained to vary within a second range of values that is smaller than the first range of values

6004 While displaying the content and the affordance, detect a change in appearance of the content over which the affordance is displayed

6006 In response to detecting the change in appearance of the content over which the affordance is displayed, changing the appearance of the affordance, including:
  in accordance with a determination that the value of the display property of the content has decreased, increase the value of the display property of the affordance in accordance with a magnitude of a change in the value of the display property of the content and the second range of values; and
  in accordance with a determination that the value of the display property of the content has increased, decrease the value of the display property of the affordance in accordance with a magnitude of the change in the value of the display property of the content and the second range of values 6008 The change in appearance of the content is due to content navigation

6010 The change in appearance of the content is due to the content changing over time 6012 The affordance has a first variant with a first sets of end values for the second range of values, and a second variant with a second sets of end values for the second range of values, the second sets of end values being different from the first set of end values 6014 The first variant of the affordance is displayed in accordance with a determination that the content corresponds to a first application and the second variant of the affordance is displayed in accordance with a determination that the content corresponds to a second application that is distinct from the first application 6016 The appearance of a first portion the content over which the affordance is displayed changes by a different amount than the appearance of a second portion of the content over which the affordance is displayed; and Changing the appearance of the affordance includes changing an appearance of a first portion of the affordance that corresponds to the first portion of the content by a different amount than the appearance of a second portion of the affordance that corresponds to the second portion of the content changes 6018 The first range of values is a continuous range of values and the second range of values includes a discontinuity that corresponds to at least a first value of the display property in the first range of values (B)

6020 The affordance has a first variant and a second variant,
the second range of values corresponding to the first variant of the affordance and the second range of values corresponding to the second variant of the affordance do not overlap, and
the device dynamically selects one of the first variant and the second variant to display over the content based on an initial value of the display property of the content at a predetermined time 6022 Displaying the affordance includes displaying the affordance with a first size while the device is in a first orientation, and the method includes:
while displaying the affordance with the first size, detecting rotation of the device from the first orientation to a second orientation that is different from the first orientation; and
in response to detecting the rotation of the device from the first orientation to the second orientation, displaying the affordance with a second size that is different from the first size 6024 The display property is gray value 6026 A current value of the display property of the content is obtained by blurring the portion of the content 6028 A current value of the display property of the content is obtained by desaturating the portion of the content 6030 The affordance indicates a reactive region for starting a predefined gesture input

7002 Display a user interface of an application

↓

7004 While displaying the user interface of the application in the first mode, display an affordance with a first appearance over the user interface, wherein:
    the affordance is displayed over a portion of the user interface, and
    values of a set of one or more display properties of the affordance with the first appearance change in accordance with a change in values of a set of one or more display properties of the portion of the user interface that underlies the affordance, in accordance with a first set of one or more rules

↓

7006 While displaying the affordance with the first appearance over the portion of the user interface displayed in the first mode, detect a request to transition from displaying the user interface in the first mode to displaying the user interface in a second mode

↓

7008 In response to detecting the request:
    display the user interface in the second mode; and
    display the affordance with a second appearance over the user interface displayed in the second mode, wherein:
        the values of the set of one or more display properties of the affordance with the second appearance change in accordance with a change in the values of the set of one or more display properties of the portion of the user interface that underlies the affordance, in accordance with a second set of one or more rules that are different from the first set of one or more rules (A)

7010 While displaying the affordance with the second appearance over the user interface displayed in the second mode:

in accordance with a determination that fade-out criteria are met, cease to display the affordance over the user interface displayed in the second mode; and in accordance with a determination that the fade-out criteria are not met, maintain display of the affordance with the second appearance over the user interface displayed in the second mode 7012 The user interface of the application displayed in the first mode includes a representation of content that occupies less than all of a display region of the display; and The user interface of the application displayed in the second mode includes a representation of the content that occupies all of the display region of the display 7014 At least one of the first appearance and the second appearance of the affordance is based on an inversion of the portion of the user interface that underlies the affordance 7016 The first set of rules require applying a first amount of inversion to the portion of the user interface that underlies the affordance to obtain the first appearance of the affordance, the second set of rules require applying a second amount of inversion to the portion of the user interface that underlies the affordance to obtain the second appearance of the affordance, and the second amount of inversion is smaller than the first amount of inversion (B)

7018 At least one of the first appearance and the second appearance of the affordance is obtained by blurring the portion of the user interface that underlies the affordance 7020 The first set of rules require applying a first amount of blur to the portion of the user interface that underlies the affordance to obtain the first appearance of the affordance,
    the second set of rules require applying a second amount of blur to the portion of the user interface that underlies the affordance to obtain the second appearance of the affordance, and
    the second amount of blur is smaller than the first amount of blur 7022 At least one of the first appearance and the second appearance of the affordance is obtained by desaturating the portion of the user interface that underlies the affordance 7024 The first set of rules require applying a first amount of desaturation to the portion of the user interface that underlies the affordance to obtain the first appearance of the affordance,
    the second set of rules require applying a second amount of desaturation to the portion of the user interface that underlies the affordance to obtain the second appearance of the affordance, and
    the second amount of desaturation is smaller than the first amount of desaturation (C)

7026 While displaying the user interface in the second mode without displaying the affordance, detect an input that meets first affordance-redisplay criteria, wherein the first affordance-redisplay criteria are met when the input is detected on the touch-sensitive surface; and
    In response to detecting the input that meets the affordance-redisplay criteria, redisplay the affordance over the user interface displayed in the second mode 7028 While displaying the user interface in the second mode without displaying the affordance, detect an input that meets second affordance-redisplay criteria, wherein the second affordance redisplay criteria is met when the input is a request to transition from displaying the user interface in the second mode to displaying the user interface in the first mode; and
    In response to detecting the input that meets the second affordance-redisplay criteria,
        redisplay the user interface in the first mode; and
        redisplay the affordance over the user interface redisplayed in the first mode 7030 At least one of the first appearance and the second appearance of the affordance is dynamically adjusted in accordance with changes that occur in the portion of the user interface that underlies the affordance (D)

7032 The first appearance is generated based on a first set of filters applied to the portion of the user interface that underlies the affordance,
 the second appearance is generated based on a second set of filters applied the portion of the user interface that underlies the affordance, and
 for two or more filters in the second set of filters, the first set of filters includes a corresponding filter of the same type and with different adjustment parameters 7034 In response to detecting the request:
 generate one or more intermediate appearances for the affordance between the first appearance and the second appearance; and
 display the one or more intermediate appearances of the affordance as a transition between displaying the affordance with the first appearance and displaying the affordance with the second appearance 7036 Generating the one or more intermediate appearances for the affordance between the first appearance and the second appearance includes gradually transitioning from the first set of rules to the second set of rules 7038 The affordance with the first appearance has a first degree of opacity and the affordance with the second appearance has second degree of opacity that is less than the first degree of opacity 7040 The affordance with the first appearance and the affordance with the second appearance have a same size and position on the display 7042 The first set of one or more rules create a greater visual distinction between the affordance and the user interface of the application than the visual distinction between the affordance and the user interface of the application created by the second set of one or more rules

8002 Display, on the display, content and an affordance, wherein:
  the affordance is displayed over a portion of the content;
  a value of a display property of the affordance is determined based a value of the same display property of the portion of the content over which the affordance is displayed; and
  the value of the display property of the content is permitted to vary within a first range of values, and the value of the display property of the affordance is constrained to vary within an affordance-appearance range of values that is smaller than the first range of values 8004 While displaying the content and the affordance and while the affordance-appearance-range of values is a second range of values, detect a change in appearance of the content over which the affordance is displayed 6006 In response to detecting the change in appearance of the content over which the affordance is displayed, change the appearance of the affordance, including:
  in accordance with a determination that the change in appearance of the content has met range-switching criteria:
    shifting the affordance-appearance range of values to a third range of values, wherein the third range of values is different from the second range of values, and the third range of values is smaller than the first range of values; and
    changing the value of the display property of the affordance in accordance with the value of the same display property of the content over which the affordance is displayed, wherein the display property of the affordance is constrained to vary within the affordance-appearance range of values; and
  in accordance with a determination that the change in appearance of the content has not met the range-switching criteria, changing the value of the display property of the affordance in accordance with the value of the same display property of the content over which the affordance is displayed, while maintaining the affordance-appearance range of values as the second range of values.

8008 The range-switching criteria include range-switching-trigger criteria and range-switching-completion criteria,
    the range-switching-trigger criteria require that the change in appearance of the content includes a first amount of change over a first period of time that causes a predefined measure of content appearance to cross a predefined threshold value, and
    the range-switching-completion criteria require that the change in appearance of the content does not include a second amount of change over a second period of time after the first period of time to meet the range-switching-trigger criteria again before a predefined transition period expires after the range-switching-trigger criteria are met 8010 The predefined threshold value used for the range-switching-trigger criteria is selected based on a current range of values that is being used as the affordance-appearance range of values, including:
    using a first threshold value as the predefined threshold value when the affordance- appearance range of values is the second range of values; and
    using a second threshold value as the predefined threshold value when the affordance- appearance range of values is the third range of values (B)

8012 Changing the appearance of the affordance in response to detecting the change in appearance of the content over which the affordance is displayed includes:
    in accordance with a determination that the range-switching-trigger criteria are met by the first amount of change during the first period of time and before the range-switching-completion criteria are met:
        shifting the affordance-appearance range of values to an intermediate range of values that is different from the second range of values and the third range of values; and
        changing the value of the display property of the affordance in accordance with the value of the same display property of the content over which the affordance is displayed, wherein the display property of the affordance is constrained to vary within the affordance-appearance range of values 8014 Change in appearance of the content includes a third amount of change over a third period of time that is after the first period of time, after the range-switching-trigger criteria are met, and before the range-switching-completion criteria are met 8016 The change in appearance of the content over which the affordance is displayed is caused by scrolling of the content, and the range-switching criteria do not require absence of scrolling of the content in order for the range-switching criteria to be met 8018 The change in appearance of the content over which the affordance is displayed is caused by movement of the content under the affordance, and the range-switching criteria require that the content under the affordance moves by less than a predefined amount for at least a predetermined amount of time in order for the range-switching criteria to be met (C)

8020 Changing the value of the display property of the affordance in accordance with the value of the same display property of the content includes:

in accordance with a determination that the value of the display property of the content has decreased, increasing the value of the display property of the affordance in accordance with a magnitude of a change in the value of the display property of the content; and in accordance with a determination that the value of the display property of the content has increased, decreasing the value of the display property of the affordance in accordance with a magnitude of the change in the value of the display property of the content 8022 A given magnitude of change in the value of the display property of the content causes the same amount of change in the value of the display property of the affordance when the value of the display property of the affordance is varied within the second range of values and when the value of the display property of the affordance is varied within the third range of values

8022 Shifting the affordance-appearance range of values from the second range of values to the third range of values includes gradually shifting from the second range of values to the third range of values over a period of time; and the method includes, while gradually shifting the affordance-appearance range of values from the second range of values to the third range of values:

detecting an additional change in appearance of the content over which the affordance is displayed; and in response to detecting the additional change in appearance of the content over which the affordance is displayed, changing the appearance of the affordance in accordance with the affordance-appearance range of values, including:

in accordance with a determination that the change in appearance of the content meets the range-switching criteria, starting to gradually shift the affordance-appearance range of values back to the second range of values; and in accordance with a determination that the change in appearance of the content does not meet the range-switching criteria, continuing to gradually shift the affordance-appearance range of values from the second range of values to the third range of values (E)

8024 After changing the value of the display property of the affordance within the third range of values in accordance with a determination that the change in appearance of the content has met the range-switching criteria, detect an additional change in appearance of the content over which the affordance is displayed; and In response to detecting the additional change in appearance of the content over which the affordance is displayed, change the appearance of the affordance, including:

in accordance with a determination that the additional change in appearance of the content has met the range-switching-trigger criteria for a first time and has not met the range-switching-completion criteria, changing the value of the display property of the affordance in accordance with the value of the same display property of the content over which the affordance is displayed, wherein the display property of the affordance is constrained to vary within a first intermediate range of values between the second range of values and the third range of values;

in accordance with a determination that the additional change in appearance of the content has met the range-switching-trigger criteria for a second time after the first time without having met the range-switching-completion-criteria, changing the value of the display property of the affordance in accordance with the value of the same display property of the content over which the affordance is displayed, wherein the display property of the affordance is constrained to vary within a second intermediate range of values between the third range of values and the first range of intermediate values; and in accordance with a determination that the additional change in appearance of the content has met the range-switching-trigger criteria only once before meeting the range-switching-completion-criteria, changing the value of the display property of the affordance in accordance with the value of the same display property of the content over which the affordance is displayed, wherein the display property of the affordance is constrained to vary within the second range of values

Figure 8F ional Application No. 62/556,402, filed Sep. 9, 2017, which applications are herein incorporated by reference in their entirety.

DEVICE, METHOD, AND GRAPHICAL USER INTERFACE FOR ADJUSTING A DISPLAY PROPERTY OF AN AFFORDANCE OVER CHANGING BACKGROUND CONTENT

RELATED APPLICATIONS

This application is a continuation of U.S. patent application Ser. No. 15/878,276, filed Jan. 23, 2018, which claims benefit and priority to U.S. Provisional Application No. 62/556,402, filed Sep. 9, 2017, which applications are herein incorporated by reference in their entirety.

TECHNICAL FIELD

This relates generally to electronic devices with displays and touch-sensitive surfaces, including but not limited to electronic devices that display virtual affordances (e.g., controls, indicators, and visual guides, etc.) on their touch-sensitive display screens.

BACKGROUND

The use of touch-sensitive surfaces as input devices for computers and other electronic computing devices has increased significantly in recent years. Example touch-sensitive surfaces include touchpads and touch-screen displays. Such surfaces are widely used to manipulate user interfaces and objects therein on a display. Example user interface objects include digital images, video, text, icons, and control elements such as buttons and other graphics.

Electronic computing devices often display virtual controls or visual guides on their displays. For example, keyboards, menus, dialog boxes, alerts, and other controls be activated and manipulated (e.g., by touch inputs) that cause operations to be performed on a portable electronic device (e.g., a smart phone, tablet, or notebook computer). Indicators and visual guides may be overlaid on a background (e.g., a user interface of an application or a user interface of the operating system) that provide visual cues regarding the types of inputs that may be provided and/or the types of operations that may be performed in association with particular regions of the background or screen.

Existing methods for displaying controls, indicators, and visual guides may be cumbersome and inefficient. For example, the controls, indicators, and visual guides may create unnecessary distractions to the user when the user manipulates the user interfaces, or are not sufficiently clear or salient against a background, causing user mistakes and user confusion when the user interacts with the devices, which, additionally, negatively affects the energy consumption of the devices. This latter consideration is particularly important in battery-operated devices.

Furthermore, certain types of affordances that are displayed over a wide variety of background and content and sometimes over extended time without movement. Consequently, the displays can exhibit ghost-images (or burn-ins) of the affordances after having been in use for some time. Reduction and elimination of display burn-ins is a long-standing challenge facing the display device manufacturers. Some existing ways of addressing the issue, such as introducing screen savers or shimmering icons, are less than satisfactory solutions, due to their side effects (e.g., causing eye strain, distraction, etc.) and lack of efficacy in many scenarios (e.g., usable only when device is idle).

SUMMARY

Accordingly, there is a need for electronic devices with salient yet less distracting affordances (e.g., virtual controls, indicators, and visual guides) that help to provide sufficient visual distinctness to guide the user in providing the required inputs to achieve desired outcomes, without unnecessarily distracting the user from content displayed on the application or system user interfaces. In addition, for certain affordances that are displayed over extended time without movement, there is a need for displaying the affordances in a manner that reduce or eliminate screen burn-ins.

In addition, with background content constantly changing over time, either on its own accord or in response to user inputs, the appearance of the affordance also needs to be dynamically adaptive in order to continue to remain efficient and effective for the above purposes. In particular, affordances that serve as controls or visual guides for gestures that trigger some frequently used system functions are displayed in many different contexts (e.g., over user interfaces of different applications and the operating system). Sometimes, the background of the affordances in a given context (e.g., scrollable content, rapidly changing content, or unpredictable content) also change dynamically, further requiring that the appearances of the affordances be continually adaptive to the changes in the appearances of the background after the affordances have been initially displayed over the background. An example of such an affordance is a system-level affordance for indicating a starting region for a home/multitasking gesture that causes dismissal of a currently displayed application user interface and display of a home screen user interface, or dismissal of a coversheet-like system information interface (e.g., a notification center or a lock screen user interface) and display of a previously displayed user interface (e.g., an application user interface or home screen).

In addition, sometimes, after an affordance is displayed over an application user interface, a change in operating context occurs in the application, which, may qualitatively change the likelihood that the user would interact with the affordance or need the visual guidance of the affordance. In such cases, the balance between keeping the affordance salient versus making the affordance less distracting needs to be adjusted, to maintain the effectiveness and efficiency of the user interface.

In addition, for certain affordances that are displayed over extended time without movement, there is a need for displaying the affordances in a manner that reduce or eliminate screen burn-ins.

The above needs require new methods and interfaces for displaying affordances and adjusting the appearance of affordances (e.g., virtual controls, indicators, and visual guides) over a background. Such devices, methods and interfaces reduce the cognitive burden on a user and produce a more efficient human-machine interface. In addition, such devices, methods, and interfaces reduce or eliminate screen burn-ins, thereby reduces device repair costs and extends device lifetime.

In some embodiments, the device is a desktop computer. In some embodiments, the device is portable (e.g., a notebook computer, tablet computer, or handheld device). In some embodiments, the device is a personal electronic device (e.g., a wearable electronic device, such as a watch). In some embodiments, the device has a touchpad. In some embodiments, the device has a touch-sensitive display (also known as a "touch screen" or "touch-screen display"). In some embodiments, the device has a graphical user interface (GUI), one or more processors, memory and one or more modules, programs or sets of instructions stored in the memory for performing multiple functions. In some embodiments, the user interacts with the GUI primarily through stylus and/or finger contacts and gestures on the touch-sensitive surface. In some embodiments, the functions optionally include image editing, drawing, presenting, word processing, spreadsheet making, game playing, telephoning, video conferencing, e-mailing, instant messaging, workout support, digital photographing, digital videoing, web browsing, digital music playing, note taking, digital video playing, and system level operations, such as displaying a home screen, locking a device, displaying a system-level notification screen, displaying a system-level control panel user interface, etc. Executable instructions for performing these functions are, optionally, included in a non-transitory computer readable storage medium or other computer program product configured for execution by one or more processors.

In accordance with some embodiments, a method includes: at a device having a display and a touch-sensitive surface: displaying, on the display, content and an affordance, wherein: the affordance is displayed over a portion of the content; a value of a display property of the affordance is determined based a value of the same display property of the portion of the content over which the affordance is displayed; and the value of the display property of the content is permitted to vary within a first range of values, and the value of the display property of the affordance is constrained to vary within a second range of values that is smaller than the first range of values; while displaying the content and the affordance, detecting a change in appearance of the content over which the affordance is displayed; and in response to detecting the change in appearance of the content over which the affordance is displayed, changing the appearance of the affordance, including: in accordance with a determination that the value of the display property of the content has decreased, increasing the value of the display property of the affordance in accordance with a magnitude of a change in the value of the display property of the content and the second range of values; and in accordance with a determination that the value of the display property of the content has increased, decreasing the value of the display property of the affordance in accordance with a magnitude of the change in the value of the display property of the content and the second range of values.

In accordance with some embodiments, a method includes: at a device having a display and a touch-sensitive surface: displaying a user interface of an application; while displaying the user interface of the application in the first mode, displaying an affordance with a first appearance over the user interface, wherein: the affordance is displayed over a portion of the user interface, and values of a set of one or more display properties of the affordance with the first appearance change in accordance with a change in values of a set of one or more display properties of the portion of the user interface that underlies the affordance, in accordance with a first set of one or more rules; while displaying the affordance with the first appearance over the portion of the user interface displayed in the first mode, detecting a request to transition from displaying the user interface in the first mode to displaying the user interface in a second mode; and in response to detecting the request: displaying the user interface in the second mode; and displaying the affordance with a second appearance over the user interface displayed in the second mode, wherein: the values of the set of one or more display properties of the affordance with the second appearance change in accordance with a change in the values of the set of one or more display properties of the portion of the user interface that underlies the affordance, in accordance with a second set of one or more rules that are different from the first set of one or more rules.

In accordance with some embodiments, a method includes: at a device having a display and a touch-sensitive surface: displaying, on the display, content and an affordance, wherein: the affordance is displayed over a portion of the content; a value of a display property of the affordance is determined based a value of the same display property of the portion of the content over which the affordance is displayed; and the value of the display property of the content is permitted to vary within a first range of values, and the value of the display property of the affordance is constrained to vary within an affordance-appearance range of values that is smaller than the first range of values; while displaying the content and the affordance and while the affordance-appearance-range of values is a second range of values, detecting a change in appearance of the content over which the affordance is displayed; and in response to detecting the change in appearance of the content over which the affordance is displayed, changing the appearance of the affordance, including: in accordance with a determination that the change in appearance of the content has met range-switching criteria: shifting the affordance-appearance range of values to a third range of values, wherein the third range of values is different from the second range of values, and the third range of values is smaller than the first range of values; and changing the value of the display property of the affordance in accordance with the value of the same display property of the content over which the affordance is displayed, wherein the display property of the affordance is constrained to vary within the affordance-appearance range of values; and in accordance with a determination that the change in appearance of the content has not met the range-switching criteria, changing the value of the display property of the affordance in accordance with the value of the same display property of the content over which the affordance is displayed, while maintaining the affordance-appearance range of values as the second range of values.

In accordance with some embodiments, an electronic device includes a display, a touch-sensitive surface, optionally one or more sensors to detect intensities of contacts with the touch-sensitive surface, optionally one or more tactile output generators, one or more processors, and memory storing one or more programs; the one or more programs are configured to be executed by the one or more processors and the one or more programs include instructions for performing or causing performance of the operations of any of the methods described herein. In accordance with some embodiments, a non-transitory computer readable storage medium has stored therein instructions, which, when executed by an electronic device with a display, a touch-sensitive surface, optionally one or more sensors to detect intensities of contacts with the touch-sensitive surface, and optionally one or more tactile output generators, cause the device to perform or cause performance of the operations of any of the methods described herein. In accordance with some embodiments, a graphical user interface on an electronic device with a display, a touch-sensitive surface, optionally one or more sensors to detect intensities of contacts with the touch-sensitive surface, optionally one or more tactile output generators, a memory, and one or more processors to execute one or more programs stored in the memory includes one or more of the elements displayed in any of the methods described herein, which are updated in response to inputs, as described in any of the methods described herein. In accordance with some embodiments, an electronic device includes: a display, a touch-sensitive surface, optionally one or more sensors to detect intensities of contacts with the touch-sensitive surface, and optionally one or more tactile output generators; and means for performing or causing performance of the operations of any of the methods described herein. In accordance with some embodiments, an information processing apparatus, for use in an electronic device with a display, a touch-sensitive surface, optionally one or more sensors to detect intensities of contacts with the touch-sensitive surface, and optionally one or more tactile output generators, includes means for performing or causing performance of the operations of any of the methods described herein.

Thus, electronic devices with displays, touch-sensitive surfaces, optionally one or more sensors to detect intensities of contacts with the touch-sensitive surface, optionally one or more tactile output generators, optionally one or more device orientation sensors, and optionally an audio system, are provided with improved methods and interfaces for navigating between user interfaces and interacting with control objects thereby increasing the effectiveness, efficiency, and user satisfaction with such devices. Such methods and interfaces may complement or replace conventional methods for displaying affordances over a background.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

For a better understanding of the various described embodiments, reference should be made to the Description of Embodiments below, in conjunction with the following drawings in which like reference numerals refer to corresponding parts throughout the figures.

FIGS. 5G-5K illustrate changes in the appearance of an affordance of a first affordance appearance type (e.g., a "dark" affordance type), in accordance with some embodiments.

FIGS. 5L-5P illustrate changes in the appearance of an affordance of a second affordance appearance type (e.g., a "light" affordance type), in accordance with some embodiments.

FIG. 5Q illustrates the differences in the appearance of the affordance for the two types of affordance appearance types, given the same changes in the background, in accordance with some embodiments.

FIG. 5R illustrates the value ranges and inversion relationships of a display property of the affordance and the underlying content for a dark affordance appearance type and a light affordance appearance type, in accordance with some embodiments.

FIGS. 5S-5AA illustrate user interfaces that include an affordance with an appearance that is responsive to the changes in the appearance of the background and a change in an operating mode associated with the background, in accordance with some embodiments.

FIGS. 5AB-5AC illustrate the differences in the appearance of the affordance for background under different operating modes, in accordance with some embodiments.

FIG. 5AD illustrates user interfaces that include an affordance that dynamically switches between affordance appearance types based on changes in the underlying content over time, in accordance with some embodiments.

FIG. 5AE illustrates the value ranges and inversion relationships of a display property of the affordance and the underlying content for a light affordance appearance type, a dark affordance appearance type, and a transitional affordance appearance type, in accordance with some embodiments.

FIG. 5AF illustrates a gradual shift through multiple transitional affordance appearance types from the dark affordance appearance type to the light affordance appearance type, in accordance with some embodiments.

FIGS. 5AG-5AK are enlarged duplicates of the inversion relationships of the display property of the affordance and the underlying content for the different affordance types shown in FIG. 5AF.

FIGS. 6A-6C are flow diagrams illustrating a method of changing an appearance of an affordance in accordance with a change in an appearance of the underlying content, in accordance with some embodiments.

FIGS. 7A-7E are flow diagrams illustrating a method of changing an appearance of an affordance in accordance with a change in an appearance of the underlying content and a change in a mode of a user interface over which the affordance is displayed, in accordance with some embodiments.

FIGS. 8A-8F are flow diagrams illustrating a method of changing an appearance and an affordance appearance type of an affordance in accordance with changes in an appearance of the underlying content, in accordance with some embodiments.

DESCRIPTION OF EMBODIMENTS

Figure 1A:
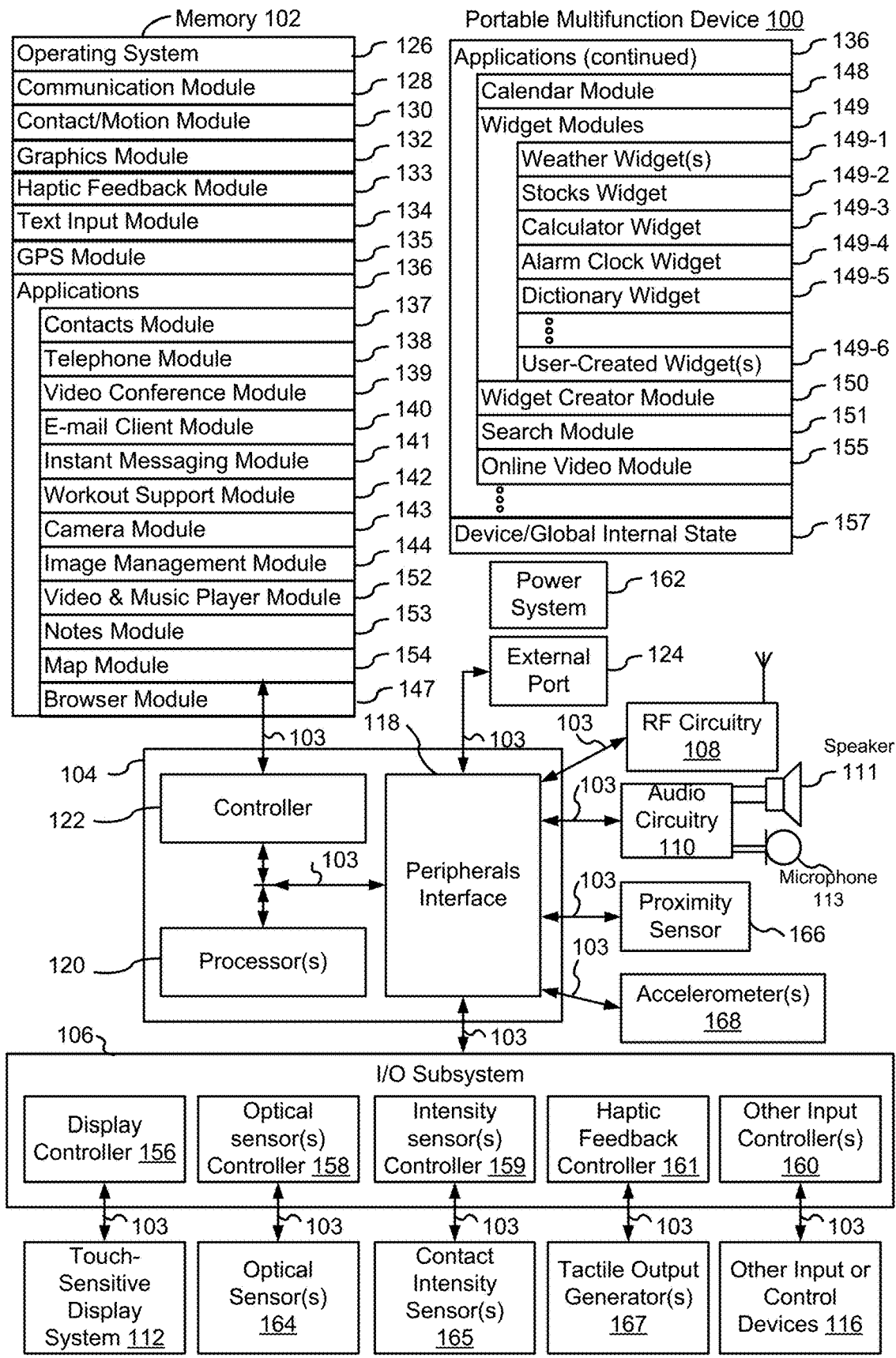
FIG. 1A is a block diagram illustrating a portable multifunction device with a touch-sensitive display in accordance with some embodiments.

Affordances displayed according to conventional methods are often visually distracting and may clutter the user interface. In addition, the appearances of the affordances are often fixed and do not adapt to changes that occur in the underlying content or changes in the operation mode of the underlying user interfaces. The embodiments below disclose a way to display and change the appearance of an affordance based on the changes of the underlying content, where an inversion of a display property of the underlying content provides the basis for determining the value of the same display property of the affordance. Furthermore, the value range of the display property for the affordance is constrained to be a sub-range of the value range of the display property for the underlying content. For example, different value ranges of the luminance of the affordance are given to different affordance appearance types (e.g., a dark affordance appearance type vs. a light affordance appearance type) that are selected for backgrounds of different overall luminance levels (e.g., a dark background vs. a light background). This promotes visibility of the affordance against a changing background without causing undue distraction to the user. In some embodiments, the appearance of the affordance changes with the appearance of the background in accordance with different sets of rules depending on the operation mode of the user interface over which the affordance is displayed, thereby providing a way to adjust the balance between the need to maintain visibility of the affordance and the need to reduce undue distraction caused by the affordance when the operating context of the affordance changes. In some embodiments, both the appearance and the affordance appearance type of an affordance change in accordance with changes in the appearance of the underlying content, including instantaneous changes and cumulative changes over time.

Below, FIGS. 1A-1B, 2, and 3 provide a description of example devices. FIGS. 4A-4B, 5A-5D, 5G-5P, 5S-5AA, and 5AD illustrate example user interfaces with affordances that change their appearances in accordance changes in the appearance of the underlying content, in accordance with some embodiments. FIGS. 5E, 5Q, 5R, 5AB, 5AC, and 5AE-5AK illustrate the differences in the appearances of the affordances and the underlying appearance value ranges used in generating the affordances shown in 5A-5D, 5G-5P, 5S-5AA, and 5AD, in accordance with some embodiments. FIGS. 6A-6C, 7A-7E, and 8A-8F are flow diagrams of methods of displaying and adjusting an appearance of an affordance, in accordance with some embodiments. The user interfaces, affordance appearances, and value ranges shown in FIGS. 4A-4B and 5A-5AK are used to illustrate the processes in FIGS. 6A-6C, 7A-7E, and 8A-8F.

Example Devices

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact, unless the context clearly indicates otherwise.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Example embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch-screen displays and/or touchpads), are, optionally, used. It should also be understood that, in some embodiments, the device is not a portable communications device, but is a desktop computer with a touch-sensitive surface (e.g., a touch-screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse and/or a joystick.

The device typically supports a variety of applications, such as one or more of the following: a note taking application, a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display system 112 is sometimes called a "touch screen" for convenience, and is sometimes simply called a touch-sensitive display. Device 100 includes memory 102 (which optionally includes one or more computer readable storage mediums), memory controller 122, one or more processing units (CPUs) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more intensity sensors 165 for detecting intensities of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user. Using tactile outputs to provide haptic feedback to a user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, a tactile output pattern specifies characteristics of a tactile output, such as the amplitude of the tactile output, the shape of a movement waveform of the tactile output, the frequency of the tactile output, and/or the duration of the tactile output.

When tactile outputs with different tactile output patterns are generated by a device (e.g., via one or more tactile output generators that move a moveable mass to generate tactile outputs), the tactile outputs may invoke different haptic sensations in a user holding or touching the device. While the sensation of the user is based on the user's perception of the tactile output, most users will be able to identify changes in waveform, frequency, and amplitude of tactile outputs generated by the device. Thus, the waveform, frequency and amplitude can be adjusted to indicate to the user that different operations have been performed. As such, tactile outputs with tactile output patterns that are designed, selected, and/or engineered to simulate characteristics (e.g., size, material, weight, stiffness, smoothness, etc.); behaviors (e.g., oscillation, displacement, acceleration, rotation, expansion, etc.); and/or interactions (e.g., collision, adhesion, repulsion, attraction, friction, etc.) of objects in a given environment (e.g., a user interface that includes graphical features and objects, a simulated physical environment with virtual boundaries and virtual objects, a real physical environment with physical boundaries and physical objects, and/or a combination of any of the above) will, in some circumstances, provide helpful feedback to users that reduces input errors and increases the efficiency of the user's operation of the device. Additionally, tactile outputs are, optionally, generated to correspond to feedback that is unrelated to a simulated physical characteristic, such as an input threshold or a selection of an object. Such tactile outputs will, in some circumstances, provide helpful feedback to users that reduces input errors and increases the efficiency of the user's operation of the device.

In some embodiments, a tactile output with a suitable tactile output pattern serves as a cue for the occurrence of an event of interest in a user interface or behind the scenes in a device. Examples of the events of interest include activation of an affordance (e.g., a real or virtual button, or toggle switch) provided on the device or in a user interface, success or failure of a requested operation, reaching or crossing a boundary in a user interface, entry into a new state, switching of input focus between objects, activation of a new mode, reaching or crossing an input threshold, detection or recognition of a type of input or gesture, etc. In some embodiments, tactile outputs are provided to serve as a warning or an alert for an impending event or outcome that would occur unless a redirection or interruption input is timely detected. Tactile outputs are also used in other contexts to enrich the user experience, improve the accessibility of the device to users with visual or motor difficulties or other accessibility needs, and/or improve efficiency and functionality of the user interface and/or the device. Tactile outputs are optionally accompanied with audio outputs and/or visible user interface changes, which further enhance a user's experience when the user interacts with a user interface and/or the device, and facilitate better conveyance of information regarding the state of the user interface and/or the device, and which reduce input errors and increase the efficiency of the user's operation of the device.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, firmware, or a combination thereof, including one or more signal processing and/or application specific integrated circuits.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU(s) 120 and the peripherals interface 118, is, optionally, controlled by memory controller 122.

Peripherals interface 118 can be used to couple input and output peripherals of the device to CPU(s) 120 and memory 102. The one or more processors 120 run or execute various software programs and/or sets of instructions stored in memory 102 to perform various functions for device 100 and to process data.

In some embodiments, peripherals interface 118, CPU(s) 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch-sensitive display system 112 and other input or control devices 116, with peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input or control devices 116. The other input or control devices 116 optionally include physical buttons (e.g., push buttons, rocker buttons, etc.), dials, slider switches, joysticks, click wheels, and so forth. In some alternate embodiments, input controller(s) 160 are, optionally, coupled with any (or none) of the following: a keyboard, infrared port, USB port, stylus, and/or a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

Touch-sensitive display system 112 provides an input interface and an output interface between the device and a user. Display controller 156 receives and/or sends electrical signals from/to touch-sensitive display system 112. Touch-sensitive display system 112 displays visual output to the user. The visual output optionally includes graphics, text, icons, video, and any combination thereof (collectively termed "graphics"). In some embodiments, some or all of the visual output corresponds to user interface objects. Examples of user-interactive graphical user interface objects include, without limitation, a button, slider, icon, selectable menu item, switch, hyperlink, or other user interface control. In some embodiments, some or all of the visual output corresponds to indicators and visual guides that provide visual cues indicative of the kinds of inputs and/or operations that are associated with different regions of the user interface or screen. Examples of the indicators and visual guides include, without limitation, an arrow, a bar, an overlay, a spotlight, or other visually distinguishing region or shape designed to provide visual cues to the user. As used herein, the term "affordance" refers to a user-interactive graphical user interface object and/or an indicator and visual guide that is displayed over a background (e.g., a portion of an application user interface or system user interface).

Touch-sensitive display system 112 has a touch-sensitive surface, sensor or set of sensors that accepts input from the user based on haptic and/or tactile contact. Touch-sensitive display system 112 and display controller 156 (along with any associated modules and/or sets of instructions in memory 102) detect contact (and any movement or breaking of the contact) on touch-sensitive display system 112 and converts the detected contact into interaction with user-interface objects (e.g., one or more soft keys, icons, web pages or images) that are displayed on touch-sensitive display system 112. In some embodiments, a point of contact between touch-sensitive display system 112 and the user corresponds to a finger of the user or a stylus.

Touch-sensitive display system 112 optionally uses LCD (liquid crystal display) technology, LPD (light emitting polymer display) technology, or LED (light emitting diode) technology, although other display technologies are used in other embodiments. Touch-sensitive display system 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch-sensitive display system 112. In some embodiments, projected mutual capacitance sensing technology is used, such as that found in the iPhone®, iPod Touch®, and iPad® from Apple Inc. of Cupertino, Calif.

Touch-sensitive display system 112 optionally has a video resolution in excess of 100 dpi. In some embodiments, the touch screen video resolution is in excess of 400 dpi (e.g., 500 dpi, 800 dpi, or greater). The user optionally makes contact with touch-sensitive display system 112 using any suitable object or appendage, such as a stylus, a finger, and so forth. In some embodiments, the user interface is designed to work with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch-sensitive display system 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled with optical sensor controller 158 in I/O subsystem 106. Optical sensor(s) 164 optionally include charge-coupled device (CCD) or complementary metal-oxide semiconductor (CMOS) phototransistors. Optical sensor(s) 164 receive light from the environment, projected through one or more lens, and converts the light to data representing an image. In conjunction with imaging module 143 (also called a camera module), optical sensor(s) 164 optionally capture still images and/or video. In some embodiments, an optical sensor is located on the back of device 100, opposite touch-sensitive display system 112 on the front of the device, so that the touch screen is enabled for use as a viewfinder for still and/or video image acquisition. In some embodiments, another optical sensor is located on the front of the device so that the user's image is obtained (e.g., for selfies, for videoconferencing while the user views the other video conference participants on the touch screen, etc.).

Device 100 optionally also includes one or more contact intensity sensors 165. FIG. 1A shows a contact intensity sensor coupled with intensity sensor controller 159 in I/O subsystem 106. Contact intensity sensor(s) 165 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor(s) 165 receive contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch-screen display system 112 which is located on the front of device 100.

Device 100 optionally also includes one or more proximity sensors 166. FIG. 1A shows proximity sensor 166 coupled with peripherals interface 118. Alternately, proximity sensor 166 is coupled with input controller 160 in I/O subsystem 106. In some embodiments, the proximity sensor turns off and disables touch-sensitive display system 112 when the multifunction device is placed near the user's ear (e.g., when the user is making a phone call).

Device 100 optionally also includes one or more tactile output generators 167. FIG. 1A shows a tactile output generator coupled with haptic feedback controller 161 in I/O subsystem 106. In some embodiments, tactile output generator(s) 167 include one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Tactile output generator(s) 167 receive tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch-sensitive display system 112, which is located on the front of device 100.

Device 100 optionally also includes one or more accelerometers 168. FIG. 1A shows accelerometer 168 coupled with peripherals interface 118. Alternately, accelerometer 168 is, optionally, coupled with an input controller 160 in I/O subsystem 106. In some embodiments, information is displayed on the touch-screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
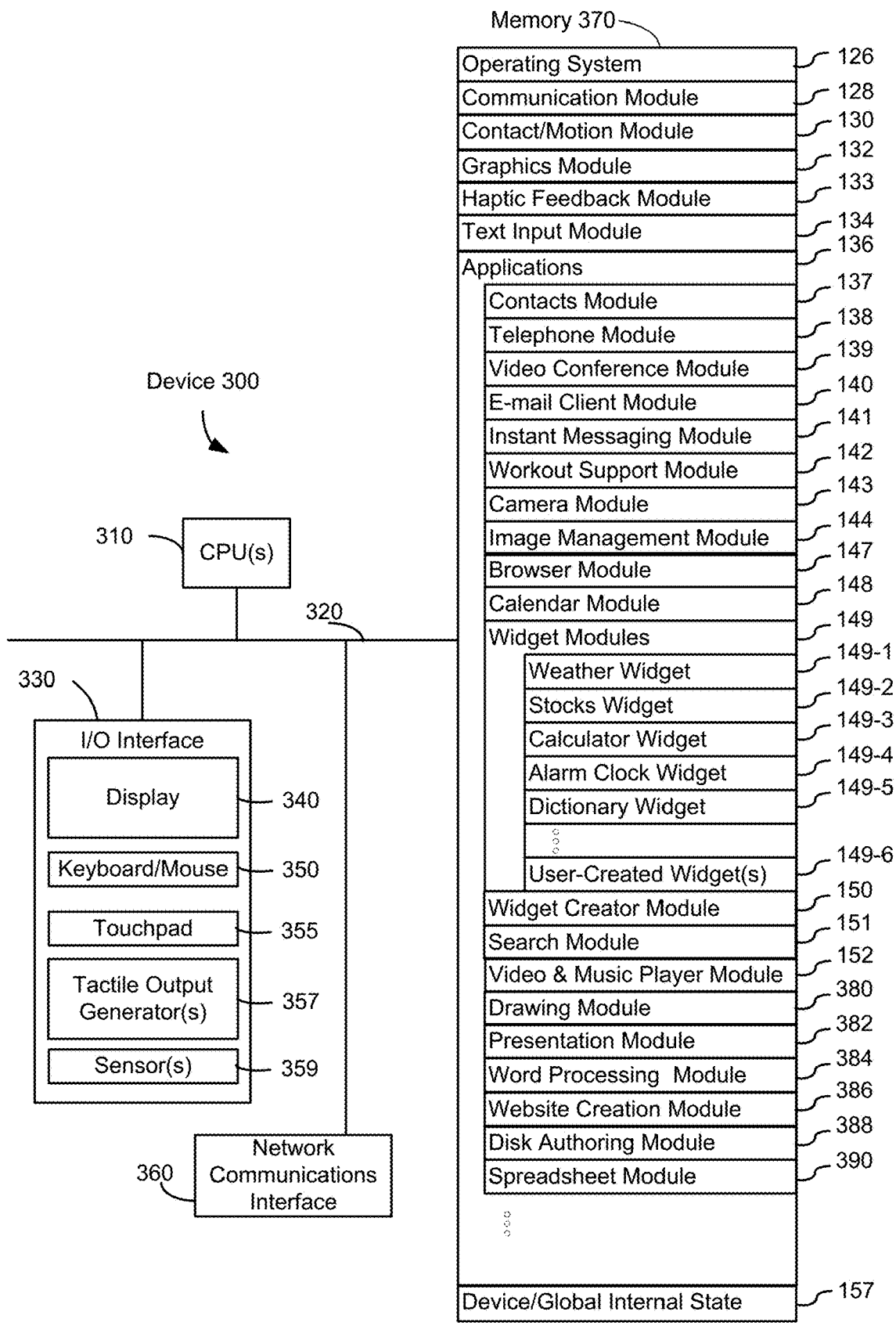
FIG. 3 is a block diagram of an example multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, haptic feedback module (or set of instructions) 133, text input module (or set of instructions) 134, Global Positioning System (GPS) module (or set of instructions) 135, and applications (or sets of instructions) 136. Furthermore, in some embodiments, memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch-sensitive display system 112; sensor state, including information obtained from the device's various sensors and other input or control devices 116; and location and/or positional information concerning the device's location and/or attitude.

Operating system 126 (e.g., iOS, Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used in some iPhone®, iPod Touch®, and iPad® devices from Apple Inc. of Cupertino, Calif. In some embodiments, the external port is a Lightning connector that is the same as, or similar to and/or compatible with the Lightning connector used in some iPhone®, iPod Touch®, and iPad® devices from Apple Inc. of Cupertino, Calif.

Contact/motion module 130 optionally detects contact with touch-sensitive display system 112 (in conjunction with display controller 156) and other touch-sensitive devices (e.g., a touchpad or physical click wheel). Contact/motion module 130 includes various software components for performing various operations related to detection of contact (e.g., by a finger or by a stylus), such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts or stylus contacts) or to multiple simultaneous contacts (e.g., "multitouch"/multiple finger contacts). In some embodiments, contact/motion module 130 and display controller 156 detect contact on a touchpad.

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event. Similarly, tap, swipe, drag, and other gestures are optionally detected for a stylus by detecting a particular contact pattern for the stylus.

In some embodiments, detecting a finger tap gesture depends on the length of time between detecting the finger-down event and the finger-up event, but is independent of the intensity of the finger contact between detecting the finger-down event and the finger-up event. In some embodiments, a tap gesture is detected in accordance with a determination that the length of time between the finger-down event and the finger-up event is less than a predetermined value (e.g., less than 0.1, 0.2, 0.3, 0.4 or 0.5 seconds), independent of whether the intensity of the finger contact during the tap meets a given intensity threshold (greater than a nominal contact-detection intensity threshold), such as a light press or deep press intensity threshold. Thus, a finger tap gesture can satisfy particular input criteria that do not require that the characteristic intensity of a contact satisfy a given intensity threshold in order for the particular input criteria to be met. For clarity, the finger contact in a tap gesture typically needs to satisfy a nominal contact-detection intensity threshold, below which the contact is not detected, in order for the finger-down event to be detected. A similar analysis applies to detecting a tap gesture by a stylus or other contact. In cases where the device is capable of detecting a finger or stylus contact hovering over a touch sensitive surface, the nominal contact-detection intensity threshold optionally does not correspond to physical contact between the finger or stylus and the touch sensitive surface.

The same concepts apply in an analogous manner to other types of gestures. For example, a swipe gesture, a pinch gesture, a depinch gesture, and/or a long press gesture are optionally detected based on the satisfaction of criteria that are either independent of intensities of contacts included in the gesture, or do not require that contact(s) that perform the gesture reach intensity thresholds in order to be recognized. For example, a swipe gesture is detected based on an amount of movement of one or more contacts; a pinch gesture is detected based on movement of two or more contacts towards each other; a depinch gesture is detected based on movement of two or more contacts away from each other; and a long press gesture is detected based on a duration of the contact on the touch-sensitive surface with less than a threshold amount of movement. As such, the statement that particular gesture recognition criteria do not require that the intensity of the contact(s) meet a respective intensity threshold in order for the particular gesture recognition criteria to be met means that the particular gesture recognition criteria are capable of being satisfied if the contact(s) in the gesture do not reach the respective intensity threshold, and are also capable of being satisfied in circumstances where one or more of the contacts in the gesture do reach or exceed the respective intensity threshold. In some embodiments, a tap gesture is detected based on a determination that the finger-down and finger-up event are detected within a predefined time period, without regard to whether the contact is above or below the respective intensity threshold during the predefined time period, and a swipe gesture is detected based on a determination that the contact movement is greater than a predefined magnitude, even if the contact is above the respective intensity threshold at the end of the contact movement. Even in implementations where detection of a gesture is influenced by the intensity of contacts performing the gesture (e.g., the device detects a long press more quickly when the intensity of the contact is above an intensity threshold or delays detection of a tap input when the intensity of the contact is higher), the detection of those gestures does not require that the contacts reach a particular intensity threshold so long as the criteria for recognizing the gesture can be met in circumstances where the contact does not reach the particular intensity threshold (e.g., even if the amount of time that it takes to recognize the gesture changes).

Contact intensity thresholds, duration thresholds, and movement thresholds are, in some circumstances, combined in a variety of different combinations in order to create heuristics for distinguishing two or more different gestures directed to the same input element or region so that multiple different interactions with the same input element are enabled to provide a richer set of user interactions and responses. The statement that a particular set of gesture recognition criteria do not require that the intensity of the contact(s) meet a respective intensity threshold in order for the particular gesture recognition criteria to be met does not preclude the concurrent evaluation of other intensity-dependent gesture recognition criteria to identify other gestures that do have a criterion that is met when a gesture includes a contact with an intensity above the respective intensity threshold. For example, in some circumstances, first gesture recognition criteria for a first gesture—which do not require that the intensity of the contact(s) meet a respective intensity threshold in order for the first gesture recognition criteria to be met—are in competition with second gesture recognition criteria for a second gesture—which are dependent on the contact(s) reaching the respective intensity threshold. In such competitions, the gesture is, optionally, not recognized as meeting the first gesture recognition criteria for the first gesture if the second gesture recognition criteria for the second gesture are met first. For example, if a contact reaches the respective intensity threshold before the contact moves by a predefined amount of movement, a deep press gesture is detected rather than a swipe gesture. Conversely, if the contact moves by the predefined amount of movement before the contact reaches the respective intensity threshold, a swipe gesture is detected rather than a deep press gesture. Even in such circumstances, the first gesture recognition criteria for the first gesture still do not require that the intensity of the contact(s) meet a respective intensity threshold in order for the first gesture recognition criteria to be met because if the contact stayed below the respective intensity threshold until an end of the gesture (e.g., a swipe gesture with a contact that does not increase to an intensity above the respective intensity threshold), the gesture would have been recognized by the first gesture recognition criteria as a swipe gesture. As such, particular gesture recognition criteria that do not require that the intensity of the contact(s) meet a respective intensity threshold in order for the particular gesture recognition criteria to be met will (A) in some circumstances ignore the intensity of the contact with respect to the intensity threshold (e.g. for a tap gesture) and/or (B) in some circumstances still be dependent on the intensity of the contact with respect to the intensity threshold in the sense that the particular gesture recognition criteria (e.g., for a long press gesture) will fail if a competing set of intensity-dependent gesture recognition criteria (e.g., for a deep press gesture) recognize an input as corresponding to an intensity-dependent gesture before the particular gesture recognition criteria recognize a gesture corresponding to the input (e.g., for a long press gesture that is competing with a deep press gesture for recognition).

Graphics module 132 includes various known software components for rendering and displaying graphics on touch-sensitive display system 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions (e.g., instructions used by haptic feedback controller 161) to produce tactile outputs using tactile output generator(s) 167 at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 optionally include the following modules (or sets of instructions), or a subset or superset thereof:
  contacts module 137 (sometimes called an address book or contact list);
  telephone module 138;
  video conferencing module 139;
  e-mail client module 140;
  instant messaging (IM) module 141;
  workout support module 142;
  camera module 143 for still and/or video images;
  image management module 144;
  browser module 147;
  calendar module 148;
  widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;

widget creator module 150 for making user-created widgets 149-6;

search module 151;

video and music player module 152, which is, optionally, made up of a video player module and a music player module;

notes module 153;

map module 154; and/or online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch-sensitive display system 112, display controller 156, contact module 130, graphics module 132, and text input module 134, contacts module 137 includes executable instructions to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers and/or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch-sensitive display system 112, display controller 156, contact module 130, graphics module 132, and text input module 134, telephone module 138 includes executable instructions to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch-sensitive display system 112, display controller 156, optical sensor(s) 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch-sensitive display system 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch-sensitive display system 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, Apple Push Notification Service (APNs) or IMPS for Internet-based instant messages), to receive instant messages, and to view received instant messages. In some embodiments, transmitted and/or received instant messages optionally include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, APNs, or IMPS).

In conjunction with RF circuitry 108, touch-sensitive display system 112, display controller 156, contact module 130, graphics module 132, text input module 134, GPS module 135, map module 154, and video and music player module 152, workout support module 142 includes executable instructions to create workouts (e.g., with time, distance, and/or calorie burning goals); communicate with workout sensors (in sports devices and smart watches); receive workout sensor data; calibrate sensors used to monitor a workout; select and play music for a workout; and display, store and transmit workout data.

In conjunction with touch-sensitive display system 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, and/or delete a still image or video from memory 102.

In conjunction with touch-sensitive display system 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch-sensitive display system 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch-sensitive display system 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch-sensitive display system 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch-sensitive display system 112, display system controller 156, contact module 130, graphics module 132, text input module 134, and browser module 147, the widget creator module 150 includes executable instructions to create widgets (e.g., turning a user-specified portion of a web page into a widget).

In conjunction with touch-sensitive display system 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch-sensitive display system 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch-sensitive display system 112, or on an external display connected wirelessly or via external port 124). In some embodiments, device 100 optionally includes the functionality of an MP3 player, such as an iPod (trademark of Apple Inc.).

In conjunction with touch-sensitive display system 112, display controller 156, contact module 130, graphics module 132, and text input module 134, notes module 153 includes executable instructions to create and manage notes, to do lists, and the like in accordance with user instructions.

In conjunction with RF circuitry 108, touch-sensitive display system 112, display system controller 156, contact module 130, graphics module 132, text input module 134, GPS module 135, and browser module 147, map module 154 includes executable instructions to receive, display, modify, and store maps and data associated with maps (e.g., driving directions; data on stores and other points of interest at or near a particular location; and other location-based data) in accordance with user instructions.

In conjunction with touch-sensitive display system 112, display system controller 156, contact module 130, graphics module 132, audio circuitry 110, speaker 111, RF circuitry 108, text input module 134, e-mail client module 140, and browser module 147, online video module 155 includes executable instructions that allow the user to access, browse, receive (e.g., by streaming and/or download), play back (e.g., on the touch screen 112, or on an external display connected wirelessly or via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
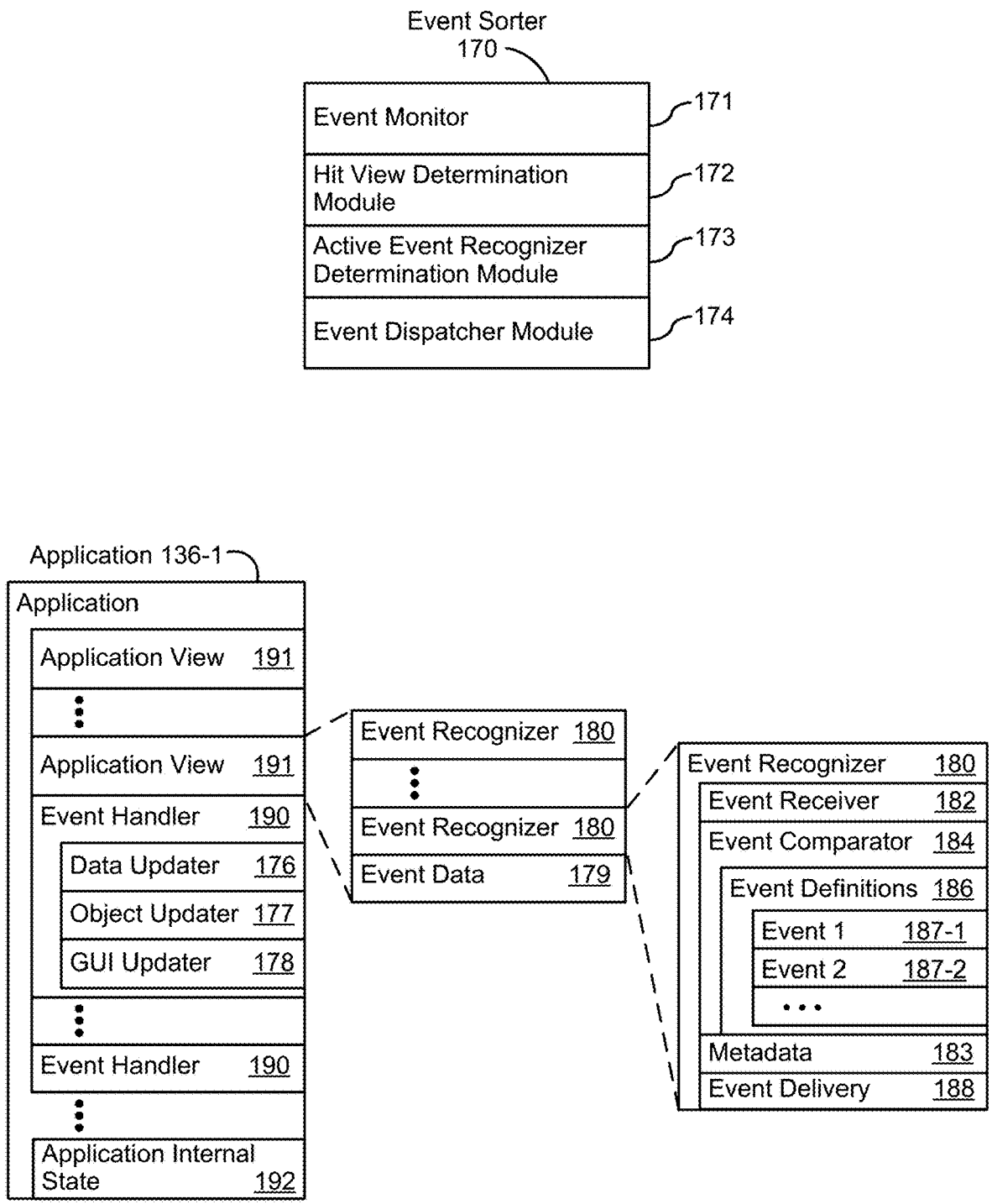
FIG. 1B is a block diagram illustrating example components for event handling in accordance with some embodiments.

FIG. 1B is a block diagram illustrating example components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 136, 137-155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display system 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display system 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display system 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch-sensitive display system 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display system 112, and lift-off of the touch (touch end). In some embodiments, the event also includes information for one or more associated event handlers 190.

In some embodiments, event definition 187 includes a definition of an event for a respective user-interface object.

In some embodiments, event comparator 184 performs a hit test to determine which user-interface object is associated with a sub-event. For example, in an application view in which three user-interface objects are displayed on touch-sensitive display system 112, when a touch is detected on touch-sensitive display system 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video and music player module 152. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof are optionally utilized as inputs corresponding to sub-events which define an event to be recognized.

Figure 2:
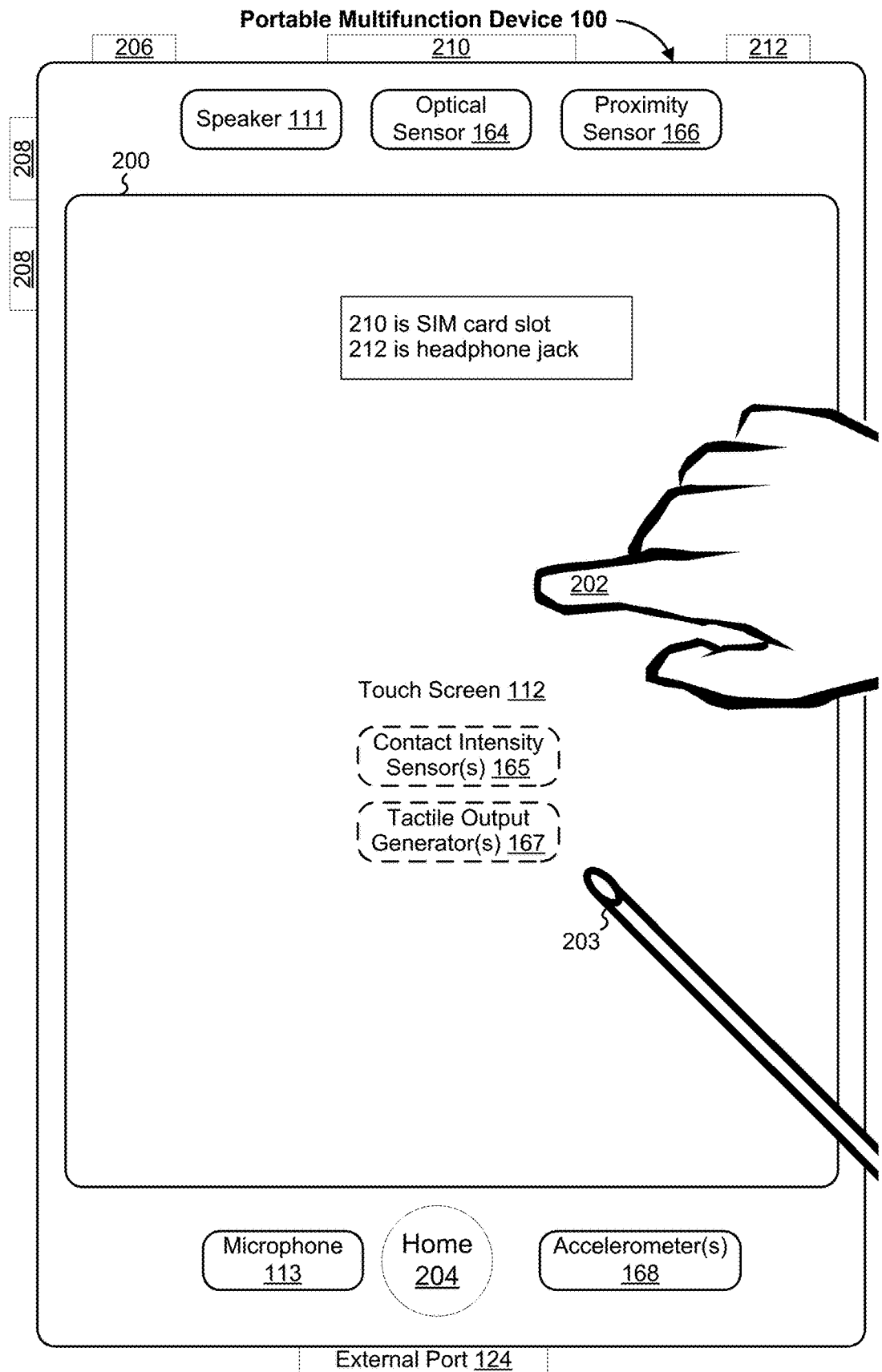
FIG. 2 illustrates a portable multifunction device having a touch screen in accordance with some embodiments.

FIG. 2 illustrates a portable multifunction device 100 having a touch screen (e.g., touch-sensitive display system 112, FIG. 1A) in accordance with some embodiments. The touch screen optionally displays one or more graphics within user interface (UI) 200. In these embodiments, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on the touch-screen display.

In some embodiments, device 100 includes the touch-screen display, menu button 204 (sometimes called home button 204), push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In some embodiments, device 100 also accepts verbal input for activation or deactivation of some functions through microphone 113. Device 100 also, optionally, includes one or more contact intensity sensors 165 for detecting intensities of contacts on touch-sensitive display system 112 and/or one or more tactile output generators 167 for generating tactile outputs for a user of device 100.

FIG. 3 is a block diagram of an example multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch-screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Attention is now directed towards embodiments of user interfaces ("UI") that are, optionally, implemented on portable multifunction device 100.

Figure 4A:
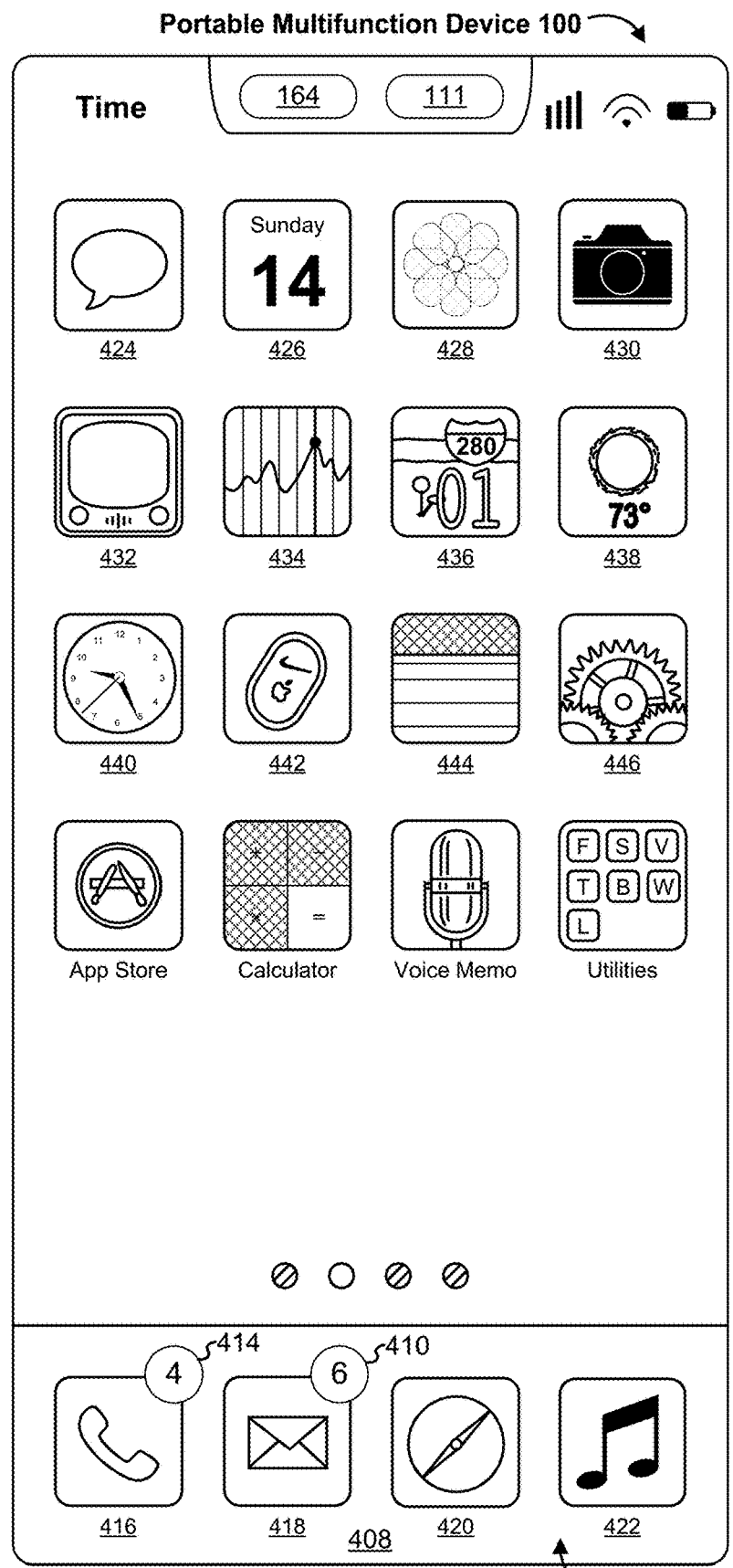
FIG. 4A illustrates an example user interface for a menu of applications on a portable multifunction device in accordance with some embodiments.

FIG. 4A illustrates an example user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) for wireless communication(s), such as cellular and Wi-Fi signals;

Time;

a Bluetooth indicator;

a Battery status indicator;

Tray 408 with icons for frequently used applications, such as:

Icon 416 for telephone module 138, labeled "Phone," which optionally includes an indicator 414 of the number of missed calls or voicemail messages;

Icon 418 for e-mail client module 140, labeled "Mail," which optionally includes an indicator 410 of the number of unread e-mails;

Icon 420 for browser module 147, labeled "Browser;" and

Icon 422 for video and music player module 152, labeled "Music;" and

Icons for other applications, such as:

Icon 424 for IM module 141, labeled "Messages;"

Icon 426 for calendar module 148, labeled "Calendar;"

Icon 428 for image management module 144, labeled "Photos;"

Icon 430 for camera module 143, labeled "Camera;"

Icon 432 for online video module 155, labeled "Online Video;"

Icon 434 for stocks widget 149-2, labeled "Stocks;"

Icon 436 for map module 154, labeled "Maps;"

Icon 438 for weather widget 149-1, labeled "Weather;"

Icon 440 for alarm clock widget 149-4, labeled "Clock;"

Icon 442 for workout support module 142, labeled "Workout Support;"

Icon 444 for notes module 153, labeled "Notes;" and

Icon 446 for a settings application or module, which provides access to settings for device 100 and its various applications 136.

It should be noted that the icon labels illustrated in FIG. 4A are merely examples. For example, other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
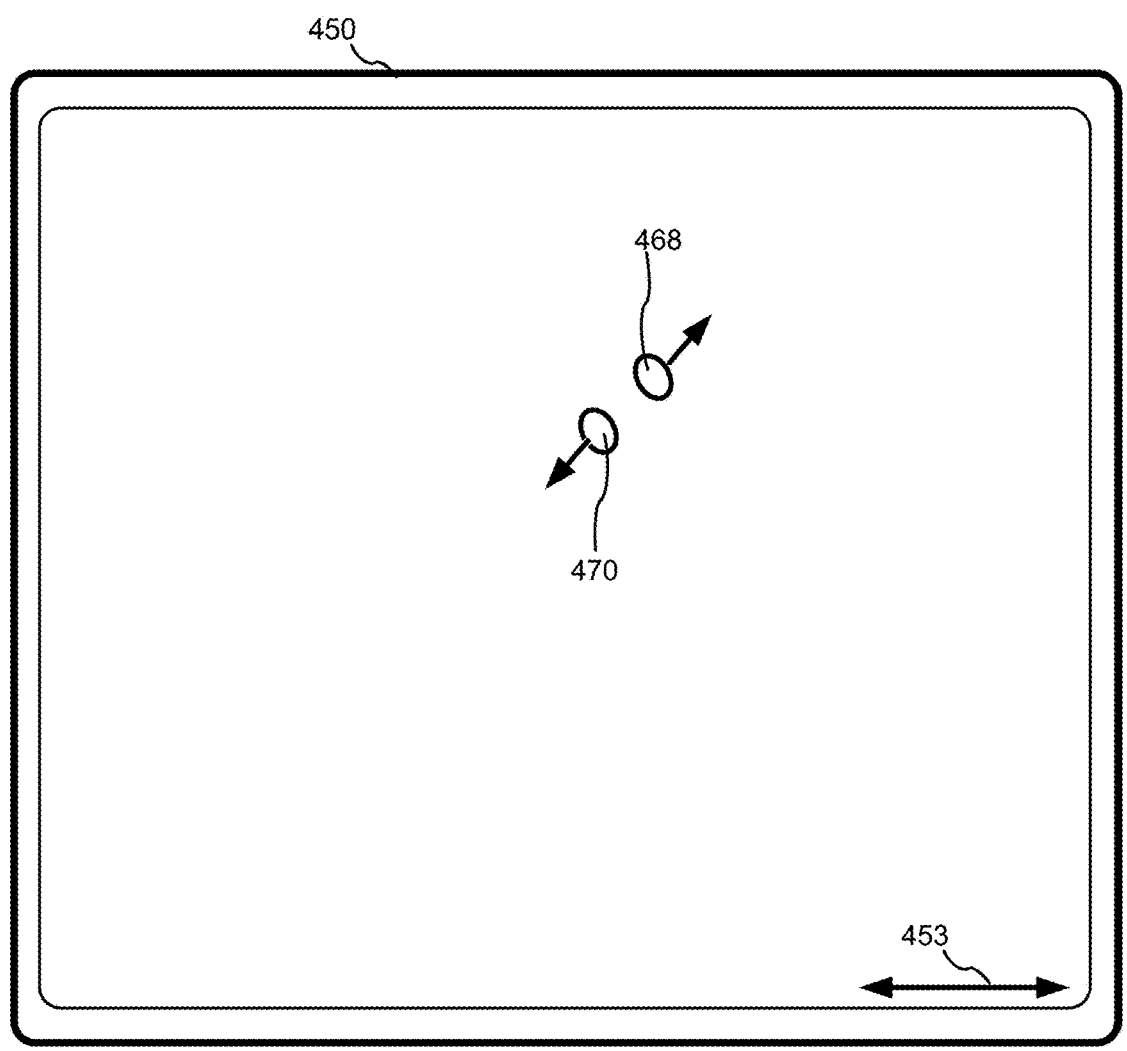
FIG. 4B illustrates an example user interface for a multifunction device with a touch-sensitive surface that is separate from the display in accordance with some embodiments.
Figure 4B:
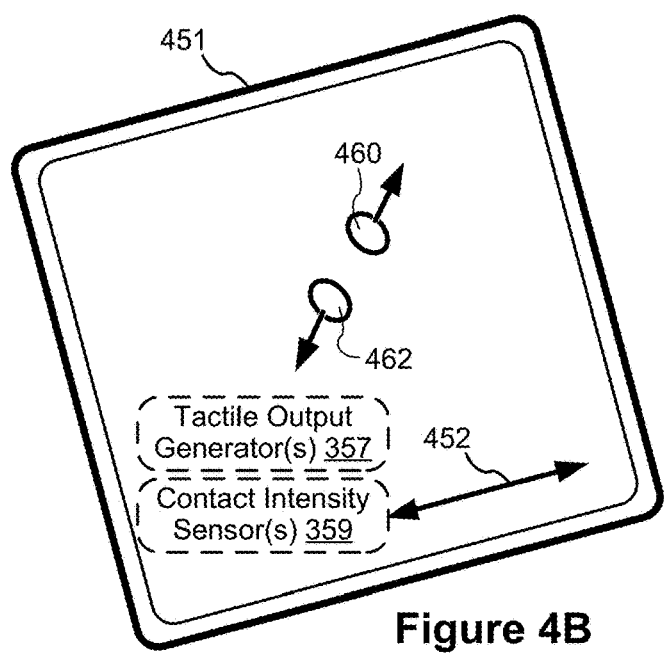

FIG. 4B illustrates an example user interface on a device (e.g., device 300, FIG. 3) with a touch-sensitive surface 451 (e.g., a tablet or touchpad 355, FIG. 3) that is separate from the display 450. Device 300 also, optionally, includes one or more contact intensity sensors (e.g., one or more of sensors 357) for detecting intensity of contacts on touch-sensitive surface 451 and/or one or more tactile output generators 359 for generating tactile outputs for a user of device 300.

Although many of the examples that follow will be given with reference to inputs on touch screen display 112 (where the touch sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures, etc.), it should be understood that, in some embodiments, one or more of the finger inputs are replaced with input from another input device (e.g., a mouse based input or a stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A or the touch screen in FIG. 4A) that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations, focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "intensity" of a contact on a touch-sensitive surface refers to the force or pressure (force per unit area) of a contact (e.g., a finger contact or a stylus contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average or a sum) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be readily accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch-screen display can be set to any of a large range of predefined thresholds values without changing the trackpad or touch-screen display hardware. Additionally, in some implementations a user of the device is provided with software settings for adjusting one or more of the set of intensity thresholds (e.g., by adjusting individual intensity thresholds and/or by adjusting a plurality of intensity thresholds at once with a system-level click "intensity" parameter).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, a value produced by low-pass filtering the intensity of the contact over a predefined period or starting at a predefined time, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds may include a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second intensity threshold results in a third operation. In some embodiments, a comparison between the characteristic intensity and one or more intensity thresholds is used to determine whether or not to perform one or more operations (e.g., whether to perform a respective option or forgo performing the respective operation) rather than being used to determine whether to perform a first operation or a second operation.

In some embodiments, a portion of a gesture is identified for purposes of determining a characteristic intensity. For example, a touch-sensitive surface may receive a continuous swipe contact transitioning from a start location and reaching an end location (e.g., a drag gesture), at which point the intensity of the contact increases. In this example, the characteristic intensity of the contact at the end location may be based on only a portion of the continuous swipe contact, and not the entire swipe contact (e.g., only the portion of the swipe contact at the end location). In some embodiments, a smoothing algorithm may be applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The user interface figures described herein optionally include various intensity diagrams that show the current intensity of the contact on the touch-sensitive surface relative to one or more intensity thresholds (e.g., a contact detection intensity threshold $IT_0$, a light press intensity threshold $IT_L$, a deep press intensity threshold ITS (e.g., that is at least initially higher than $IT_L$), and/or one or more other intensity thresholds (e.g., an intensity threshold $IT_H$ that is lower than $IT_L$)). This intensity diagram is typically not part of the displayed user interface, but is provided to aid in the interpretation of the figures. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold $IT_0$ below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

In some embodiments, the response of the device to inputs detected by the device depends on criteria based on the contact intensity during the input. For example, for some "light press" inputs, the intensity of a contact exceeding a first intensity threshold during the input triggers a first response. In some embodiments, the response of the device to inputs detected by the device depends on criteria that include both the contact intensity during the input and time-based criteria. For example, for some "deep press" inputs, the intensity of a contact exceeding a second intensity threshold during the input, greater than the first intensity threshold for a light press, triggers a second response only if a delay time has elapsed between meeting the first intensity threshold and meeting the second intensity threshold. This delay time is typically less than 200 ms (milliseconds) in duration (e.g., 40, 100, or 120 ms, depending on the magnitude of the second intensity threshold, with the delay time increasing as the second intensity threshold increases). This delay time helps to avoid accidental recognition of deep press inputs. As another example, for some "deep press" inputs, there is a reduced-sensitivity time period that occurs after the time at which the first intensity threshold is met. During the reduced-sensitivity time period, the second intensity threshold is increased. This temporary increase in the second intensity threshold also helps to avoid accidental deep press inputs. For other deep press inputs, the response to detection of a deep press input does not depend on time-based criteria.

In some embodiments, one or more of the input intensity thresholds and/or the corresponding outputs vary based on one or more factors, such as user settings, contact motion, input timing, application running, rate at which the intensity is applied, number of concurrent inputs, user history, environmental factors (e.g., ambient noise), focus selector position, and the like. Example factors are described in U.S. patent application Ser. Nos. 14/399,606 and 14/624,296, which are incorporated by reference herein in their entireties.

For example, in some embodiments, a dynamic intensity threshold changes over time based in part on the intensity of touch input over time. The dynamic intensity threshold is a sum of two components, a first component that decays over time after a predefined delay time p1 from when the touch input is initially detected, and a second component that trails the intensity of the touch input over time. The initial high intensity threshold of the first component reduces accidental triggering of a "deep press" response, while still allowing an immediate "deep press" response if the touch input provides sufficient intensity. The second component reduces unintentional triggering of a "deep press" response by gradual intensity fluctuations of in a touch input. In some embodiments, at a point in time when the touch input satisfies a dynamic intensity threshold, the "deep press" response is triggered.

In another example, in some embodiments, a dynamic intensity threshold (e.g., intensity threshold $I_D$) are used in conjunction with two other intensity thresholds: a first intensity threshold $IT_H$ and a second intensity threshold $I_L$. in some embodiments, although a touch input satisfies the first intensity threshold $IT_H$ and the second intensity threshold $IT_L$ prior to time p2, no response is provided until delay time p2 has elapsed. In some embodiments, the dynamic intensity threshold decays over time, with the decay starting at a time point that is after a predefined delay time p1 has elapsed from the time point when the response associated with the second intensity threshold $IT_L$ was triggered (e.g., time p2). This type of dynamic intensity threshold reduces accidental triggering of a response associated with the dynamic intensity threshold $IT_D$ immediately after, or concurrently with, triggering a response associated with a lower intensity threshold, such as the first intensity threshold $IT_H$ or the second intensity threshold $I_L$.

In another example, in some embodiments, a response associated with the intensity threshold $IT_L$ is triggered after the delay time p2 has elapsed from when a touch input is initially detected. Concurrently, a dynamic intensity threshold (e.g., intensity threshold $I_D$) decays after the predefined delay time p1 has elapsed from when the touch input is initially detected. So a decrease in intensity of the touch input after triggering the response associated with the intensity threshold $I_L$, followed by an increase in the intensity of the touch input, without releasing the touch input, can trigger a response associated with the intensity threshold $IT_D$ even when the intensity of the touch input is below another intensity threshold, for example, the intensity threshold $I_L$.

An increase of characteristic intensity of the contact from an intensity below the light press intensity threshold $IT_L$ to an intensity between the light press intensity threshold $IT_L$ and the deep press intensity threshold $IT_D$ is sometimes referred to as a "light press" input. An increase of characteristic intensity of the contact from an intensity below the deep press intensity threshold $IT_D$ to an intensity above the deep press intensity threshold $IT_D$ is sometimes referred to as a "deep press" input. An increase of characteristic intensity of the contact from an intensity below the contact-detection intensity threshold $IT_0$ to an intensity between the contact-detection intensity threshold $IT_0$ and the light press intensity threshold $IT_L$ is sometimes referred to as detecting the contact on the touch-surface. A decrease of characteristic intensity of the contact from an intensity above the contact-detection intensity threshold $IT_0$ to an intensity below the contact-detection intensity threshold $IT_0$ is sometimes referred to as detecting liftoff of the contact from the touch-surface. In some embodiments $IT_0$ is zero. In some embodiments, $IT_0$ is greater than zero. In some illustrations a shaded circle or oval is used to represent intensity of a contact on the touch-sensitive surface. In some illustrations, a circle or oval without shading is used represent a respective contact on the touch-sensitive surface without specifying the intensity of the respective contact.

In some embodiments, described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., the respective operation is performed on a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., the respective operation is performed on an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., the respective operation is performed on an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the description of operations performed in response to a press input associated with a press-input intensity threshold or in response to a gesture including the press input are, optionally, triggered in response to detecting: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold. As described above, in some embodiments, the triggering of these responses also depends on time-based criteria being met (e.g., a delay time has elapsed between a first intensity threshold being met and a second intensity threshold being met).

User Interfaces and Associated Processes

Attention is now directed towards embodiments of user interfaces ("UI") and associated processes that may be implemented on an electronic device, such as portable multifunction device 100 or device 300, with a display, a touch-sensitive surface, and (optionally) one or more sensors to detect intensities of contacts with the touch-sensitive surface.

FIGS. 5A-5D illustrate example user interfaces with an affordance (e.g., a home affordance) that indicates a gesture starting region on the touch-sensitive display screen for a navigation gesture (e.g., a gesture for navigating to a home screen user interface) in accordance with some embodiments. In some embodiments, affordances for controlling or providing guidance regarding other functions or operations of the device are also displayed using the methods illustrated herein. The user interfaces in these figures are used to illustrate the processes described below, including the processes in FIGS. 6A-6C, 7A-7E, and 8A-8F. For convenience of explanation, some of the embodiments will be discussed with reference to operations performed on a device with a touch-sensitive display system 112. In such embodiments, the focus selector is, optionally: a respective finger or stylus contact, a representative point corresponding to a finger or stylus contact (e.g., a centroid of a respective contact or a point associated with a respective contact), or a centroid of two or more contacts detected on the touch-sensitive display system 112.

For convenience of explanation, some of the embodiments will be discussed with reference to operations performed on a device without a home button, and a gesture meeting predefined criteria is used to cause dismissal of a currently displayed user interface and display of the home screen user interface. Although not shown in FIGS. 5A-5D, in some embodiments, a home button (e.g., a mechanical button, a solid state button, or a virtual button) is included on the device and is used to cause dismissal of a currently displayed user interface and display of the home screen user interface. (e.g., in response to a single press input) and/or display a multitasking user interface (e.g., in response to a double press input).

In FIGS. 5A-5D, while the device displays any user interface, a gesture beginning at the bottom of the screen (e.g., within a predefined region of the device that is proximate to the edge of the display (e.g., an edge region that includes a predefined portion (e.g., 20 pixels wide) of the display near the bottom edge of the device) invokes a user interface navigation process, and optionally directs navigation between multiple user interfaces based on the speed and direction of the input, and, optionally, based on movement parameters and characteristics of user interface objects (e.g., a reduced-scale representation of the currently displayed user interface) that are currently displayed.

Figure 5B:
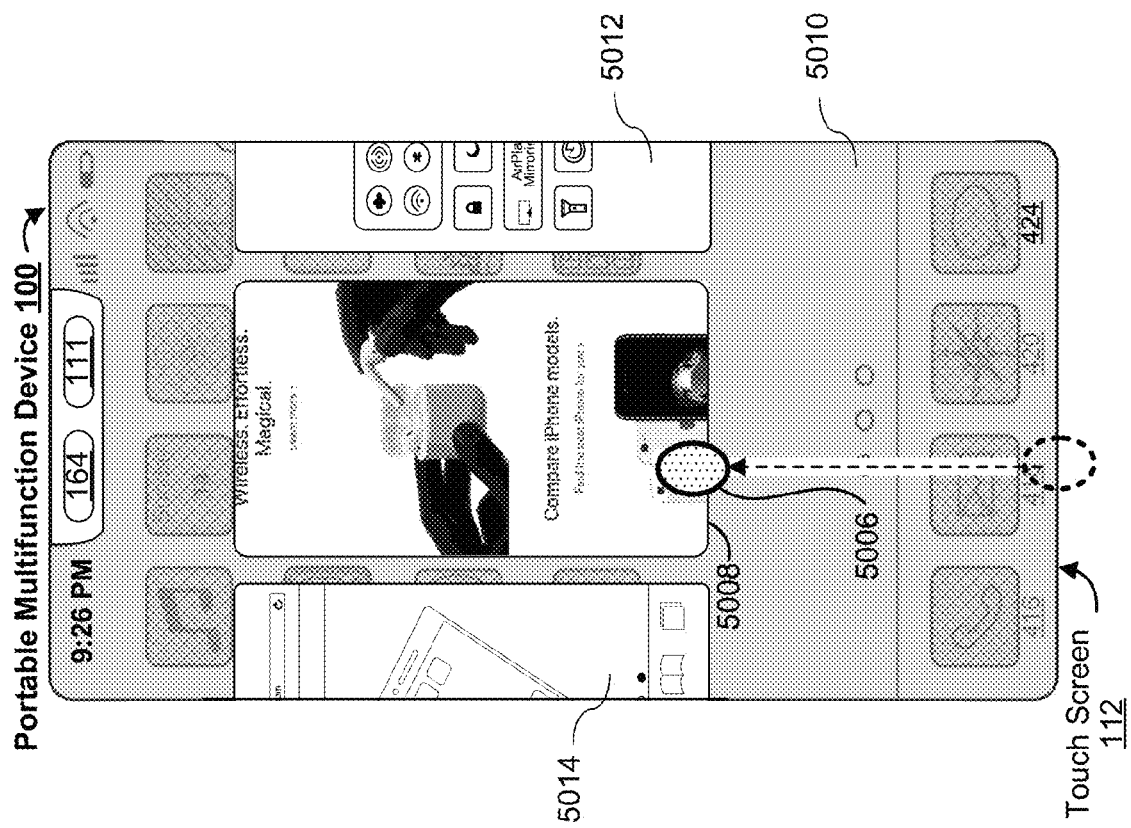
FIGS. 5A-5D illustrate example user interfaces that include an affordance with an appearance that is adaptive to an appearance of a background, in accordance with some embodiments.
Figure 5A:
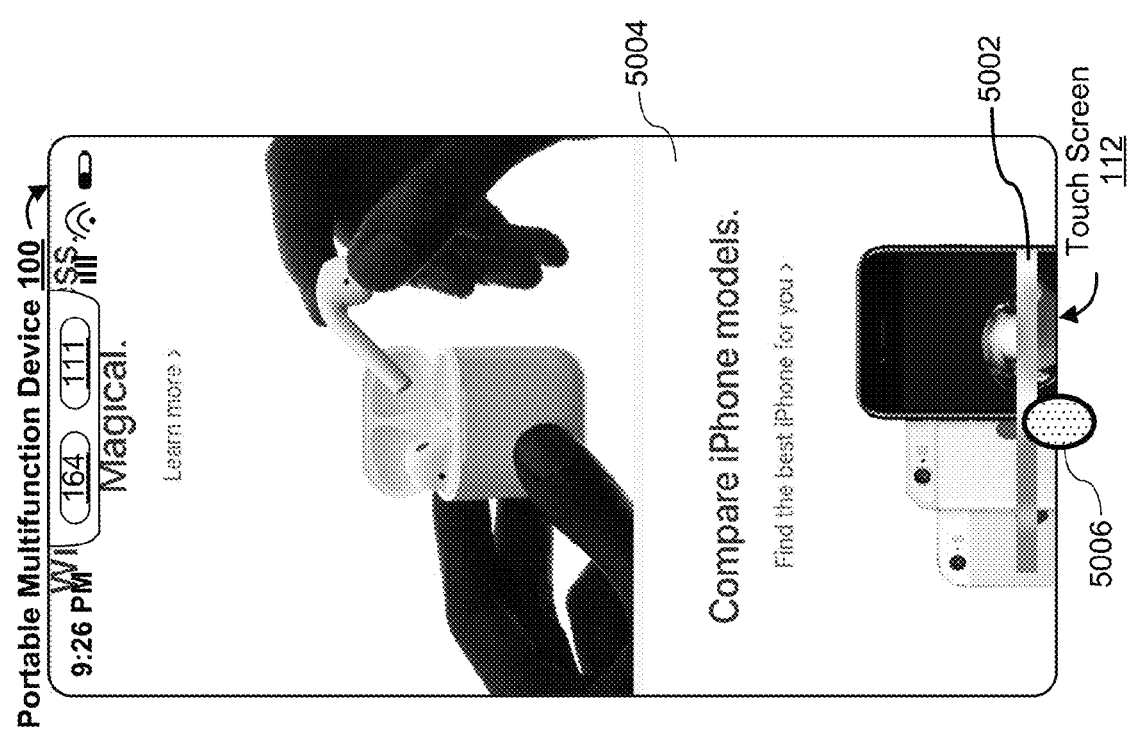
Figure 5D:
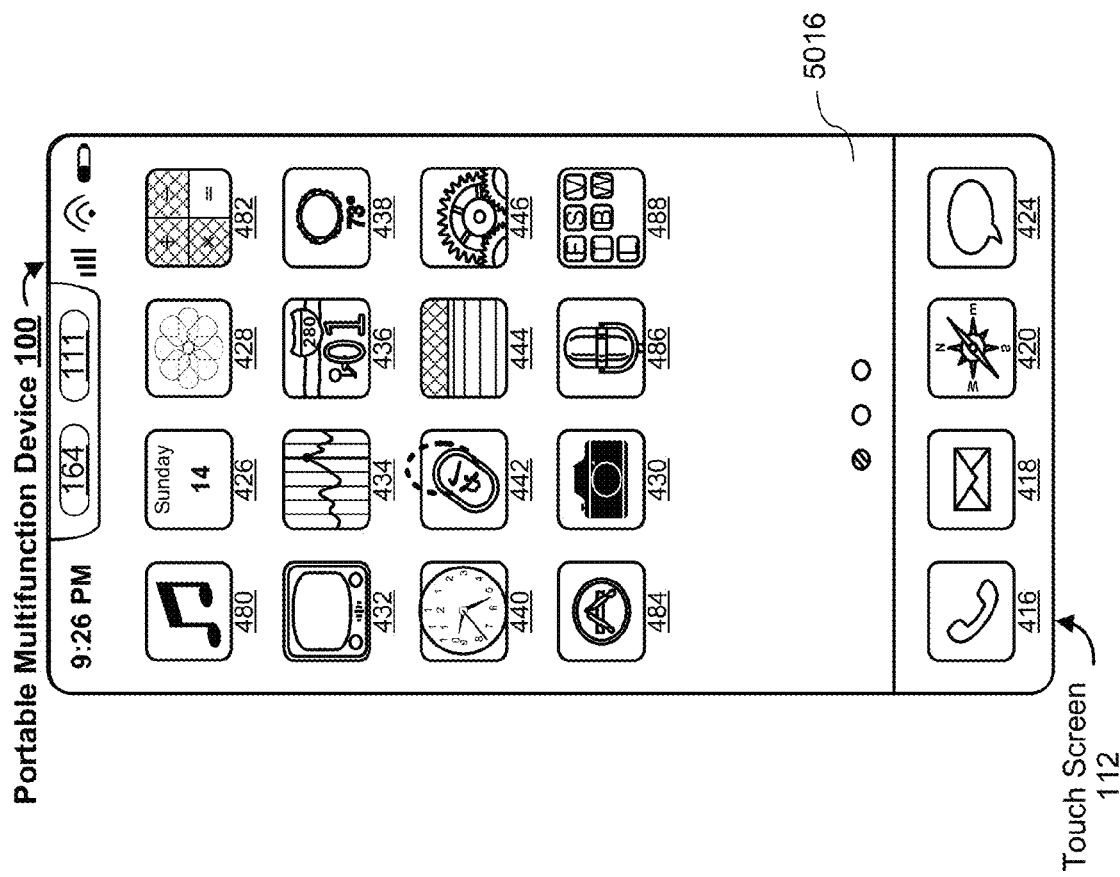
Figure 5C:
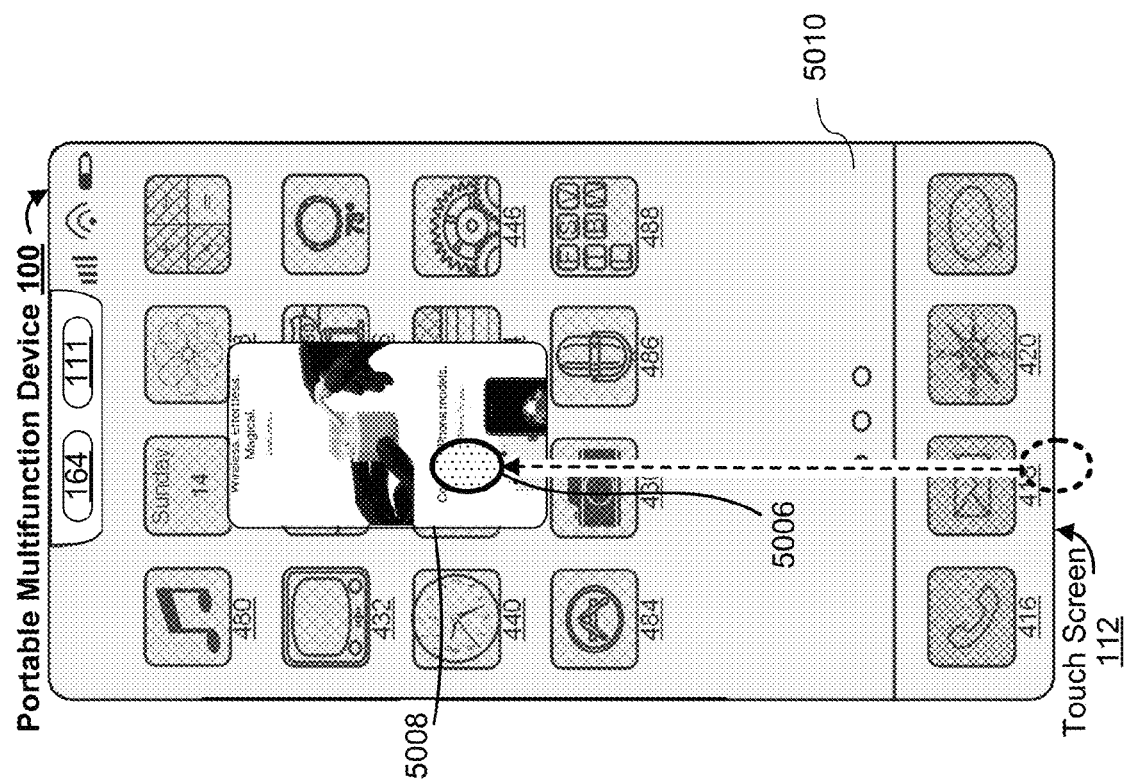
Figure 5E:
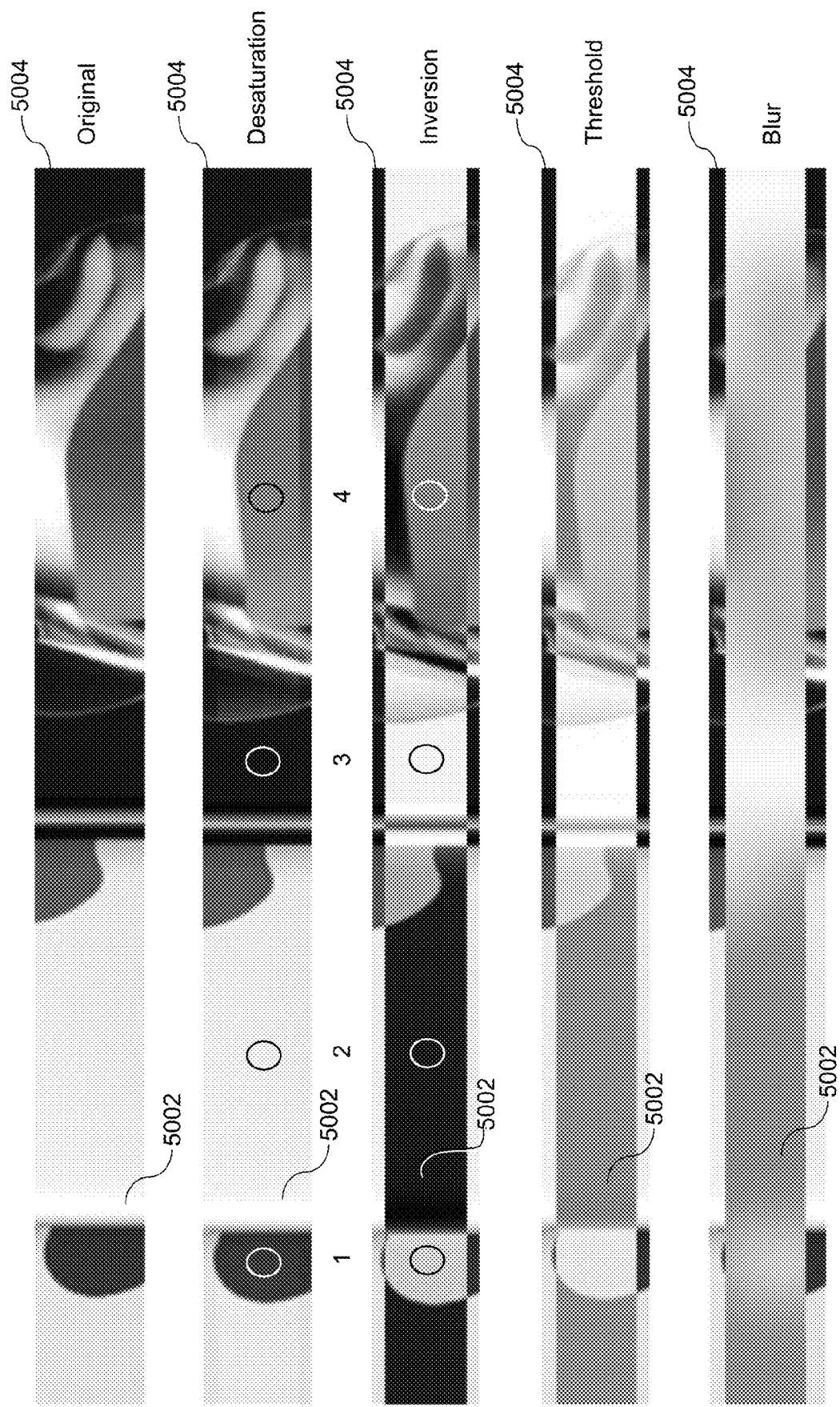
FIG. 5E illustrates filters used to generate the appearance of the affordance in FIGS. 5A-5D based on the underlying content, in accordance with some embodiments.
Figure 5F:
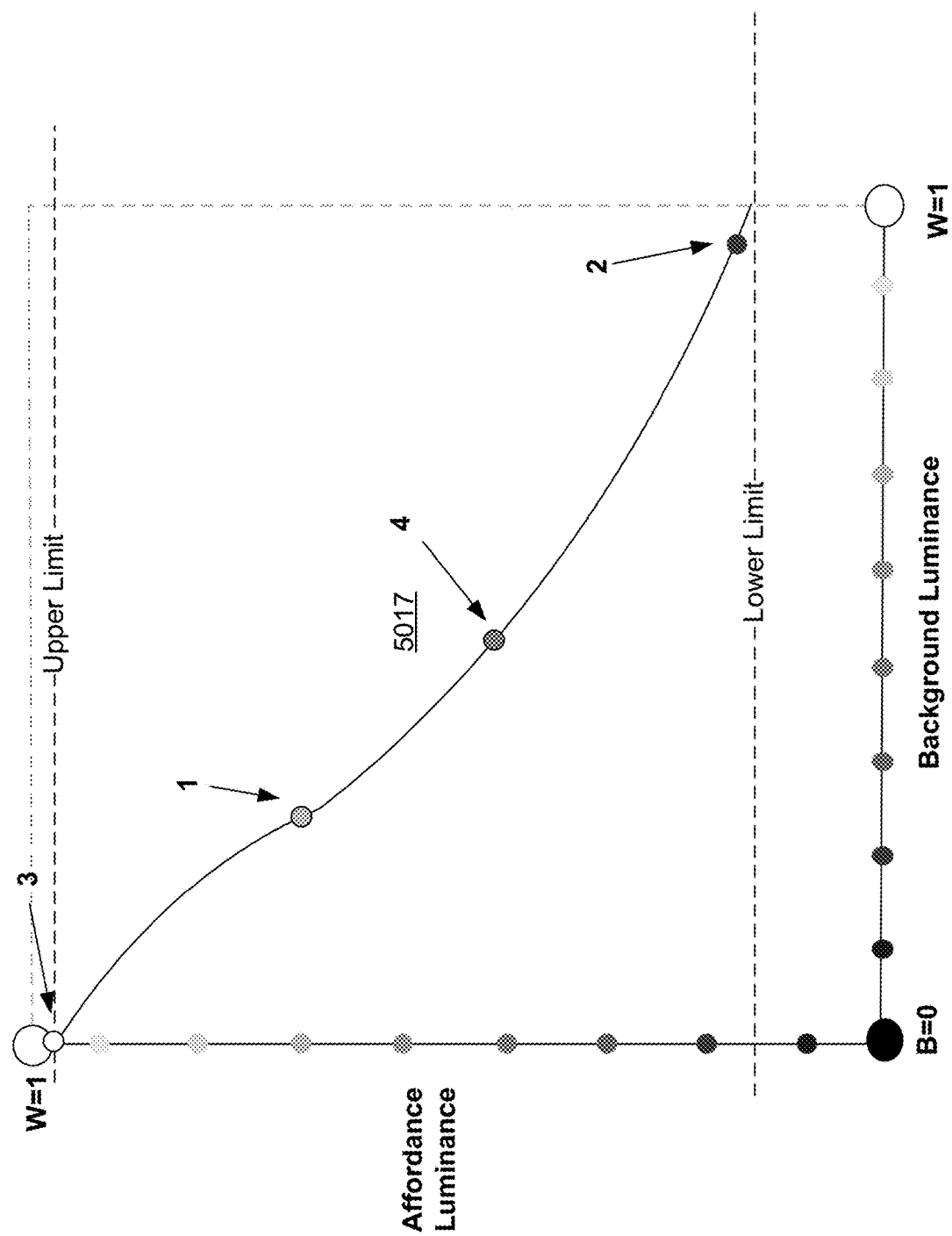
FIG. 5F illustrates an example inversion curve for performing the inversion shown in FIG. 5E, in accordance with some embodiments.
Figure 5H:
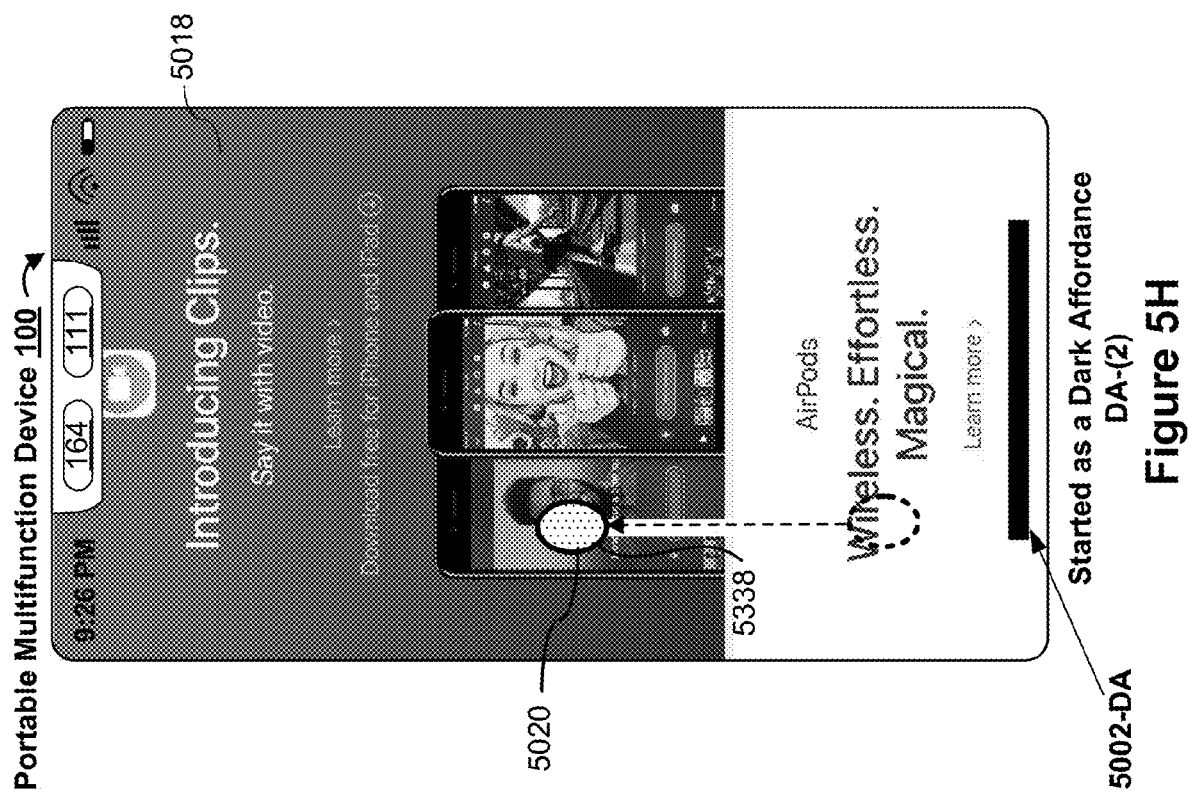
Figure 5G:
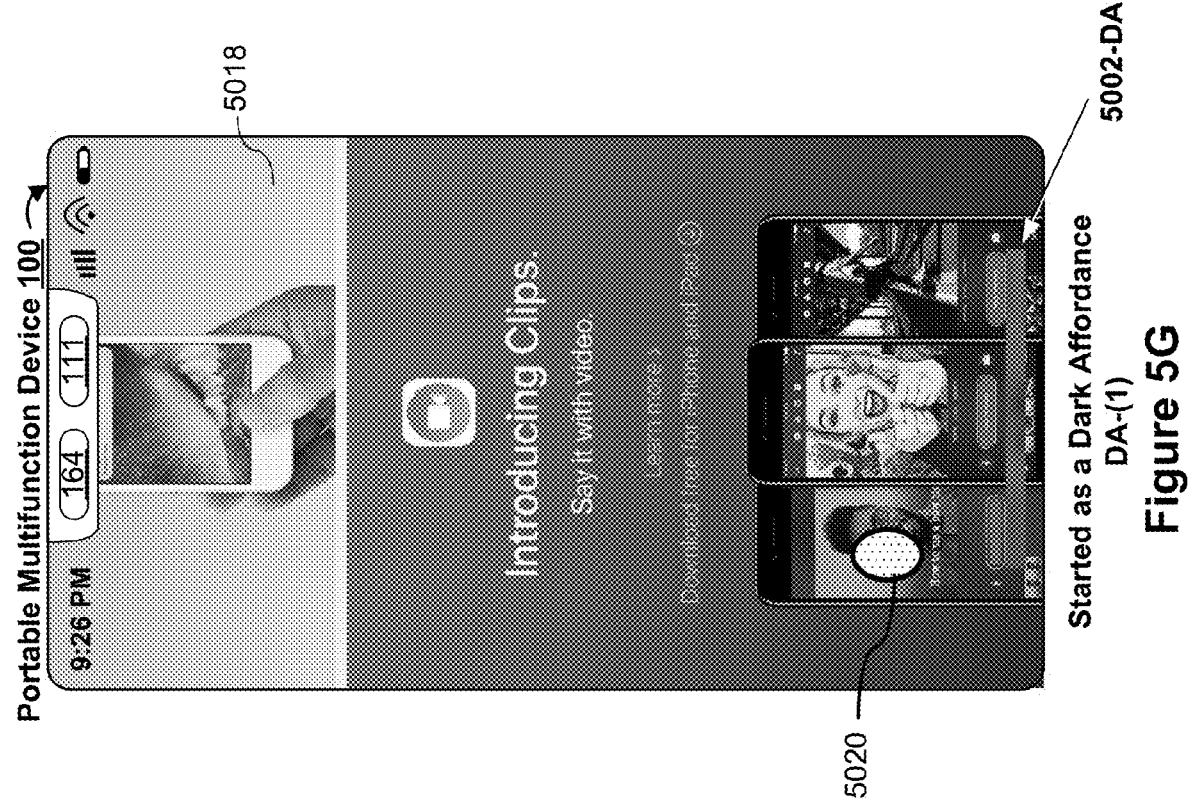
Figure 5J:
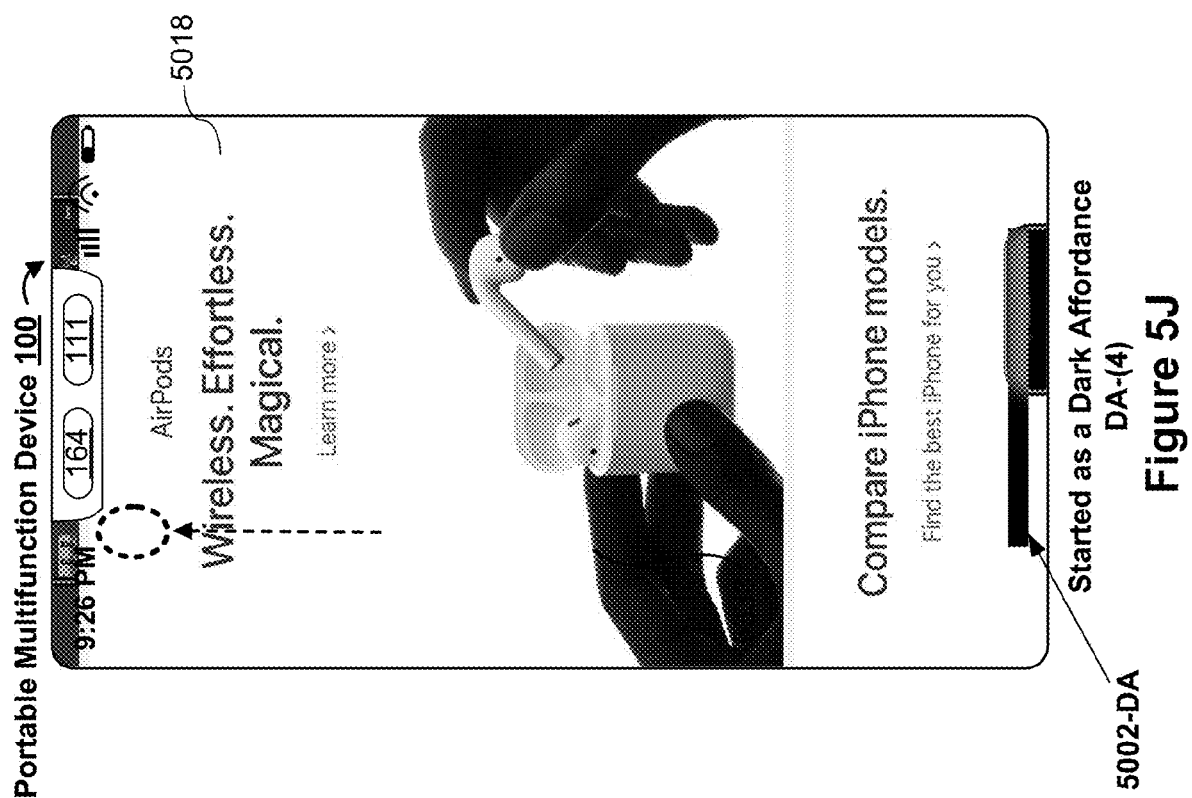
Figure 5I:
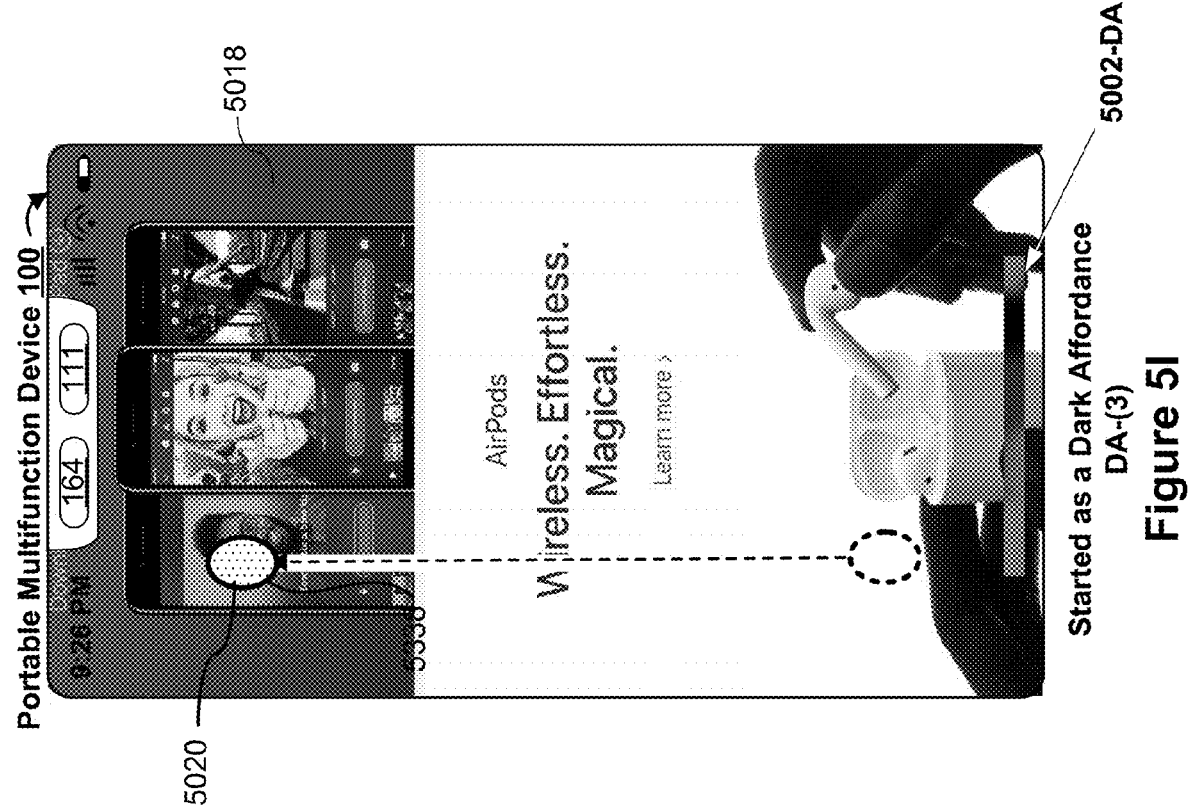
Figure 5N:
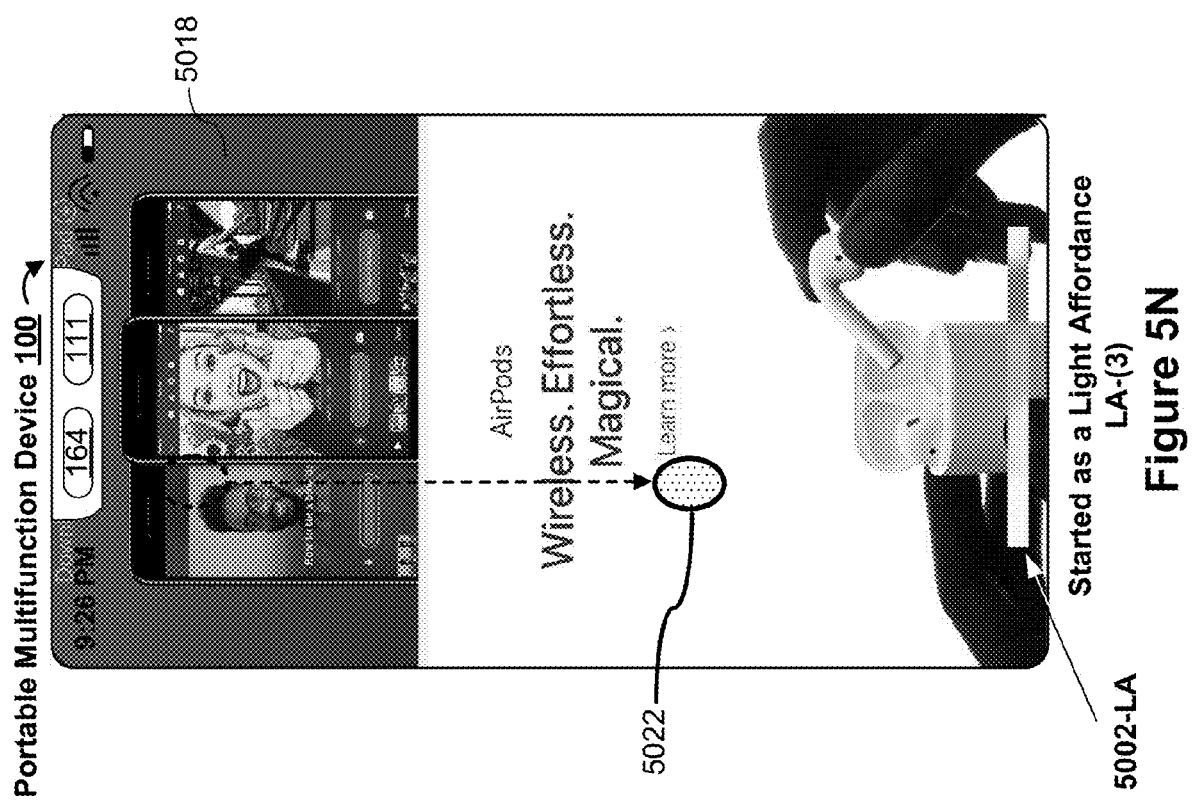
Figure 5M:
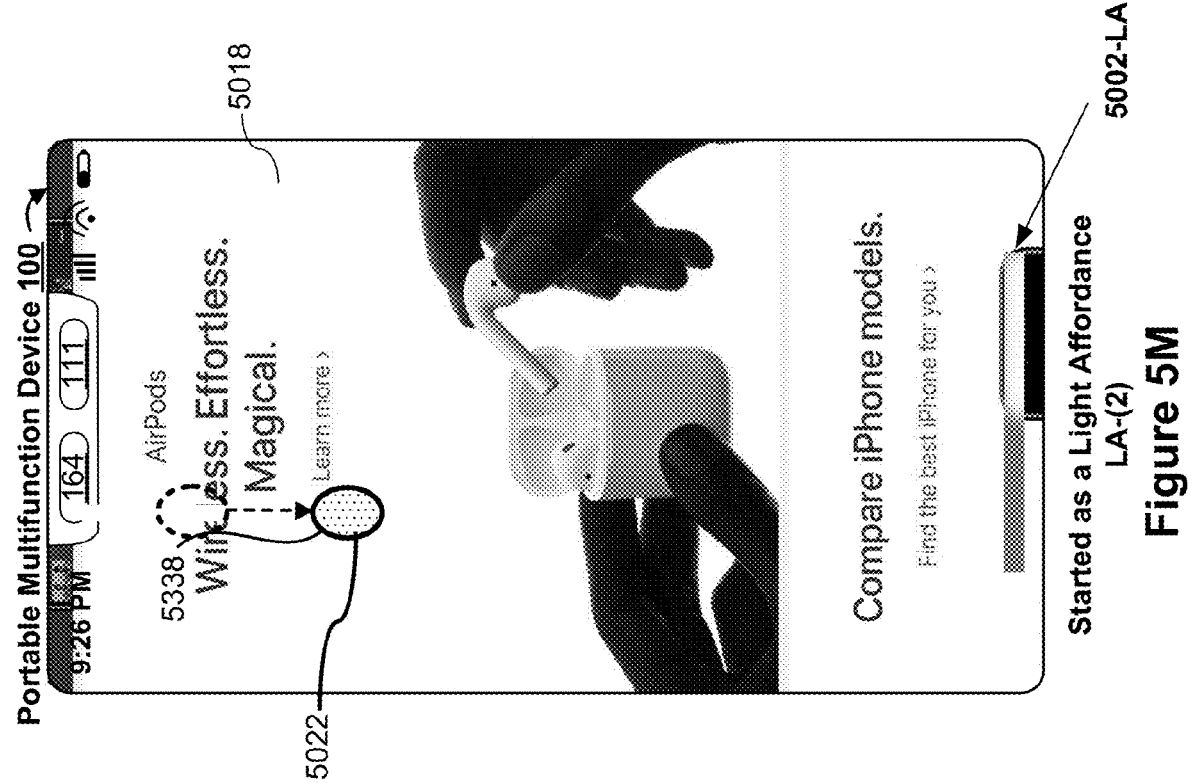
Figure 5S:
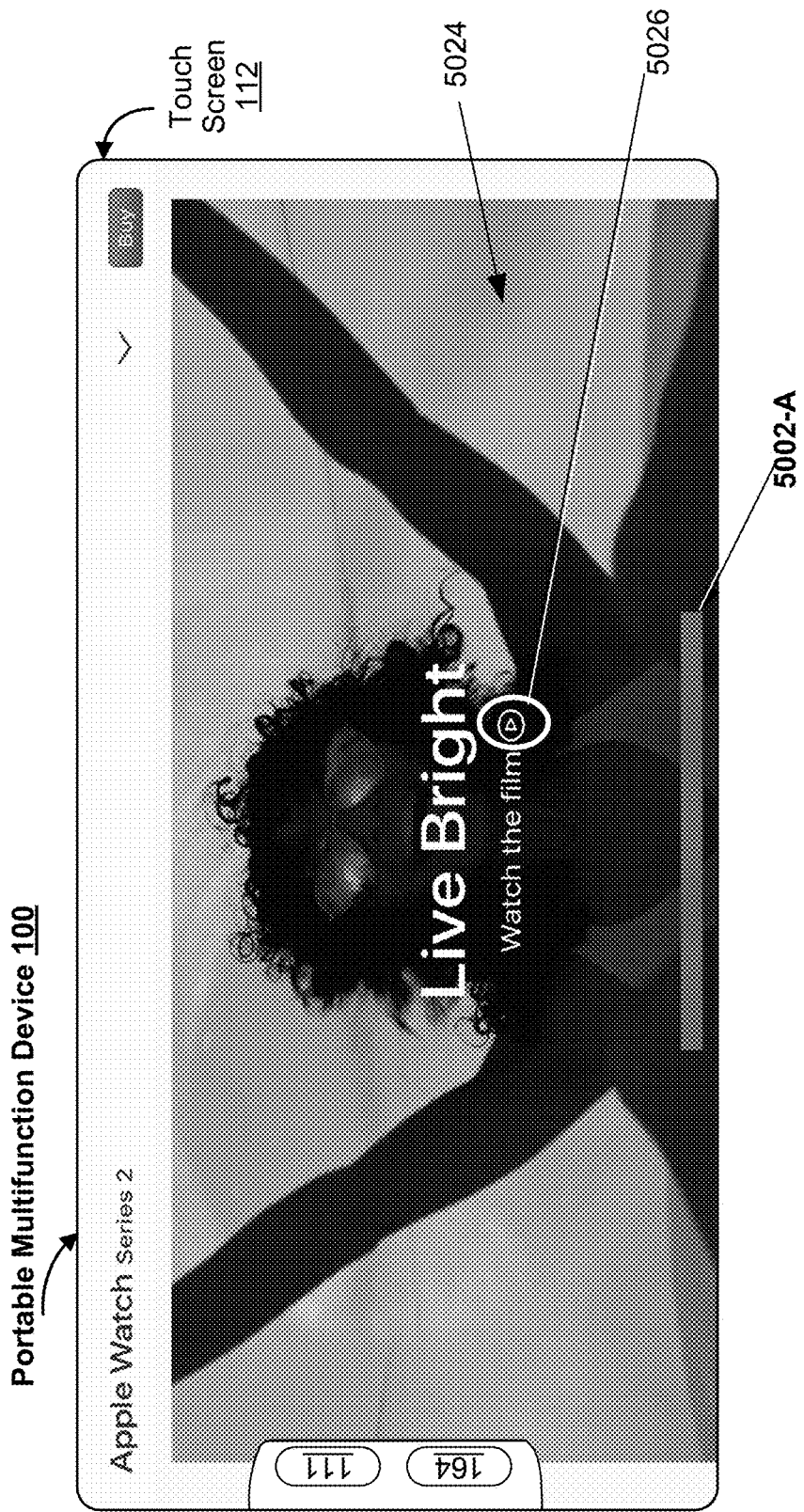
Figure 5T:
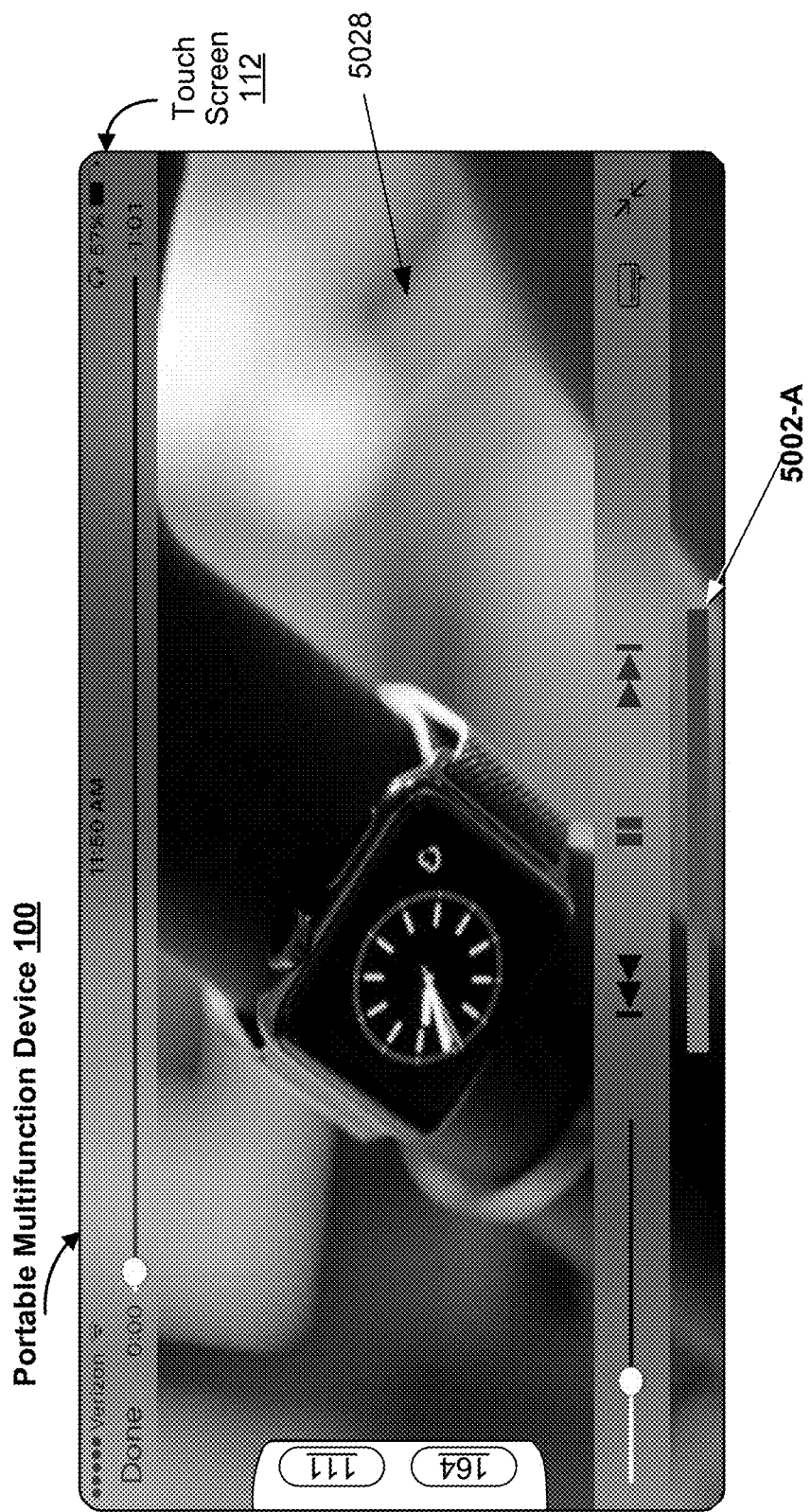
Figure 5U:
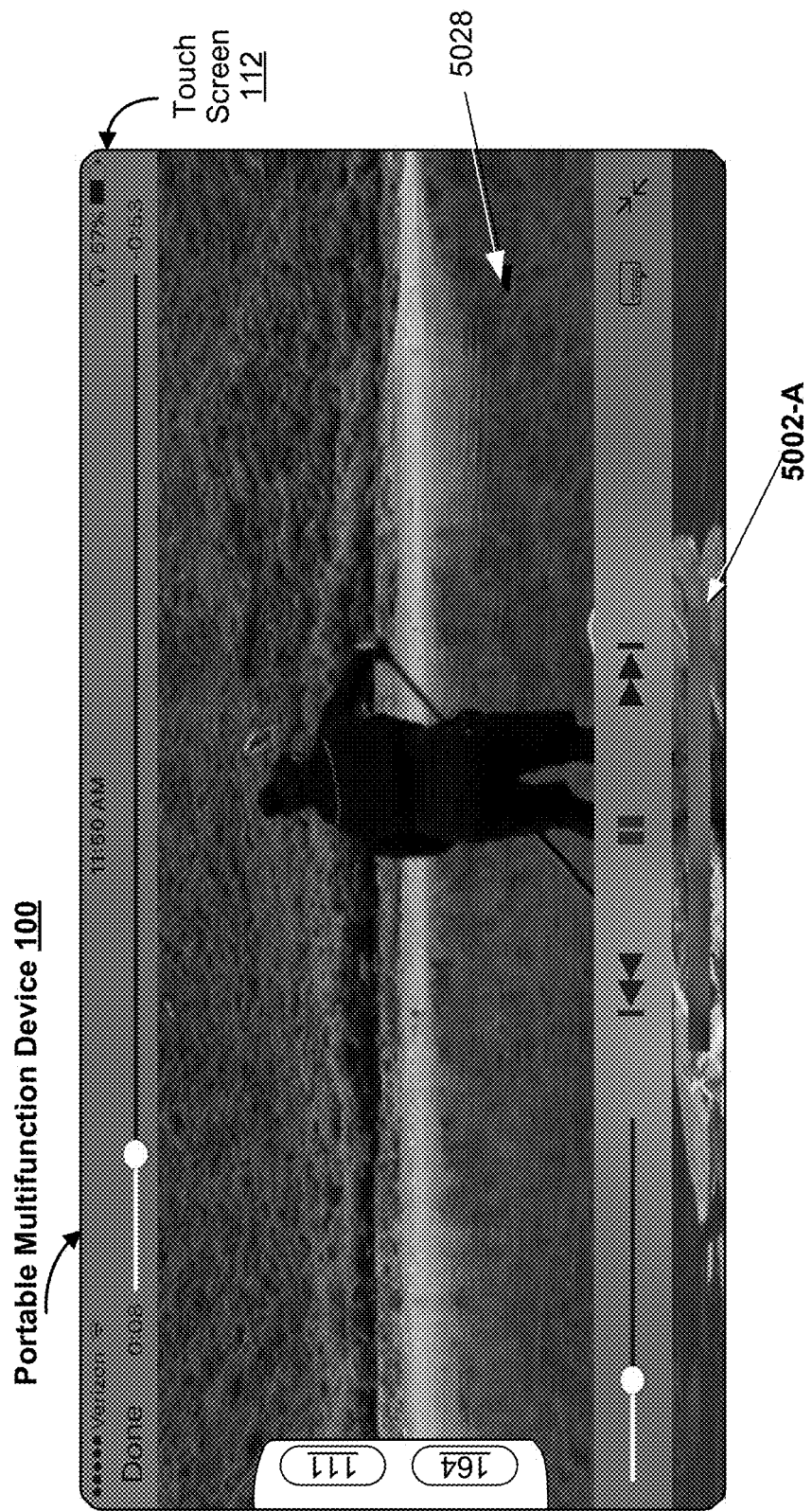
Figure 5V:
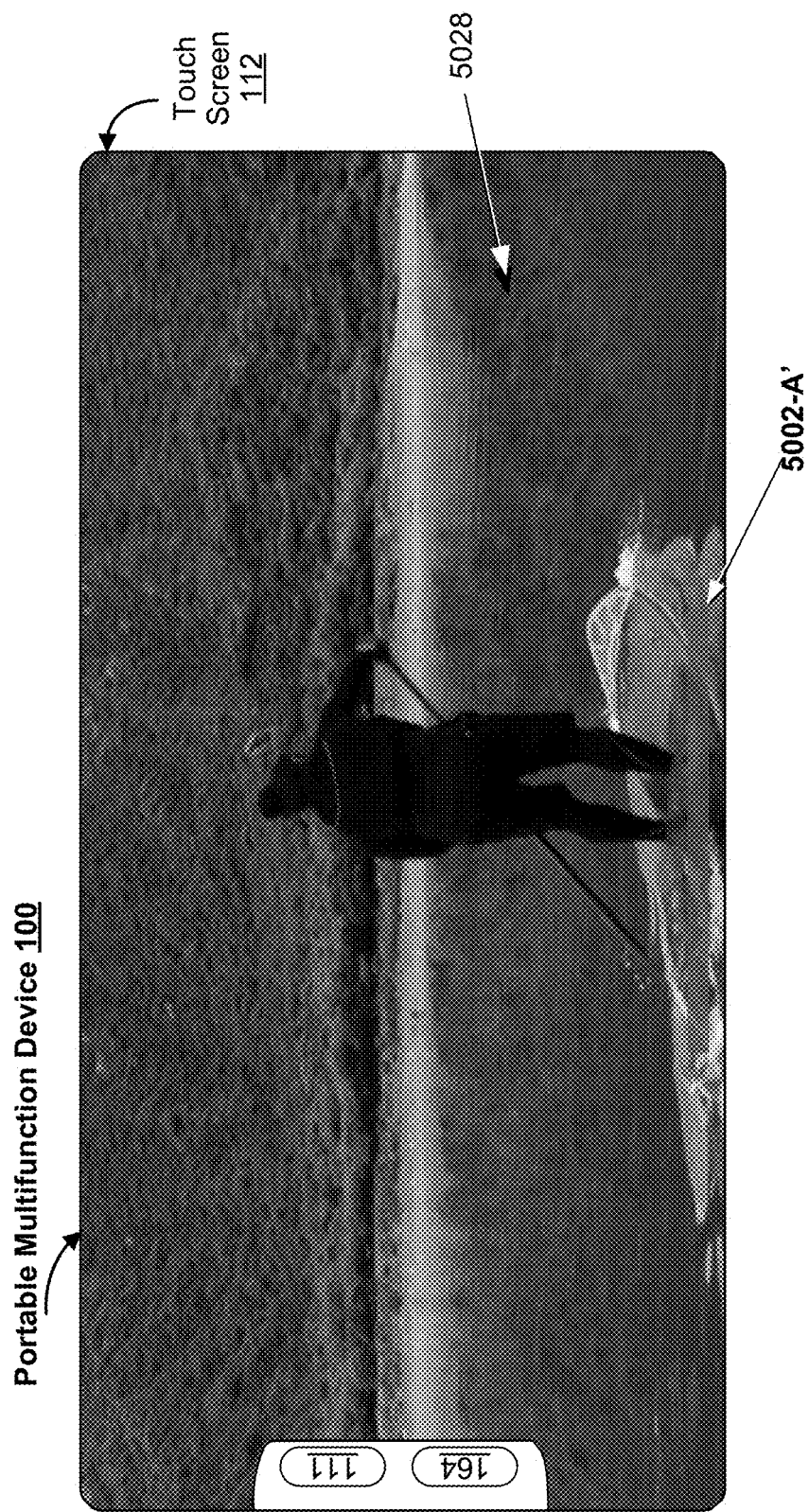
Figure 5W:
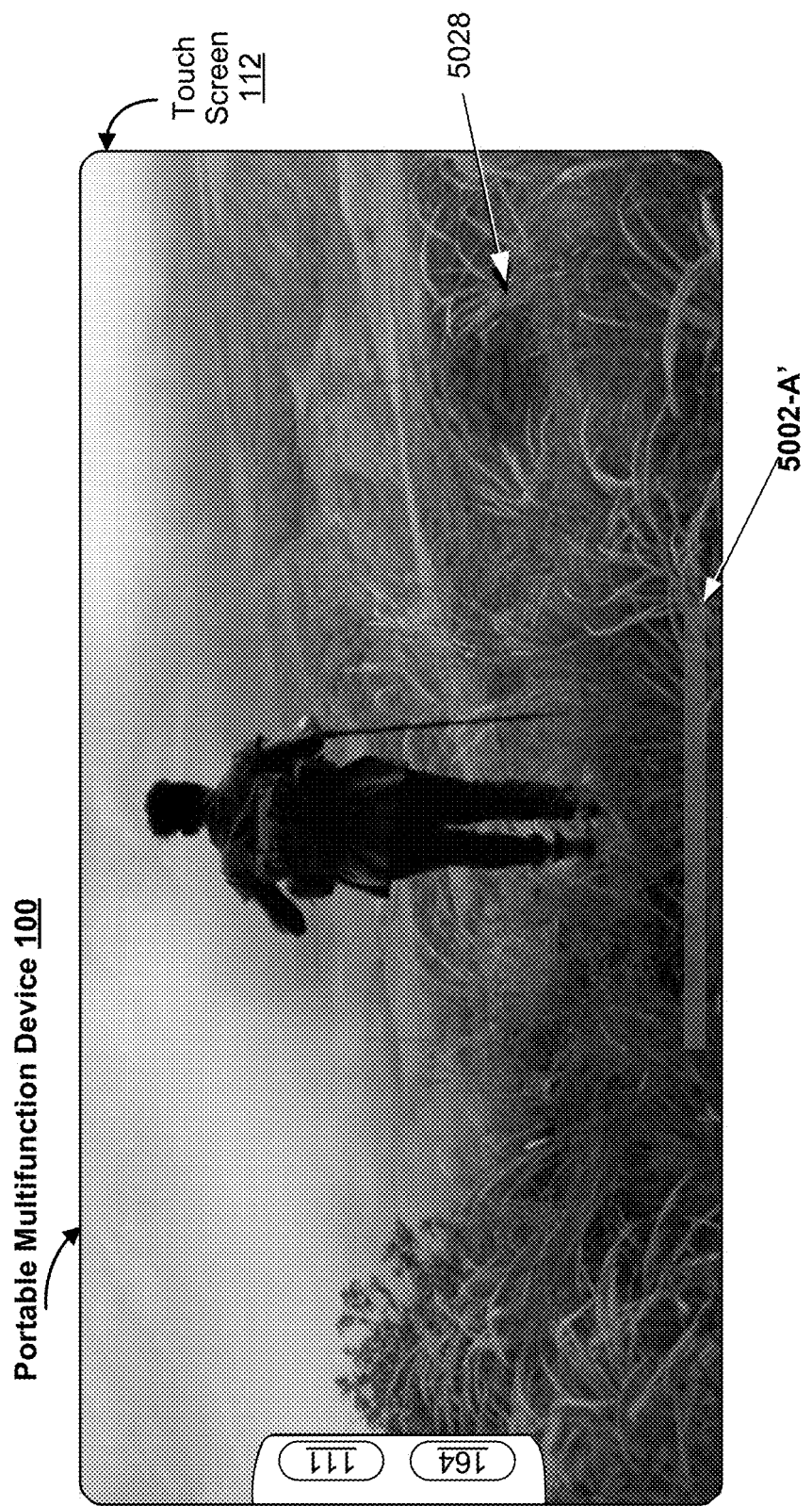
Figure 5X:

Exemplary user interfaces for applications operated on the electronic device include an affordance (e.g., home affordance 5002) that provides visual guidance to a user regarding the position of an edge region that a navigation gesture may be started, and, optionally, whether navigation is restricted in the current operating mode of the currently displayed application (e.g., absence of the home affordance indicates that the navigation is limited, and that a confirmation input or an enhanced navigation gesture (e.g., a press input followed by an upward swipe, or a touch-hold input followed by an upward swipe) is required to navigate between user interfaces (e.g., as illustrated in FIGS. 5X-5AA, where an initial input is required to redisplay the affordance and then a subsequent navigation gesture can be recognized)). In some embodiments, the home affordance is not activatable or responsive to touch-inputs directly, e.g., in a manner that is similar to a virtual button. In some embodiments, the home affordance or another affordance implemented using the methods described herein are responsive to a touch input that includes a contact directly on the affordance.

FIG. 5A illustrates a web browsing user interface showing content of a webpage 5004. Home affordance 5002 is displayed overlaying a portion of the content that is displayed near the bottom edge of the touch-screen 112. The user interface navigation process is activated by contact 5006 that starts at a location below, on, or near home affordance 5002, and travels upwards from the bottom of the screen, as shown in FIGS. 5A-5B.

In FIG. 5B, the web browsing user interface is replaced by card 5008 that represents the web browser user interface in FIG. 5A. As the input moves upwards on the screen, in FIGS. 5A-5C, card 5008 shrinks dynamically, revealing a blurred view 5010 of the home screen in the background. In some embodiments, the amount of blurring applied to the home screen dynamically changes in accordance with the distance of contact 5006 from the bottom of the screen.

In some embodiments, as shown in FIG. 5B, when the user interface navigation process is activated by the input by contact 5006, home affordance 5002 ceases to be displayed (e.g., home affordance 5006 is not directly manipulatable by touch inputs, and ceases to be displayed when it has accomplished its purpose for providing visual guidance to the user regarding the navigation gesture). When card 5008 is sufficiently small in size, other cards (e.g., cards 5012 and 5014, representing a system control panel user interface and a user interface of a recently open application, respectively) are displayed next to card 5008. Optionally, termination of the input (e.g., lift-off of contact 5006) when multiple cards are displayed, causes the device to go into the multitasking mode (e.g., display the application-switcher user interface that allows the user to select an application to replace the web browser application as the foreground application).

In FIG. 5C, when contact 5006 continues to move upward and predefined home navigation criteria are met (e.g., predefined characteristics (e.g., location, speed, etc.) of contact 5006 met predefined thresholds), other cards on the screen cease to be displayed, and only card 5008 remains on the screen. When the input is terminated (e.g., lift-off of contact 5006 is detected) while only card 5008 is displayed (e.g., a user interface state analogous to that illustrated in FIG. 5C), the device displays the home screen 5016, as shown in FIG. 5D (e.g., the dotted oval shows the lift-off location of contact 5006). When home screen 6016 is displayed on the touch-screen 112, home affordance 5002 is not displayed on the touch-screen.

As the need to dismiss a currently displayed user interface and go to the home screen exists in many contexts (e.g., when displaying different applications or other system-level user interfaces (e.g., a notification center user interface, a coversheet user interface, a control panel user interface, etc.)), home affordance 5002 needs to be displayed over all kinds of backgrounds, which may also change spontaneously or in response to user manipulation, and both instantaneously and over time. In addition, a user is given a greater degree of latitude in deciding where along the bottom edge region of the touch-screen to start the navigation gesture, therefore, home affordance 5002 is designed to have a large horizontal span to indicate the expansiveness of the reactive region for the gesture, and a relatively small width to avoid over cluttering the screen and creating unnecessary distraction to the user. As a result, the portion of content underlying home affordance 5002 may include variations in color and luminance, and other display properties, in different parts of the portion of content, even if the underlying content is static over time. Therefore, in some embodiments, the appearance of each sub-portion (e.g., each pixel or each small cluster of pixels) of the affordance is separately determined based on the appearance of the content directly underlying that sub-portion of the affordance (and, optionally, the appearance of the content that extends slightly outside of the boundary of that sub-portion of the affordance (e.g., through a blurring or averaging effect applied on the content or affordance)). As shown in FIG. 5A, home affordance 5002 is displayed over a portion of content 5004 in the webpage. That portion of content includes regions with different levels of luminance, and the resulting home affordance 5002 also includes variations in luminance along its length (e.g., the horizontal extent).

In some embodiments, as shown in FIG. 5E, a number of image processing filters are applied (e.g., sequentially, or without restriction on the ordering of the filters) to the background content underlying the affordance to determine the appearance of the affordance. For example, an original full-colored image of the content is desaturated to obtain a luminance map of the content. The luminance of the content is inverted (e.g., in accordance with predefined inversion relationship between the luminance value of the background and the luminance value of the affordance (e.g., one of the inversion relationships shown in FIGS. 5F, 5R, SAE, etc.)) to obtain the luminance value of the affordance at each pixel of the affordance. The inversion relationship between the luminance of the affordance and the luminance of the underlying content is used as an example of a correspondence between the values of a chosen display property of the affordance and the underlying content. Other types of display properties, such as a gray value or a variant of the luminance may also be used in various embodiments.

As shown in FIG. 5E, the inversion creates a contrast in appearance between the affordance and the underlying content. When a portion of the underlying content is brighter (e.g., with higher luminance values), the corresponding portion of the affordance is darker (e.g., with lower luminance values). For example, the inversion performed on different portions of the desaturated background content with different luminance values (e.g., portions enclosed in the circles labeled 1, 2, 3, and 4 in the Desaturation strip) results in corresponding portions of the affordance with different luminance values (e.g., portions enclosed in the circles labeled 1, 2, 3, and 4 in the Inversion strip). FIG. 5F shows an example inversion curve that is used to generate the affordance luminance value from the corresponding background luminance value. The values for the corresponding portions of the background and affordance labeled with the circles in FIG. 5E are marked by circles labeled 1, 2, 3, 4, as well in FIG. 7F. The shade of the affordance is also reproduced in the circles labeled 1, 2, 3, 4 in FIG. 7F. In some embodiments, after the inversion of performed, a thresholding procedure is performed on the luminance values to reduce the dynamic range of the luminance values. For example, the luminance value of each pixel of the affordance is capped at 50% of a maximum luminance of the affordance to produce a more subdued look with lower internal visual contrast (e.g., comparing the affordance after the inversion and the affordance after the thresholding). In some embodiments, to further reduce the internal variations and contrast within the affordance, a blur filter is applied averaging over the variations in luminance across multiple nearby pixels in the content, and consequently the variations in luminance across multiple nearby pixels in the affordance. In the end, the resulting affordance has broad stroke variations in luminance that correspond to variations of luminance in the underlying content.

When generating an affordance that is salient against different backgrounds, even though a simple inversion of the luminance value would produce sufficient contrast in most cases, using the full luminance value range for the affordance often would result in a harsher look that may prove to be distracting to the user. Therefore, it is advantageous to constrain the affordance's luminance value range to a sub-range of the content's luminance value range. In addition, depending on the expected luminance level of the underlying content, the affordance's luminance range value is constrained to a "dark" affordance value range, or a "light" affordance value range, producing either a "dark" affordance or a "light" affordance. In some embodiments, the affordance appearance type (e.g., "dark" vs. "light") do not change after the affordance is initially displayed, even if the appearance of the underlying content changes from very dark to very light, or vice versa (as shown in FIGS. 5G-5P). In some embodiments, the affordance appearance type (e.g., "dark" vs. "light") do not change in response to instantaneous changes in content (e.g., temporary inversion of content luminance level on a short timescale), but does eventually change in response to more sustained changes in content (e.g., inversion of content luminance level that is maintained over a longer time scale). In some embodiments, the affordance appearance type (e.g., "light" or "dark" or the specific appearance value range of the affordance) is selected in accordance with an initial luminance level of the underlying content at the time when the affordance is first displayed, and the affordance maintains that affordance appearance type until a context-switching event occurs (e.g., switching between applications, switching between an application or a system user interface, or switching between two system user interface, etc.), and the affordance appearance type is redetermined based on the underlying content in the new context. As an example, FIG. 5R shows example inversion relationships for a "light" affordance and a "dark" affordance (e.g., the curves are labeled "LA" and "DA", respectively), where the content luminance value range (e.g., values along the horizontal axis) is the full range from black to white (e.g., [0, 1] for the gray value of grayscale images, or [0, 255] for the luminance value for color images, or [0, 100%] for the luminance or other analogous display properties), the affordance luminance value range (e.g., values along the vertical axis) are constrained in either the upper value range (e.g., the value range for the "light" affordance) or the lower value range (e.g., the value range for the "dark" affordance). In some embodiments, the two value ranges are non-overlapping (e.g., separated by a gap). As shown in FIG. 5R, both curves (e.g., curve LA, and curve DA) show that an increase in luminance of the content leads to a reduction in luminance of the affordance.

FIG. 5F illustrates an example luminance inversion curve 5017 for performing the inversion shown in FIG. 5E, in accordance with some embodiments. In this example, the value range of the affordance constrained between an upper limit and a lower limit, is more than half of the value range for the background, and does not include pure black (value=0) and pure white (e.g., value=1). In some embodiments, the inversion curve is continuous, and includes no continuities.

FIGS. 5G-5K illustrate changes in the appearance of an affordance (e.g., affordance 5002-DA) of a first affordance appearance type (e.g., a "dark" affordance type), in accordance with some embodiments. FIGS. 5G-5K illustrate scrolling of content 5018 shown in a web browser user interface displayed on the touch-screen 112. While content 5018 scrolls, the portion of the content that underlies affordance 5002-DA displayed near the bottom edge of the touch-screen changes. In other words, different portions of content 5018 are moved to underneath affordance 5002-DA during the scrolling of content 5018.

As shown in FIG. 5G, in some embodiments, when affordance 5002-DA is initially displayed (e.g., when the web browser application is opened, and the web browser interface is initially displayed with the content 5018), the overall luminance level of the portion of content 5018 is assessed, and a suitable affordance appearance type is selected for the affordance. In this particular example, the portion of content 5018 that underlies the affordance is relatively dark (e.g., the overall luminance level is below a predefined luminance threshold), the affordance appearance type (e.g., the "dark" affordance appearance type) that corresponds to the "darker" portion (e.g., range [0, 0.4]) of the affordance luminance value range is selected as the affordance appearance type for the affordance. The affordance is generated using the set of filters as shown in FIG. 5E, for example, and the inversion relationship that is used is that of the dark affordance appearance type (e.g., e.g., curve DA shown in FIG. 5R).

In FIG. 5H, a scroll input (e.g., by upward movement of contact 5020 across the touch-screen) that started outside of (e.g., above) the reactive region of the user interface navigation gesture (e.g., the home/multitasking gesture by contact 5006, as shown in FIGS. 5A-5D) is detected on the touch-screen. The scroll input causes content 5018 of the webpage to scroll upward and causing a previously undisplayed portion of content 5018 to arrive underneath affordance 5002-DA. At the moment depicted in FIG. 5H, the portion of content 5018 directly underlying affordance 5002-DA is completely white (e.g., with luminance value of 1 or 100%), correspondingly, the luminance value of affordance 5002-DA is completely black (e.g., with luminance value of 0 or 0%), as determined based on the inversion relationship for the dark affordance appearance type (e.g., as depicted by curve DA in FIG. 5R).

FIGS. 5I-5K illustrate that, with a continuation of the scroll input (e.g., continued upward movement of contact 5020, followed by lift-off of contact 5020 with a final speed), content 5018 scrolls upward underneath affordance 5002-DA. The appearance of affordance 5002-DA changes in accordance with the portion of content 5002-DA that is currently underlying affordance 5002-DA. The luminance of affordance 5002-DA is determined based on the inversion relationship for the dark affordance appearance type (e.g., as depicted by curve DA in FIG. 5R).

In particular, at the moment depicted in FIG. 5J, the portion of content 5018 directly underlying affordance 5002-DA is completely white (e.g., with luminance value of 1 or 100%) on the left side, and completely black (e.g., with luminance value of 0 or 0%) on the right side, correspondingly, half of affordance 5002-DA on the left is completely black (as consistent with the case shown in FIG. 5H), and half of affordance 5002-DA on the right is not completely white. Instead, the right half of affordance 5002-DA is gray (e.g., with an affordance luminance value that is greater than 0 (e.g., 0.4)), as determined based on the inversion relationship for the dark affordance appearance type (e.g., as depicted by curve DA in FIG. 5R). In other words, the luminance value range of the dark affordance (e.g., 5002-DA) is constrained to a range below a maximum luminance threshold value (e.g., 0.4).

FIGS. 5L-5P illustrate changes in the appearance of an affordance of a second affordance appearance type (e.g., a "light" affordance type), in accordance with some embodiments.

FIGS. 5L-5P illustrate scrolling of content 5018 shown in a web browser user interface displayed on the touch-screen 112. The scroll is a reversal of the scrolling that was depicted in FIGS. 5G-5K.

As shown in FIG. 5L, in some embodiments, when affordance 5002-LA is initially displayed (e.g., when the web browser application is opened, and the web browser interface is initially displayed with the content 5018), the overall luminance level of the portion of content 5018 is assessed, and a suitable affordance appearance type is selected for the affordance. In this particular example, the portion of content 5018 that underlies the affordance is relatively bright (e.g., overall luminance level is above a predefined luminance threshold), the affordance appearance type (e.g., the "light" affordance appearance type) that corresponds to the "lighter" portion (e.g., range [0.6, 1]) of the affordance luminance value range is selected as the affordance appearance type for the affordance. The affordance is generated using the set of filters as shown in FIG. 5E, for example, and the inversion relationship that is used is that of the light affordance (e.g., e.g., curve LA shown in FIG. 5R).

In FIGS. 5L-5M, a scroll input (e.g., by downward movement of contact 5022 across the touch-screen) that started outside of (e.g., above) the reactive region of the user interface navigation gesture (e.g., the home/multitasking gesture by contact 5006, as shown in FIGS. 5A-5D) is detected on the touch-screen. The scroll input causes content 5018 of the webpage to scroll downward and causing upper portions of content 5018 to arrive underneath affordance 5002-LA.

At the moment depicted in FIG. 5M, the portion of content 5018 directly underlying affordance 5002-LA is completely white (e.g., with luminance value of 1 or 100%) on the left side, and completely black (e.g., with luminance value of 0 or 0%) on the right side, correspondingly, half of affordance 5002-LA on the right is completely white, and half of affordance 5002-LA on the left is not completely black. Instead, the left half of affordance 5002-LA is gray (e.g., with luminance value that is greater than 0 (e.g., 0.6)), as determined based on the inversion relationship for the light affordance appearance type (e.g., as depicted by curve LA in FIG. 5R). In other words, the affordance luminance value range of the light affordance is constrained to a range above a minimum luminance threshold (e.g., 0.6). In some embodiments, as depicted in FIGS. 5J and 5M, for the same background, the overall appearance of the dark affordance 5002-DA is darker than the overall appearance of the light affordance 5002-LA.

FIGS. 5N-5P illustrate that, with a continuation of the scroll input (e.g., continued downward movement of contact 5022, followed by lift-off of contact 5022 with a final speed), content 5018 scrolls downward underneath affordance 5002-LA. The appearance of affordance 5002-LA changes in accordance with the portion of content 5002-LA that is currently underlying affordance 5002-DA. The luminance of affordance 5002-LA is determined based on the inversion relationship for the light affordance appearance type (e.g., as depicted by curve LA in FIG. 5R).

At the moment depicted in FIG. 5O, the portion of content 5018 directly underlying affordance 5002-LA is completely white (e.g., with luminance value of 1 or 100%), correspondingly, the luminance value of affordance 5002-LA is not completely black. Instead, affordance 5002-LA is gray (e.g., with luminance value that is greater than 0 (e.g., 0.6)), as determined based on the inversion relationship for the light affordance appearance type (e.g., as depicted by curve LA in FIG. 5R). In other words, the luminance value range of the light affordance is constrained to a range above a minimum luminance threshold value (e.g., 0.6).

FIG. 5Q illustrates the differences in the appearance of the affordance 5002 for the two types of affordance appearance types (e.g., LA and DA), given the same changes in the background (e.g., content 5018), in accordance with some embodiments.

FIG. 5Q lists the appearances of affordance 5002 for each of the states shown in FIGS. 5G-5P. The states are grouped into five groups, each corresponding to a respective state of content 5018 shown in the web browser user interface. For example, from the top to bottom, the five groups correspond to: (i) FIGS. 5G and 5P, (ii) FIGS. 5H and 5O, (iii) FIGS. 5I and 5N, (iv) FIGS. 5J and 5M, and (v) FIGS. 5K and 5L.

As shown in FIG. 5Q, for each group corresponding to a respective content state, the affordance (e.g., comparing the DA version and the LA version of affordance 5002 below the same content strip) has an overall darker appearance (e.g., lower overall luminance) for the dark affordance appearance type than for the light affordance appearance type.

FIG. 5R illustrates the value ranges and inversion relationships of a display property (e.g., luminance or gray value) of the affordance and the underlying content for a dark affordance appearance type and a light affordance appearance type, in accordance with some embodiments.

The differences in appearance shown in FIG. 5Q are also reflected in FIG. 5R, wherein the affordance luminance value range for the light affordance is completely above the affordance luminance value range for the dark affordance, and the two values ranges are optionally non-overlapping.

FIGS. 5S-5AA illustrate user interfaces that include an affordance with an appearance that is responsive to the changes in the appearance of the background and a change in an operating mode associated with the background user interface, in accordance with some embodiments.

In FIG. 5S, a web browser application is launched, and a web browser user interface 5024 is displayed on the touch-screen. In this example, the web browser user interface is displayed in a landscape orientation in accordance with an orientation of the device 100. Home affordance 5002 is displayed near the bottom edge of the touch-screen in a first state (e.g., fully visible state/high contrast state 5002-A). The affordance appearance type for affordance 5002 is optionally selected based on an initial overall luminance level of the portion of webpage content underlying affordance 5002.

FIGS. 5S-5T illustrate that, a media item (e.g., a movie clip "Live Bright") is selected for playback (e.g., a tap input by contact 5026 on a playback icon associated with the media item, in FIG. 5S). In response to the selection of the media item, a media player application is started and a user interface of the media player application (e.g., user interface 5028) is shown on the touch-screen. In FIG. 5T, the media-player application is operating in a first mode (e.g., a full-screen mode with displayed controls, or interactive mode). When the media playback is just started, user interface 5028 includes multiple control regions overlaid on the media playback region (e.g., media content occupying substantially all of the screen), the control regions including various controls such as a media scrubber, a "Done" button for closing the media player application and returning to the web browser application user interface 5024, a volume slider control, a rewind control, a pause/play control, and fast forward control. These controls are displayed initially over the media playback area because there is a higher likelihood that a user would want to adjust the default starting position or volume selected by the device, or return to the previous application, after first seeing how the media content appears or sounds. In some embodiments, when switching from the web browser user interface 5024 to the media player user interface 5028, a context switching event is registered by the device, and the affordance appearance type of affordance 5002 is redetermined based on the initial overall luminance level of the portion of media content that underlies affordance 5002 when the media playback is first started. Regardless of whether the affordance appearance type is redetermined, affordance 5002 is initially displayed in the fully visible state (e.g., a high contrast state) over user interface 5028.

FIG. 5U indicates that, during a first predetermined amount of time (e.g., 10 seconds) after the start of the media playback, the control regions remain visible over the media content, and affordance 5002 remains in the fully visible state (e.g., a full contrast state) over user interface 5028. During this period of time, the appearance of affordance 5002 is determined in accordance with a first set of rules. In some embodiments, the first set of rules includes a set of filters such as those shown in FIG. 5E, and an inversion relationship such as those shown in FIG. 5R, where a first set of parameters for the filters and/or the shape of the inversion curve(s) are optionally preselect for the first state of the affordance. In FIGS. 5S-5U, affordance 5002-A is a gray affordance with no color information, even though the underlying content is in full color.

In FIG. 5V, the first predetermined amount of time (e.g., 10 seconds) after the start of the media playback has expired. In response to expiration of the first predetermined amount of time, the control regions cease to be displayed over the media content. The fading of the control regions can occur instantaneously or over a short animation. The expiration of the first predetermined amount of time and/or the ceasation of the display of the control regions on the media player user interface indicates that the media player user interface is now operating in a second mode (e.g., a full-screen display mode without displayed controls, or media consumption mode). In addition, in response to expiration of the first predetermined amount of time the device determines the appearance of affordance 5002 in accordance with a second set of rules that are distinct from the first set of rules. In other words, the affordance is displayed in a second state (a semi-visible state/low contrast state 5002-A'). In some embodiments, the second set of rules includes a set of filters such as those shown in FIG. 5E, and an inversion relationship such as those shown in FIG. 5R, where a second set of parameters for the filters and/or the shape of the inversion curve(s) are optionally preselect for the second state (e.g., semi-visible state/low contrast state 5002-A') of the affordance 5002. In some embodiments, in the low contrast state, affordance 5002 maintains some of the colors of the underlying content. For example, instead of fully desaturating the underlying content to obtain the luminance map of the content, only 70% of the color values (e.g., RGB values) for each pixel are desaturated, and 30% of the color information for each pixel in the underlying content remain in the final appearance of the affordance. In some embodiments, a transparency level of the affordance is adjusted such that the affordance is not completely opaque, and some of the color information of the underlying content is transferred to the pixels of the affordance. In some embodiments, after the luminance inversion is performed, the remaining color saturation of the affordance is increased (e.g., by 30%) to make the affordance appear slightly more vibrant to blend in better with the background. The reduction in visibility or contrast for the second state of the affordance 5002 is in consideration of the reduced likelihood that the user would want to interact with any controls after the initial period of time after the media playback is first started. In some embodiments, transition from the first state to the second state is optionally a gradual and continuous transition over multiple intermediate states between the first state and the second state, as opposed to an abrupt and discrete transition. The gradual transition is less likely to distract the user from watching the media content.

As shown in FIGS. 5V-5W, while the affordance 5002 is in the second state (e.g., the semi-visible state/low contrast state 5002-A'), the appearance of the affordance 5002 changes in accordance with the changes in the content underlying the affordance, based on the second set of rules.

In FIG. 5X, after the affordance 5002 has been in the second state for a second predetermined amount of time (e.g., 5 seconds), the affordance 5002 transitions from the second state to an invisible state (e.g., referred to as a third state), or in other words, the affordance completely fades out and ceases to be displayed over the media content. In some embodiments, the transition from the second state to the third state is optionally a gradual and continuous transition over multiple intermediate states between the second state and the third state, as opposed to an abrupt and discrete transition. The gradual transition is less likely to distract the user from watching the media content.

Figure 5Y:
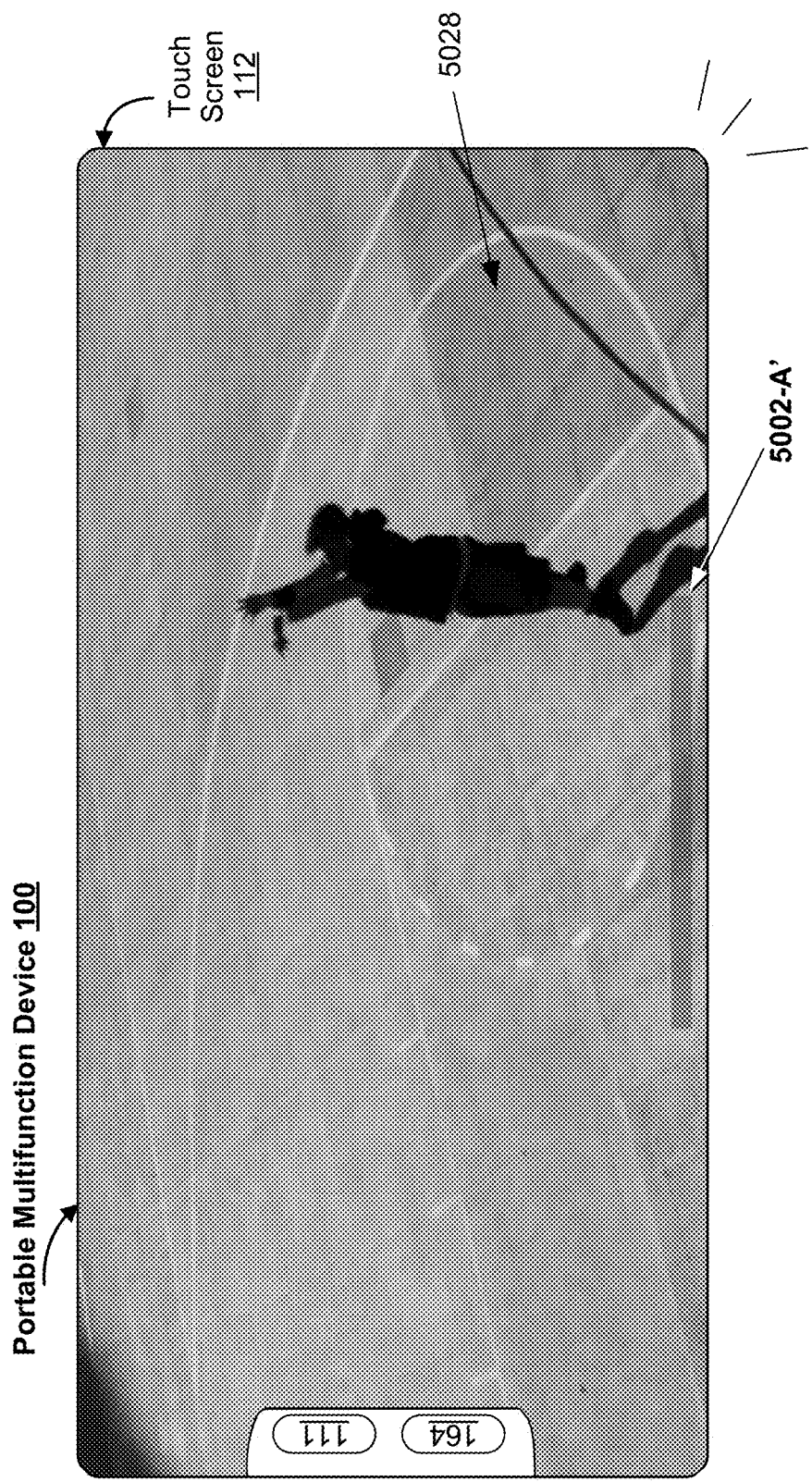

FIGS. 5Y-5AA illustrate that, after affordance 5002 is no longer displayed over the media content 5028, media playback continues until an input is detected (e.g., a movement of the device, a tap input or swipe input by a contact on the touch-screen, a contact near the bottom edge region of the display, etc.). In response to detecting the input, affordance 5002 is redisplayed over media content 5028.

As shown in FIG. 5Y, in response to a movement of device 100 (or other types of input, such as a tap, a swipe, or touch-down of a contact near the bottom edge region of the display), affordance 5002 is redisplayed (e.g., along with other control regions) over media content 5028 in the second state (e.g., semi-visible/low contrast state 5002-A'). In some embodiments, control regions are not redisplayed in response to this input, and the device continues to operate in the full-screen display mode of the media player application without displayed controls. In some embodiments, if another input (e.g., a tap input or swipe input) is not detected within a threshold amount of time, the affordance ceases to be displayed again. If the required input is detected within the threshold amount of time, the affordance is displayed in the first state again and media controls regions are also optionally redisplayed. The user interface is returned to the first operation mode of the media player application (e.g., full-screen playback mode with displayed controls, or interactive mode). Providing the affordance 5002 in the second state initially in response to a first input, as opposed to displaying the affordance 5002 in the first state and returning to the first operation mode immediately, provides some indication to the user regarding the location of the home affordance and the state of the user interface, but at the same time, takes into consideration that the input may be inadvertent and that the user does not really wish to be distracted from watching the media content. If the user's intent is to use the controls and/or the affordance 5002, a confirmation input (e.g., a sustained touch by the same contact for a threshold amount of time, a press input by the same contact with a threshold press intensity, or a second tap input by another contact) is required from the user.

Figure 5Z:
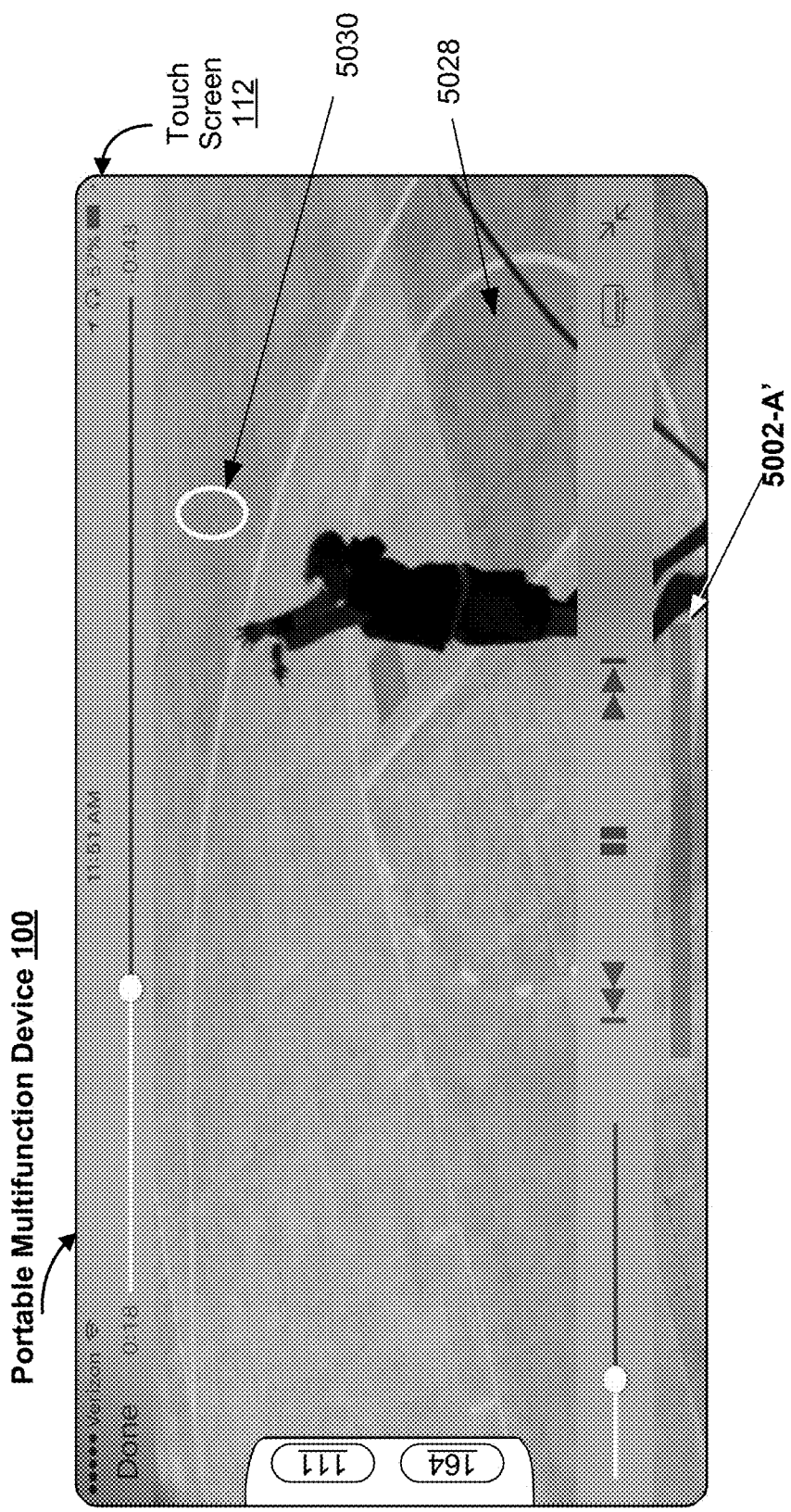
Figure 5A:
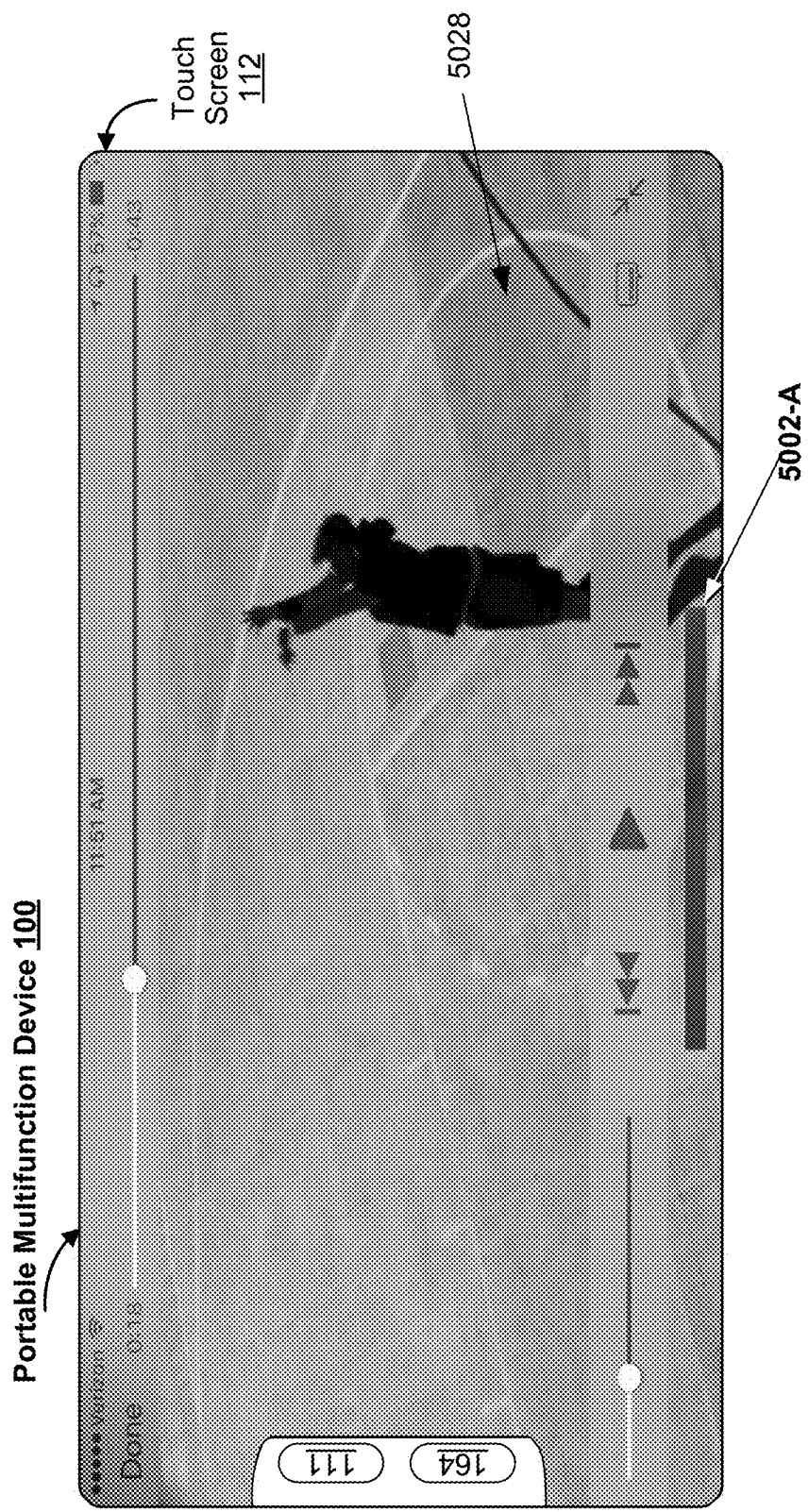
Figure 5A:
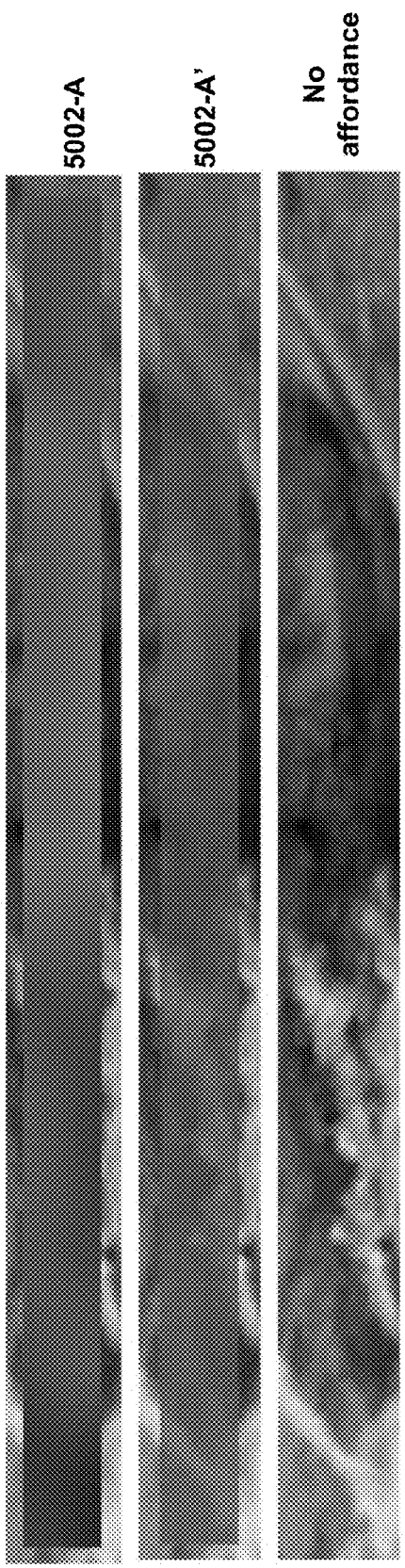
Figure 5A:
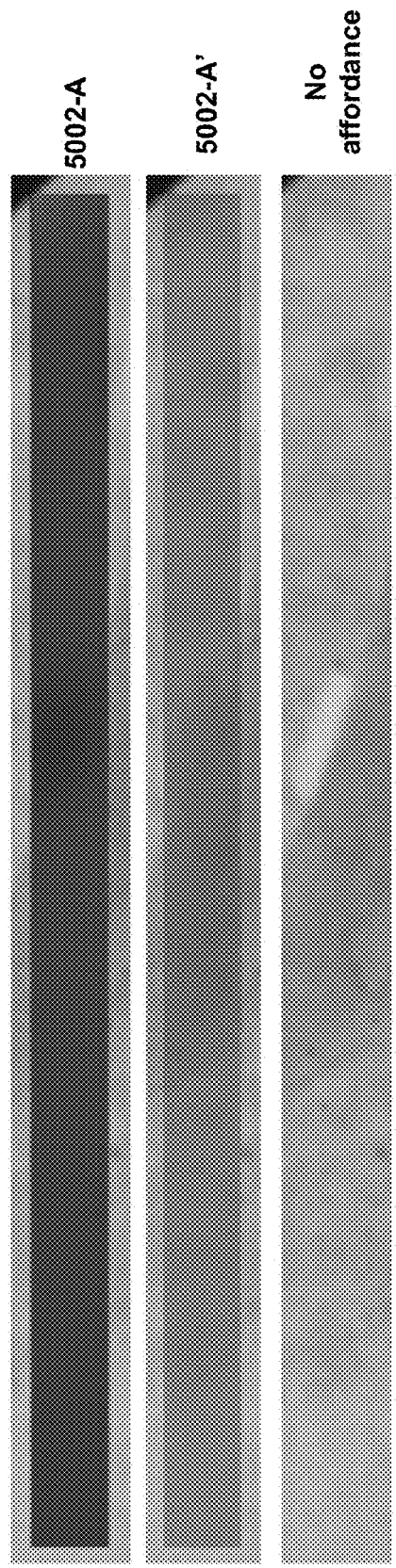
Figure 5A:
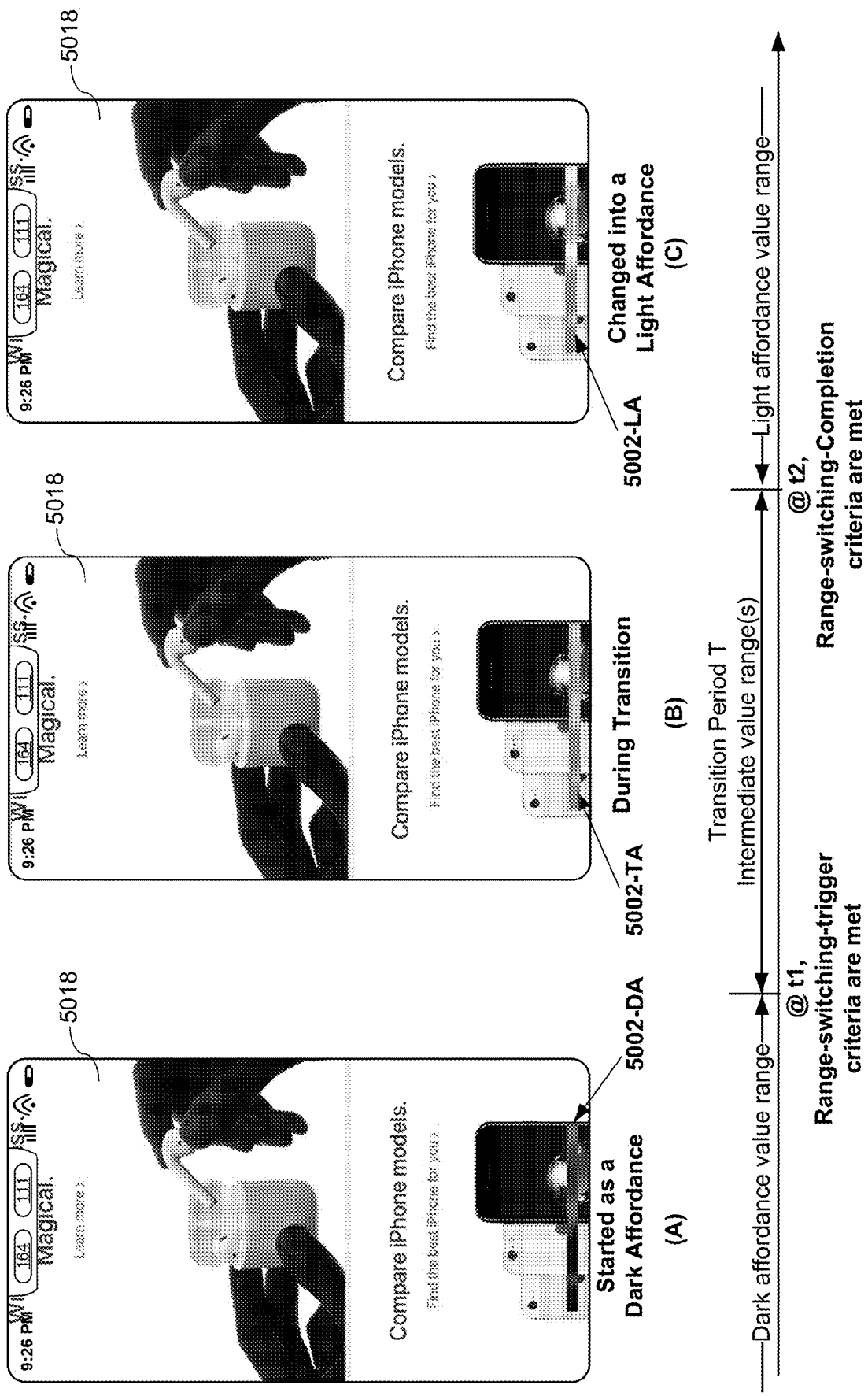
Figure 5A:
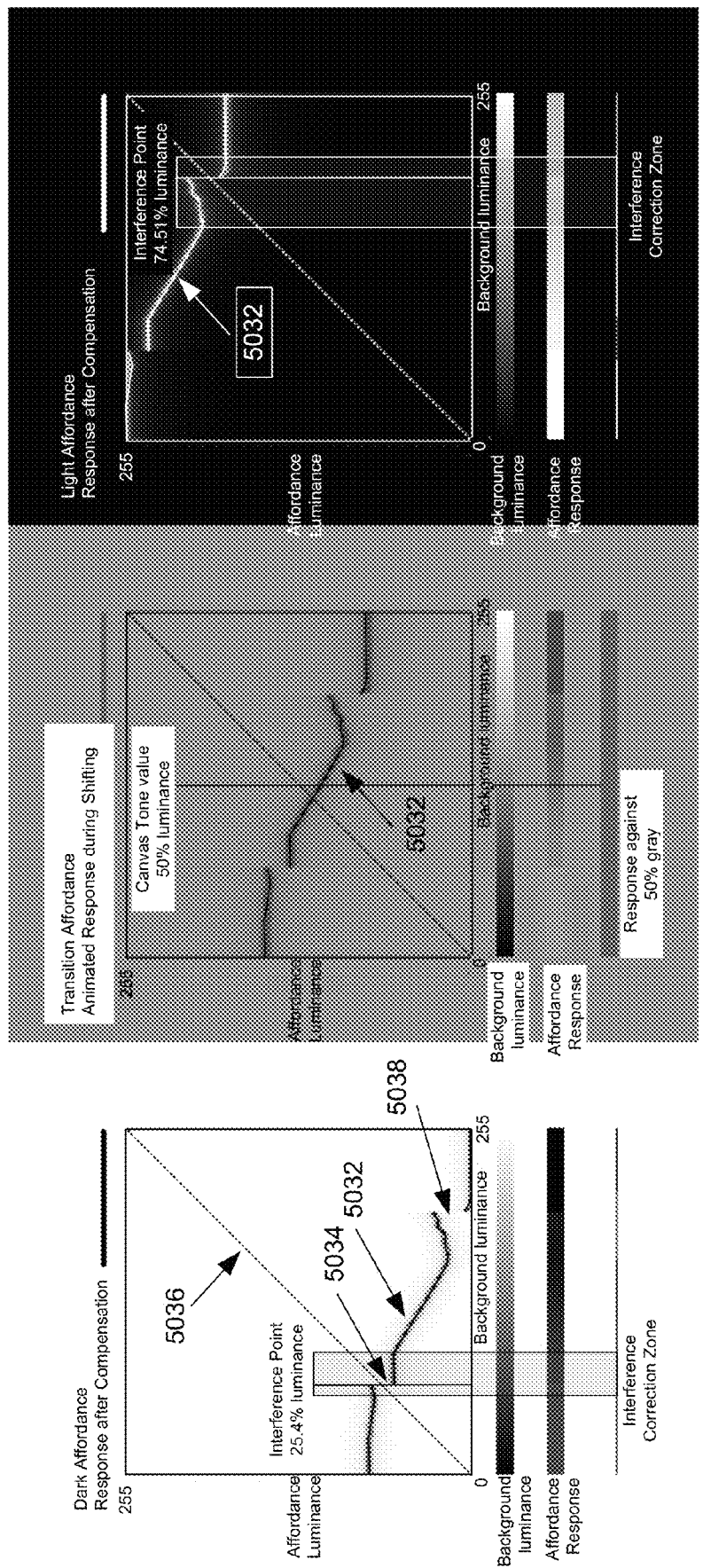
Figure 5A:
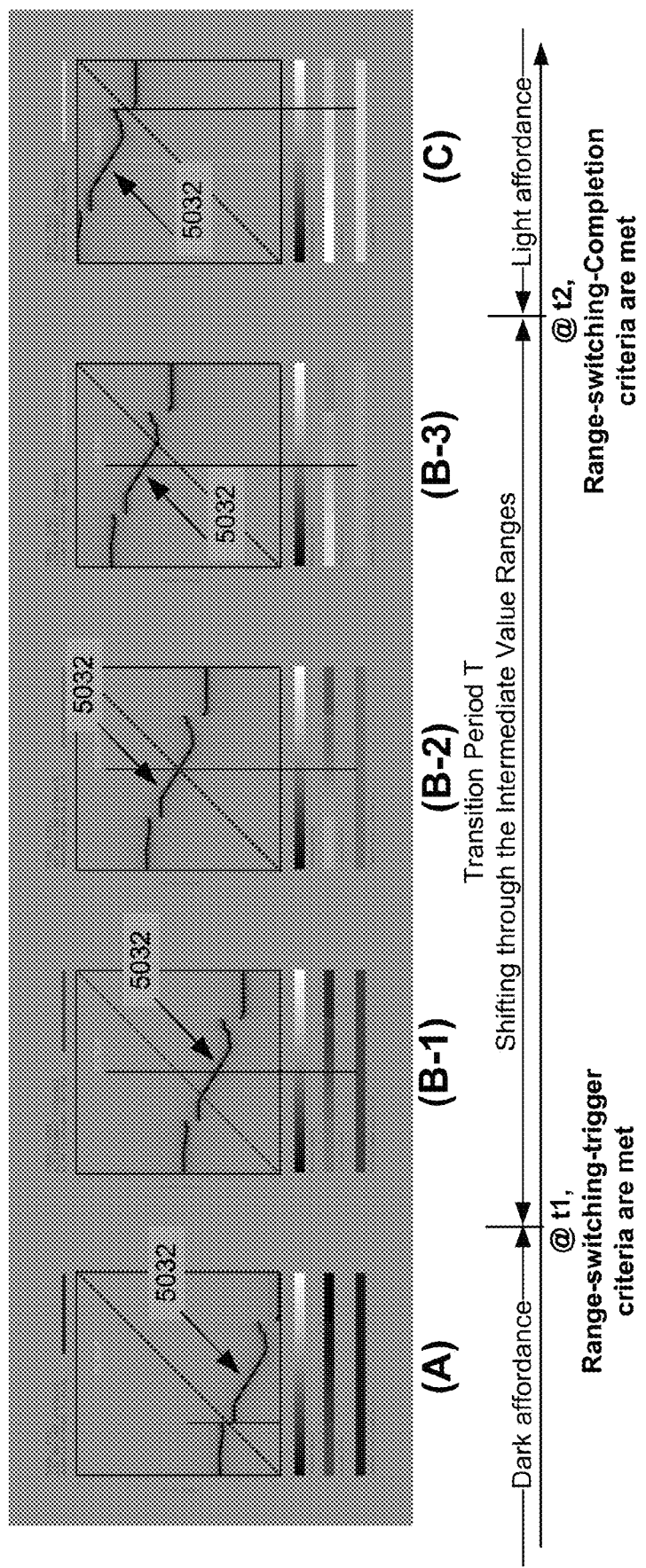
Figure 5A:
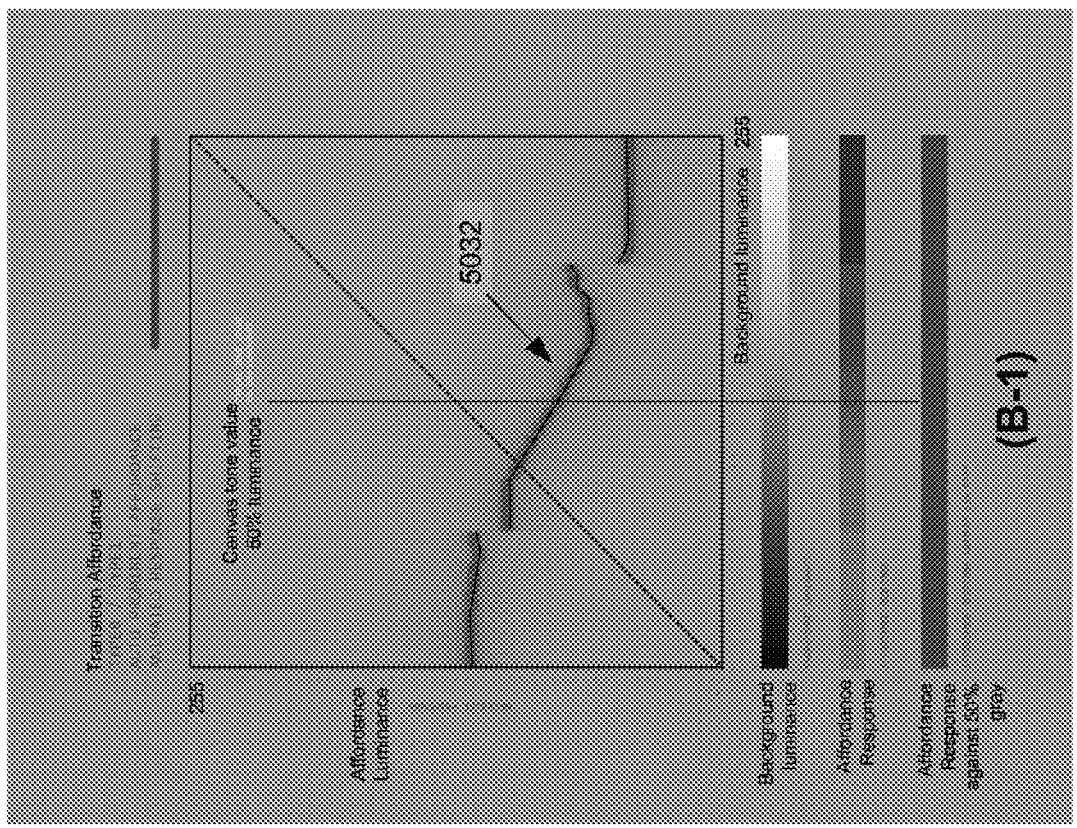
Figure 5A:
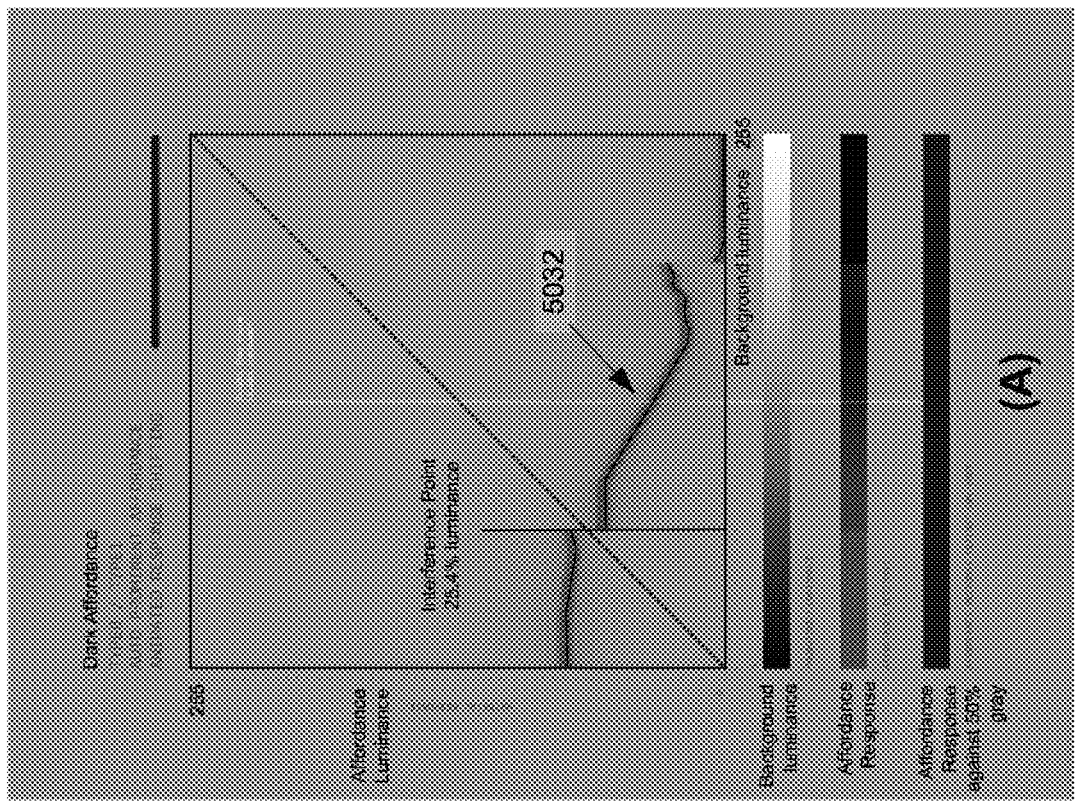
Figure 5A:
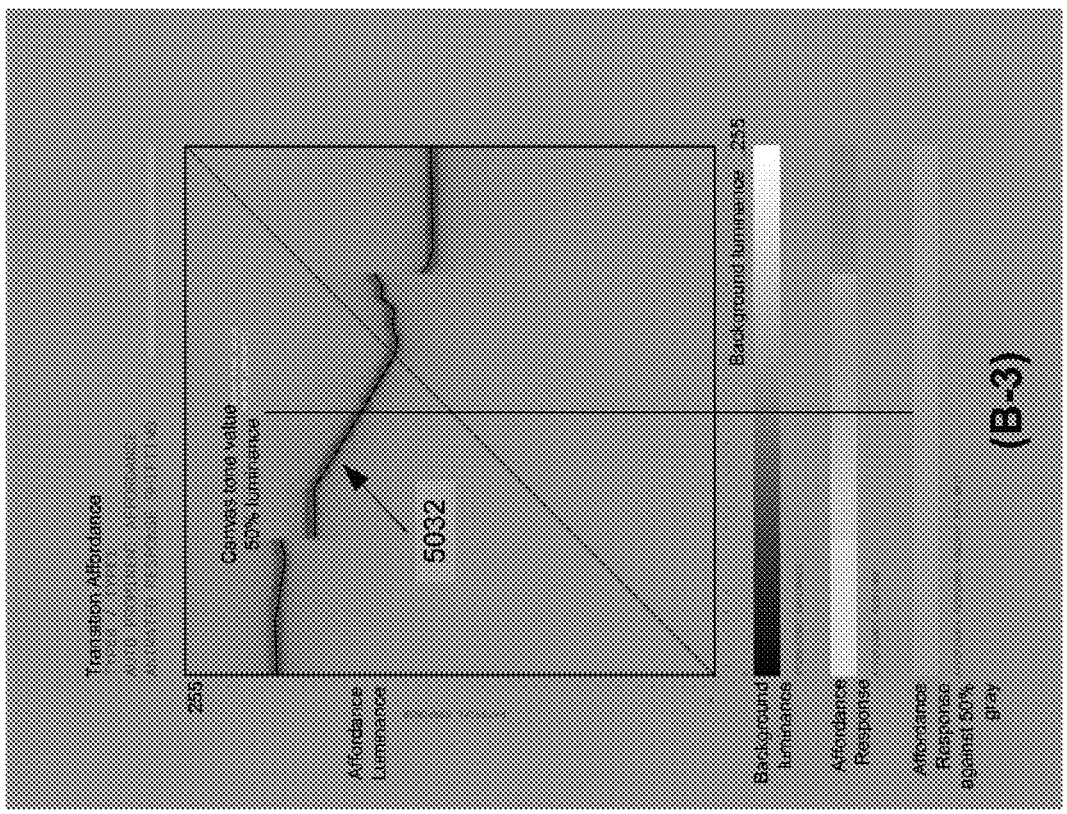
Figure 5A:
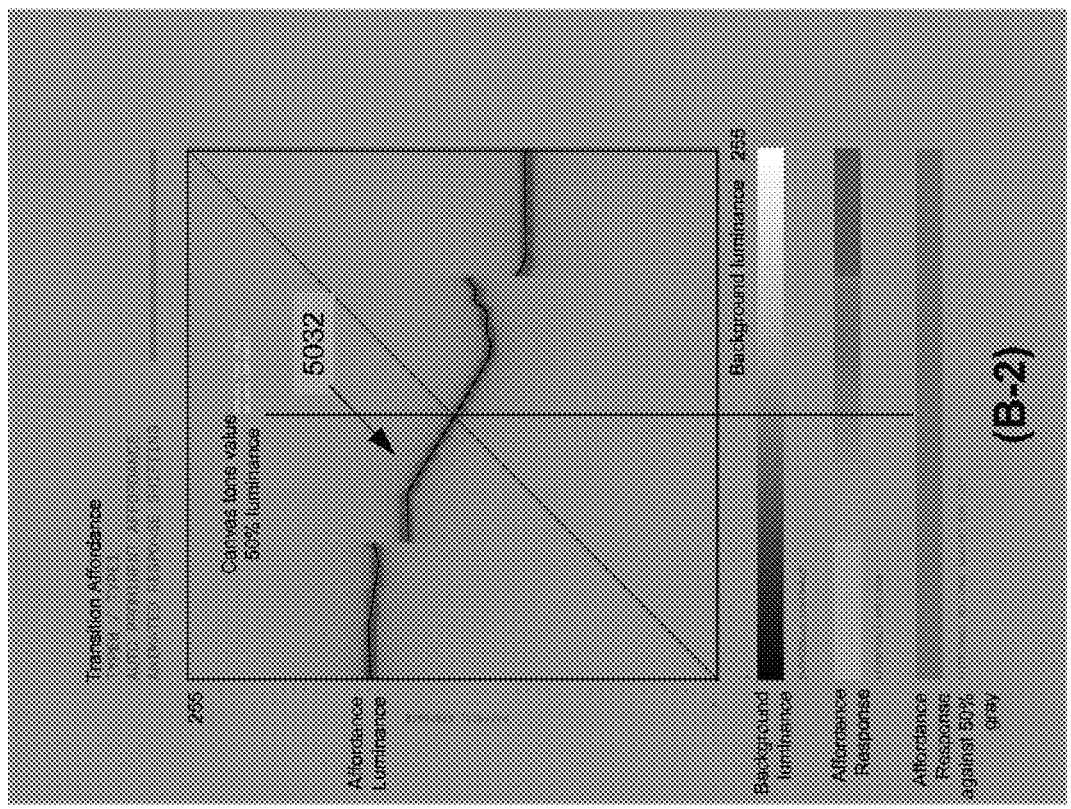
Figure 5A:
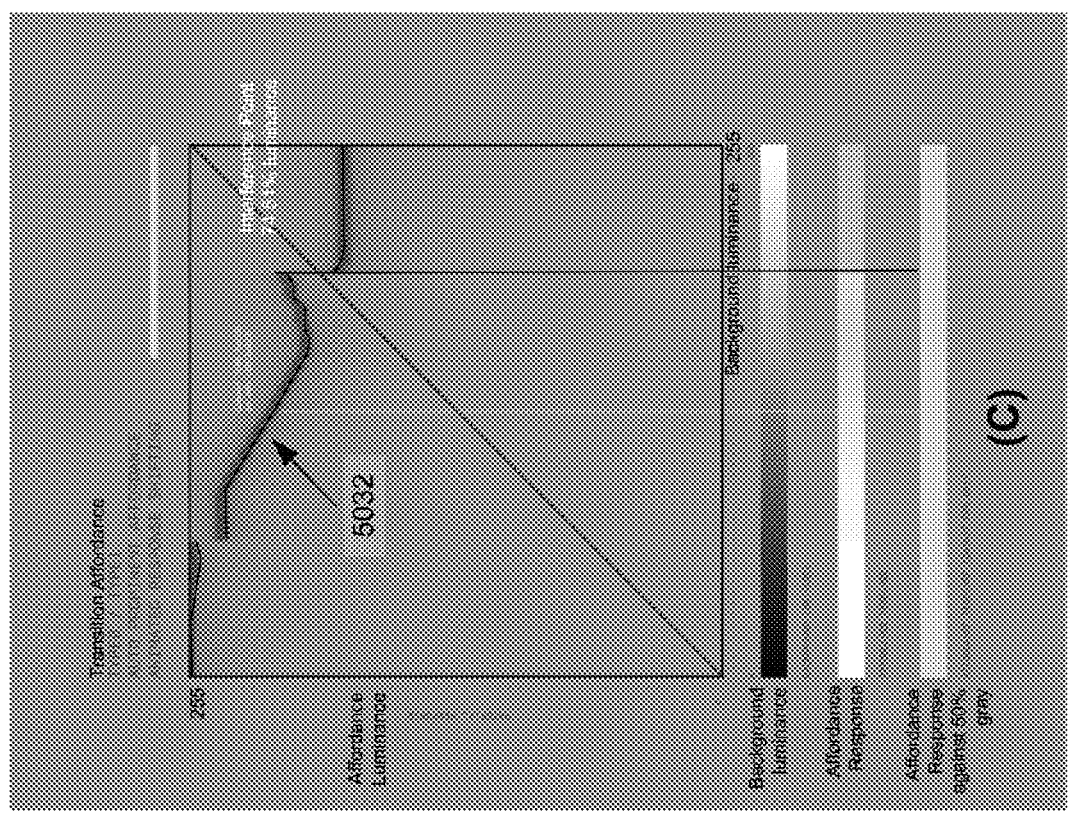

FIGS. 5Z and 5AA illustrate, that in some embodiments, an input by a contact (e.g., contact 5030) is detected on the touch-screen, while affordance 5002 is not displayed (e.g., as shown in FIG. 5X) or while affordance 5002 is displayed in the second state (e.g., semi-transparent/low contrast state 5002-A') (e.g., as shown in FIG. 5Y). In response to the input by the contact 5030, affordance 5002 is displayed (if not already displayed) in the second state (e.g., the semi-visible/low contrast state 5002-A'). In addition, media control regions are also redisplayed on the media player user interface. In other words, the media player application is returned to the first operation mode. In some embodiments, a sustained touch input near the bottom edge region of the display causes the device to first redisplay the affordance in the second state (e.g., upon detection of the contact), and then redisplay the affordance in the first state (e.g., upon the contact being maintained for more than a threshold amount of time with less than a threshold amount of movement since touch-down). In some embodiments, the navigation gesture is recognized by the device when the movement of the contact is detected (without lift-off of the contact) after the affordance is redisplayed in the first state. In some embodiments, instead of requiring the contact be maintained substantially stationary for the threshold amount of time in order to redisplay the affordance in the first state, the device requires that an intensity of the contact exceeds a predefined light press intensity threshold with less than a threshold amount of movement of the contact. In some embodiments, the navigation gesture is recognized by the device when the movement of the contact is detected (without lift-off of the contact) after the affordance is redisplayed in the first state.

In FIG. 5AA, in response to the media player application returning to the first operation state (e.g., the interactive state), affordance 5002 also transitions from the second state (e.g., semi-visible state/low contrast state 5002-A') back to the first state (e.g., fully visible state/high contrast state 5002-A). In some embodiments, transition from the second state to the first state is optionally a discrete transition, as opposed to over multiple intermediate states between the first state and the second state. The abrupt transition is more likely to alert the user that the operation mode of the user interface has changed, and reduce the wait time for the user to access the controls and provide the subsequent input. In some embodiments, the transition is directly from the state shown in FIG. 5Y to the state shown in FIG. 5AA, skipping the state shown in FIG. 5Z, when a confirmation input (e.g., a second tap after the affordance is displayed in the second state in response to a first tap, or a sustained touch by the same contact that triggered the display of the affordance in the second state) is detected.

FIGS. 5AB-5AC illustrate the differences in the appearance of the affordance for background under different operating modes, in accordance with some embodiments.

In FIG. 5AB, the first state 5002-A of the affordance is opaque, and is used when the media player user interface is operating in a first operating state (e.g., an interactive state), and when media controls are displayed over the media content. The second state 5002-A' is a semi-transparent state, and is used when the media player user interface is operating in a second operating state (e.g., a protected state, or media consumption state), and media controls are not displayed over the media content. The third state is a state where the affordance is no longer displayed and the user interface continues to operate in the second operating state (e.g., a protected state, or media consumption state). The affordance 5002 goes through these states when no input is received for a predetermined amount of time after the media player is started (e.g., in the full-screen or landscape mode).

In FIG. 5AC, the affordance starts in the invisible state or is not displayed over the media content (e.g., after the affordance 5002 has ceased to be displayed due to absence of user input). The in response to a first input or a first portion of an input, the affordance is displayed in the second state, while the media player user interface remains in the second operation state (e.g., protected state, or media consumption state). Then, in response to a second input or a second portion of the input, the affordance is displayed in the first state 5002-A, and the user interface returns to the first operating state (e.g., interactive state). In the first state 5002-A, the affordance is opaque. In the second state 5002-A', the affordance is semi-transparent.

In some embodiments, the affordance appearance type of an affordance is fixed, and do not change when the underlying content changes. This provides a consistent look for the affordance, which may result in less distraction to the user. However, in some scenarios, when the content over which the affordance is displayed vary widely, and a fixed affordance type may not be able to provide enough contrast over the underlying background after the content has changed from an overall dark tone to an overall bright tone, or vice versa. Furthermore, sometimes, the switching of content luminance level is a short-term switch (e.g., scrolling through lines of black text on a white background), and in such cases, switching the affordance type in response to such short-term changes can be inefficient, confusing, and distracting to the user. On the other hand, if the switching of content luminance level is a more permanent or long-term switch (e.g. flipping from one page (e.g., a page showing warm hues of the evening sky) to another page (e.g., showing a starry night scene) of a full-colored electronic story book), keeping the affordance appearance type fixed may result in insufficient visibility of the affordance for an extended period of time.

To address the above issues, while still balancing the needs to maintain visibility without undue distraction to the user, in some embodiments, the device allows the affordance to switch its affordance appearance type, and correspondingly, shifting the affordance-appearance range of values from one range of values to another range of values, when predefined range-switching criteria are met. In some embodiments, the range-switching criteria are met when a measure of the overall luminance state of the content underlying (and optionally, around) the affordance (e.g., a cumulated and aggregated value for the luminance values) crosses a predefined threshold value due to changes in the appearance of the content over time. In some embodiments, the measure of overall luminance state of the content takes into account of the luminance levels of the relevant portion of the content over a period of time (e.g., using a weighted running average), and also places a bias toward keeping the current affordance appearance type of the affordance unchanged (e.g., the bias is optionally implemented by giving a higher weight to the older luminance levels of the content and a smaller weight to the newer luminance levels of the content). With the cumulative effect and the bias toward the current affordance appearance type, both the short-term goal of keeping the affordance appearance stable against temporary changes in content, and the long-term goal of continually to provide sufficient saliency of the affordance over changed content are met.

FIG. 5AD illustrates user interfaces that include an affordance that dynamically switches between affordance appearance types based on changes in the underlying content over time, in accordance with some embodiments.

FIG. 5AD illustrates a simple example, where affordance 5002 started as a dark affordance (e.g., initially displayed on a user interface that is in a state as shown in FIG. 5G). Then, the content underlying affordance 5002 changed, e.g., through scrolling, to a relatively light state (e.g., to the state of the user interface as shown in FIG. 5K). In this example, the affordance appearance type of the affordance 5002 did not change during the scrolling of the content, e.g., because the scrolling is relatively fast, and the bias toward keeping the currently selected affordance appearance type has not been overcome by the changes in the appearance of the content over the short timescale. After the scrolling of the content stopped, and the affordance remains overlaid on the content shown in the light state. The overall luminance state of the content gradually changes as time goes by, and the luminance levels of the current background gradually takes over and dominates over the luminance levels of the background that were shown earlier (e.g., when the affordance is initially displayed or during the scrolling of the content). Eventually, at time t1, the measure of overall luminance state of the background crosses the predefined threshold value, and range-switching-trigger criteria are met. In some embodiments, in response to detecting that the range-switching trigger criteria are met, the device immediately switches the affordance appearance type, and displays the affordance in accordance with the newly selected affordance appearance type, e.g., as shown over the user interface on the right side of FIG. 5AD. The appearance of the affordance is the same as that shown in FIG. 5L, but in this example, the user does not have to close the web browser app and restart it in order to have the affordance displayed as a light affordance over the content 5018.

In some embodiments, the device starts a gradual transition from the first affordance appearance type (e.g., the dark affordance appearance type) to the second affordance appearance type (e.g., the light affordance appearance type) when the range-switching-trigger criteria are met. For example, during a predetermined transition period (e.g., T=t2−t1, 5 seconds), the affordance-appearance range of values goes through one or more intermediate ranges between the value ranges of the first and second appearance types. At any moment in time during the transition period, the appearance of the affordance is determined based on the particular intermediate value range that is currently used as the affordance-appearance range of values. As shown in the middle user interface in FIG. 5AD, the affordance is of an intermediate luminance level between the dark affordance and the light affordance, given the same background content.

In some embodiments, during the transition period, the measure of overall luminance state of the underlying content continues to be updated over time, with the luminance levels of the content at the more recent times taking over the luminance levels of the content at earlier times. If the range-switching-trigger criteria are met again (e.g., with the same threshold value used for the earlier switching or a different threshold value that is dependent on the currently selected affordance appearance type), the switching to the second affordance appearance type is not fully completed, and the affordance is returned to the first affordance appearance type. In this particular example, the content does not change, and the range-switching trigger criteria will not be met again during the transition period, as a result, the switching to the second affordance appearance type is fully completed at a time t2 (e.g., the period between t1 and t2 is the predefined transition period). After the switching to the second affordance appearance type is completed, the measure of overall luminance state of the underlying content continues to be updated over time, and the switching may occur again back to the first affordance appearance type when the range-switching-trigger criteria are met again due to cumulative changes in the underlying content (e.g., due to switching of context, scrolling etc.).

FIG. 5AE illustrates the value ranges and inversion relationships of a display property (e.g., luminance) of the affordance and the underlying content for a light affordance appearance type (A), a dark affordance appearance type (C), and a transitional affordance appearance type (B), in accordance with some embodiments. The inversion curves shown in FIG. 5AE are optionally used in generating the appearances of affordance 5002 in FIG. 5AD, in some embodiments.

In the examples shown in 5AE, the shapes of the inversion curves for the different appearance affordance types (A), (B), (C) are the same. Using the inversion curves with the same shape allows the correspondence value between background luminance value and affordance luminance value to be calculated for each point in the graph, and stored in a data table, so that, when the transition between the affordance types continuously goes through many intermediate value ranges, luminance of each pixel on the affordance can simply be determined, at least in part, by a look-up in the table based on the luminance of a corresponding pixel in the background. For example, during the transition period, each time point of a plurality of evenly spaced time points is associated with a respective intermediate value range between the light affordance value range and the dark affordance value range, and even with the content continuously changing during the transition period, the affordance appearance can still be quickly determined at each of the time points, based on the inversion curve of a corresponding intermediate value range for that time point.

As shown in FIG. 5AE, the inversion curve 5032 includes two discontinuities. The left discontinuity 5034 is introduced in order to address an interference point (e.g., at 25.4% background luminance) which is the interception of the equal luminance line 5036 (e.g., affordance luminance=background luminance) and the inversion curve without the discontinuity. The left discontinuity allows the affordance to have a luminance value that is not exactly the same as the background luminance, thereby avoiding the possibility of an "invisible" affordance in some special cases. Similarly, the right discontinuity 5038 is introduced in order to address an interference point (e.g., at 74.51% luminance) which is the interception of the equal luminance line 5036 and the inversion curve without the discontinuity. The right discontinuity allows the affordance to have a luminance value that is not exactly the same as the background luminance, thereby avoiding the possibility of an "invisible" affordance in some special cases.

In addition, near the discontinuities 5036 and 5038, special corrections are made to the affordance luminance, so strict inversion (e.g., increasing background luminance corresponds to decreasing affordance luminance and vice versa) is not always observed. For example, in the correction zone for the left discontinuity 5036, the affordance luminance on the side with the higher background luminance is relatively flat, while the affordance luminance on the side with the lower background luminance includes a small reversal of the normal inversion relationship. In the correction zone for the right discontinuity 5038, the affordance luminance on the side with the lower background luminance includes a relatively large reversal of the normal inversion relationship. The design of the precise shape of these correction zones take into consideration the responsiveness of human vision for luminance values within these zones, as well as the need to create sufficient contrast between the affordance and the background near the interference points. For example, the width of the interference zones and the adjustment to the normal inversion relationship depend on the amount of contrast that is needed for the affordance over the background at these interference points.

Each of the graphs (A), (B), and (C) shown on FIG. 5AE also includes a background luminance bar and an affordance response bar (show below the graph regions). The background luminance bar and the affordance response bar for each graph shows corresponding background luminance and affordance luminance generated in accordance with the inversion curve 5032 in the same graph. In addition, the background color of the graph (A) for the dark affordance is white, such that all shades of the dark affordance (e.g., including a completely black affordance, but does not include a completely white affordance) can be shown. The background color of graph (C) for the light affordance is black, such that all shades of the light affordance (e.g., including a completely white affordance, but does not include a completely black affordance) can be shown. The background color of the graph (B) for a transition affordance is gray (50% luminance). The affordance luminance for a background luminance of 50% is slightly a lighter shade of gray (e.g., with a luminance value below 50%), as shown by comparing the affordance response at half way along the horizontal axis and the 50% gray bar displayed at the bottom of the graph (B).

FIG. 5AF illustrates a gradual shift through multiple transitional affordance appearance types (e.g., represented in graphs (B-1), (B-2), (B-3)) from the dark affordance appearance type (e.g., represented in graph (A)) to the light affordance appearance type (e.g., represented in graph (C)), in accordance with some embodiments.

In some embodiments, the device starts a gradual transition from the first affordance appearance type (e.g., the dark affordance appearance type) to the second affordance appearance type (e.g., the light affordance appearance type) when the range-switching-trigger criteria are met at a time t1. Then, during a predetermined transition period (e.g., T=t2−t1), the affordance-appearance range of values shifts (e.g., upward or downward depending on the direction of switching) through a plurality of intermediate ranges (e.g., the total number of intermediate ranges depends on the refresh rate of the display and the value gap between the upper limit of the affordance luminance for the dark affordance and 1) between the value ranges of the first and second appearance types. At any moment in time during the transition period T, the appearance of the affordance is determined based on the particular intermediate value range that is currently used as the affordance-appearance range of values.

In some embodiments, during the transition period, the measure of overall luminance state of the underlying content continues to be updated over time, with the luminance levels of the content at the more recent times taking over the luminance levels of the content at earlier times. If the range-switching-trigger criteria are met again (e.g., with the same threshold value used for the earlier switching or a different threshold value that is dependent on the currently selected affordance appearance type), the switching to the second affordance appearance type is not fully completed, and the shifting of affordance-appearance range of values is reversed in direction and the affordance may be returned to the first affordance appearance type eventually. If the range-switching-trigger criteria are not met for a second time during the transition period, the switching to the second affordance appearance type goes to completion at the end of the transition period. After the switching to the second affordance appearance type is completed, the measure of overall luminance state of the underlying content continues to be updated over time, and the switching may occur again back to the first affordance appearance type when the range-switching-trigger criteria are met for another time, due to cumulative changes in the underlying content (e.g., due to switching of context, scrolling etc.).

In the examples shown in 5AF, the shapes of the inversion curves for the different appearance affordance types (A), (B-1), (B-2), (B-3), and (C) are the same. Using the inversion curves with the same shape allows the correspondence value between background luminance value and affordance luminance value to be calculated for each point in the graph (or for the inversion curve for each intermediate value range), and stored in a data table, so that, when the transition between the affordance types continuously goes through many intermediate value ranges, luminance of each pixel on the affordance can simply be determined, at least in part, by a quick look-up in the data table based on the luminance of a corresponding pixel in the background. For example, during the transition period, each time point of a plurality of evenly spaced time points is associated with a respective intermediate value range between the light affordance value range and the dark affordance value range, and even with the content continuously changing during the transition period and the underlying content having much variation in luminance underneath different parts of the affordance, the affordance appearance can still be quickly determined at each of the time points, based on prestored data in the data table.

FIGS. 5AG-5AK are enlarged duplicates of the inversion relationships of the display property of the affordance and the underlying content for the different affordance types shown in FIG. 5AF.

FIGS. 6A-6C are flow diagrams illustrating a method 6000 of changing an appearance of an affordance in accordance with a change in an appearance of the underlying content, in accordance with some embodiments. The method 6000 is performed at an electronic device (e.g., device 300, FIG. 3, or portable multifunction device 100, FIG. 1A) with a display and a touch-sensitive surface. In some embodiments, the electronic device includes one or more sensors to detect intensity of contacts with the touch-sensitive surface. In some embodiments, the touch-sensitive surface and the display are integrated into a touch-sensitive display. In some embodiments, the display is a touch-screen display and the touch-sensitive surface is on or integrated with the display. In some embodiments, the display is separate from the touch-sensitive surface. Some operations in method 6000 are, optionally, combined and/or the order of some operations is, optionally, changed.

Method 6000 relates to displaying an affordance (e.g., an affordance that indicates the acceptable starting region of a gesture for displaying the home screen) over content in a manner where a display property (e.g., gray value, or luminance value) of the affordance is dynamically changed based on a change in the same display property of the underlying content. Specifically, the value of the display property of the affordance changes in a direction that is opposite the change in the value of the same display property of the underlying content (e.g., the gray value of the affordance is an inversion of the gray value of the underlying content). In addition, the value of the display property of the affordance is constraint to a smaller range of values than the value of the display property of the underlying content. As a result, the device is able to provide the affordance in a less distracting or intrusive manner, while maintaining sufficient visibility of the affordance while the appearance of the content continues to change (e.g., due to scrolling, context switching, and playback of dynamic content). Providing an affordance with the dynamically changed appearance based on the appearance of the underlying content in the manner described herein enhances the operability of the device (e.g., by providing guidance to the user about the required input for a desired outcome without undue distraction to the user, which reduces user mistakes when operating the device) and makes the user-device interface more efficient (e.g., by helping the user to achieve an intended outcome with required inputs and reducing user mistakes when operating/interacting with the device), which improves battery life of the device (e.g., by helping the user to use the device more quickly and efficiently). Providing an affordance in the manner described herein allows an on-screen affordance to effectively replace a hardware button which serves the same function (e.g., displaying the home screen) in many different user interface contexts, which helps to reduce manufacturing and maintenance cost of the device. In addition, the claimed solution constrains the value range of the affordance to eliminate the white-on-black and black-on-white contrast between affordance and background content and thereby alleviates the risk of display burn-ins due to prolonged display of the affordance over a white or black background. Known causes of screen burn-ins is prolonged display of a non-moving image (e.g., a system-wide affordance, such as a home gesture indicator) combined with non-uniform use of pixels (e.g., which is most severe in cases of high contrast between foreground and background content). Under certain usage scenario (e.g., implementation of a system-wide home affordance), the solution proposed (e.g., reducing extreme high contrasts while maintaining visual saliency of affordance) addresses the burn-in issues effectively. The problem with burn-ins in the display of mobile phone and its causes is are a well-documented documented in industry literatures for many years and still exist in many commercial products problem. Hitherto, there have been attempts to address the problem by letting the affordance move around on the screen or simply disappear after a period of inactivity. However, such solutions worsen operability of the device. The claimed solution where an inversion of a display property of the underlying content provides the basis for determining the value of the same display property of the affordance within a sub-range of display property values makes it possible to use the affordance at the same position without risking burn-ins.

The method 6000 is performed at a device having a display and a touch-sensitive surface (e.g., a touch-screen display that serves both as the display and the touch-sensitive surface). The device displays (6002), on the display, content (e.g., a home screen, a widget screen, a desktop, a user interface of an application, a media player user interface, etc.) and an affordance (e.g., a home affordance that indicates a home gesture reactive region on the display), wherein: the affordance is displayed over a portion of the content; a value of a display property (e.g., a gray value or luminance value of an image (e.g., a color image or monochromatic image), an intrinsic display parameter other than the gray value or luminance value (e.g., hue, saturation, etc. of a full-colored image), or a derived display parameter calculated based on one or more intrinsic display parameters (e.g., a gray value or luminance value, or variants or equivalent thereof, of a full-colored image)) of the affordance is determined based a value of the same display property of the portion of the content over which the affordance is displayed; and the value of the display property of the content is permitted to vary within a first range of values (e.g., a range of [0, 1], e.g., a "range" is mathematically defined as a difference in value between a maximum value of the range and a minimum value of the range), and the value of the display property of the affordance is constrained to vary within a second range of values that is smaller than the first range of values (e.g., one of ranges [0, 0.4], [0.6, 1], [0.1, 0.7], [0, 0.7], or [0.3, 1], etc., a "sub-range" of a "first range" is defined as a range that has a maximum value that is smaller than the maximum value of the first range and a minimum value that is greater than the minimum value of the first range, or a range that has a maximum value that is smaller than the maximum value of the first range and a minimum value that is the same as the minimum value of the first range, or a range that has a maximum value that is the same as the maximum value of the first range and a minimum value that is greater than the minimum value of the first range); while displaying the content and the affordance, the device detects (6004) a change in appearance of the content over which the affordance is displayed. In response to detecting the change in appearance of the content over which the affordance is displayed, the device changes (6006) the appearance of the affordance, including: in accordance with a determination that the value of the display property of the content has decreased, increasing the value of the display property of the affordance in accordance with a magnitude of a change in the value of the display property of the content and the second range of values (e.g., when the content underlying the affordance becomes darker, the affordance becomes lighter); and in accordance with a determination that the value of the display property of the content has increased, decreasing the value of the display property of the affordance in accordance with a magnitude of the change in the value of the display property of the content and the second range of values (e.g., when the content underlying the affordance becomes lighter, the affordance becomes darker). This is illustrated in FIG. 5F, FIGS. 5G-5P, 5Q and 5R, for example, where the display property (e.g., luminance) of the affordance is changed in accordance with the change in the same display property (e.g., luminance) of the underlying content (e.g., when the content is scrolled). In addition, the affordance appearance range of values of the display property (e.g., luminance) is constrained to a sub-range of the range of values of the same display property for the underlying content (e.g., full range of values from black (e.g., 0 or 0%) to white (e.g., 1 or 100%)).

In some embodiments, the change in appearance of the content is (6008) due to content navigation (e.g., the portion of content underlying the affordance is changed due to scrolling, paging, etc. of the content). This is illustrated in FIGS. 5G-5P, for example. Changing the value of the display property of the affordance while the same display property of the underlying content changes due to content navigation enhances the operability of the device (e.g., by maintaining sufficient visibility of the affordance throughout content navigation, and helping the user to provide the required input to achieve a desired outcome) and makes the user-device operation more efficient (e.g., by reducing distraction to the user and reduce user mistakes when using or interacting with the device), which, additionally, improves power efficiency and battery life of the device (e.g., by reducing user mistakes and helping the user to use the device more quickly and efficiently).

In some embodiments, the change in appearance of the content is (6010) due to the content changing over time (e.g., the content is a video or animation that is being played, and the displayed image of the video or animation changes over time). This is illustrated in FIGS. 5T-5U, for example. Changing the value of the display property of the affordance while the same display property of the underlying content changes due to content changing over time enhances the operability of the device (e.g., by maintaining sufficient visibility of the affordance throughout the changes in content over time, and helping the user to provide the required input to achieve a desired outcome) and makes the user-device operation more efficient (e.g., by reducing distraction to the user and reduce user mistakes when using or interacting with the device), which, additionally, improves power efficiency and battery life of the device (e.g., by reducing user mistakes and helping the user to use the device more quickly and efficiently).

In some embodiments, the affordance has (6012) a first variant with a first sets of end values for the second range of values, and a second variant with a second sets of end values for the second range of values, the second sets of end values being different from the first set of end values (e.g., for a "light affordance" that is initially displayed over a light background, the second range of values has a first start point and a first end point, and for a "dark affordance" that is initially displayed over a dark background, the second range of values has a second start point and a second end point that are different from the first start point and the second start point, respectively). This is illustrated in FIGS. 5A and 5R, for example. In some embodiments, the range of values for the first variant does not overlap with the range of values for the second variant (e.g., all values in the value range for the "light affordance" are greater than all values in the value range for the "dark affordance"). Providing two variants of the affordance with different ranges of values allows the device to further improve visibility of the affordance while maintaining the unobtrusiveness of the appearance of the affordance over different types of content, thereby enhancing the operability of the device (e.g., by maintaining sufficient visibility of the affordance for different types of content, and helping the user to provide the required input to achieve a desired outcome) and making the user-device operation more efficient (e.g., by reducing distraction to the user and reduce user mistakes when using or interacting with the device).

In some embodiments, the first variant of the affordance is (6014) displayed in accordance with a determination that the content corresponds to a first application and the second variant of the affordance is displayed in accordance with a determination that the content corresponds to a second application that is distinct from the first application (e.g., the "light" vs. "dark" affordance used in a currently displayed application is selected by the application developer of the currently displayed application, and the device displays the first variant or the second variant of the affordance (e.g., uses the first or second set of end values for the second range of values when changing the value of the display property of the affordance) in accordance with an affordance selection parameter or a respective set of end values for the second value range as specified in the program code of the currently displayed application). Allowing different applications to use different variants of the affordance helps application developers to customize the appearance of the affordance based on application context, and thereby further improving the compatibility between the appearance of the affordance and the appearance of the application content, which enhances the operability of the device (e.g., by maintaining sufficient visibility of the affordance without undue distraction to the user, and helping the user to provide the required input to achieve a desired outcome) and makes the user-device operation more efficient (e.g., by reducing distraction to the user and reduce user mistakes when using or interacting with the device).

In some embodiments, the appearance of a first portion the content over which the affordance is (6016) displayed changes by a different amount than the appearance of a second portion of the content over which the affordance is displayed; and changing the appearance of the affordance includes changing an appearance of a first portion of the affordance that corresponds to the first portion of the content by a different amount than the appearance of a second portion of the affordance that corresponds to the second portion of the content changes (e.g., the affordance changes in accordance with a change in appearance in a corresponding portion of the content that underlies the first portion of the affordance). This is illustrated in FIG. 5Q, for example. For example, the appearance of the affordance varies if the underlying content varies (e.g., the affordance is a blurred/desaturated/inverted version of the portion of the content), and the appearance of different portions of the affordance reflect the appearance of the content that underlie the different portions of the affordance. Allowing different amount of changes to be applied to the display property of different portions of the affordance based on the different amount of changes that are occurring in the display property of different portions of the underlying content enhances the operability of the device (e.g., by maintaining sufficient visibility of the affordance throughout content change, and helping the user to provide the required input to achieve a desired outcome) and makes the user-device operation more efficient (e.g., by reducing distraction to the user and reduce user mistakes when using or interacting with the device), which, additionally, improves power efficiency and battery life of the device (e.g., by reducing user mistakes and helping the user to use the device more quickly and efficiently).

In some embodiments, the first range of values is (6018) a continuous range of values and the second range of values includes a discontinuity that corresponds to at least a first value of the display property in the first range of values. For example, in some embodiments, for a small value range near 0.5 for the display property of the content underlying the affordance, the value for the display property of the affordance is discontinuous, and jumps from a first value below 0.5 to a second value above 0.5. In some embodiments, the device uses a discontinuous function to calculate the value of the display property for the affordance based on the value of the same display property for the underlying content to ensure that the appearance of the affordance is not too close to the appearance of the underlying content (e.g., to ensure that a gray affordance is not displayed on top of gray content that has a very close gray value to the gray affordance). FIG. 5AE shows an inversion curve that includes two discontinuities (e.g., 5034 and 5038) for the value of the display property of the affordance. Using a discontinuous value range for the display property of the affordance while keeping a continuous value range for the value display of the underlying content helps to avoid a situation where the affordance takes on a value that is too close to the value of the underlying content causing insufficient visibility of the affordance. Using the discontinuous value range for the display property of the affordance enhances the operability of the device (e.g., by maintaining sufficient visibility of the affordance throughout content change, and helping the user to provide the required input to achieve a desired outcome) and makes the user-device operation more efficient (e.g., by reducing distraction to the user and reduce user mistakes when using or interacting with the device), which, additionally, improves power efficiency and battery life of the device (e.g., by reducing user mistakes and helping the user to use the device more quickly and efficiently).

In some embodiments, the affordance has (6020) a first variant and a second variant (e.g., a "light affordance" and a "dark affordance"), the second range of values corresponding to the first variant of the affordance and the second range of values corresponding to the second variant of the affordance do not overlap (e.g., the value range for the "light affordance" is separated from the value range for the "dark affordance" by a "cutoff value range"), and the device dynamically selects one of the first variant and the second variant to display over the content based on an initial value of the display property of the content at a predetermined time (e.g., when an application launches, or when there is scene change in a video, or when there is a switch of user interface within an application, etc.). For example, if the content initially has a gray value that is dark (e.g., less than 0.5), the affordance has an initial value in a light value range of the gray scale (e.g., greater than 0.6); and if the content initially has a gray value that is light (e.g., greater than 0.5), the affordance has an initial value in a dark range of the gray scale (e.g., less than 0.4). The exact gray value of the affordance is, optionally, obtained by inverting the gray value of the content through a corresponding inversion function for the light or dark value range that is associated with the initial appearance of the affordance. In some embodiments, if the affordance is a light affordance (e.g., with a gray value of 0.9) that is displayed initially on dark content (e.g., with a gray value of 0.2), when the content below the affordance becomes increasingly lighter (e.g., with gray value increasing toward 1), the affordance becomes increasingly darker (e.g., with gray value decreasing toward 0) but the gray value of the affordance is constrained by a minimum threshold gray value (e.g., 0.6) that is still lighter than the center gray value (e.g., 0.5) on the gray scale of [0, 1]. When the content below the affordance becomes increasingly darker (e.g., with gray value decreasing toward 0), the affordance becomes increasingly lighter (e.g., with gray value increasing toward 1) until it becomes completely white (e.g., reaching the end value of 1 on the gray scale of [0, 1]) when the content becomes completely black. In another example, if the affordance is a dark affordance (e.g., with a gray value of 0.2) that is displayed initially on light content (e.g., with a gray value of 0.9), when the content below the affordance becomes increasingly darker (e.g., with gray value decreasing toward 0), the affordance becomes increasingly lighter (e.g., with gray value increasing toward 1) but the gray value of the affordance is constrained by a maximum threshold gray value (e.g., 0.4) that is still darker than the center gray value (e.g., 0.5) on the gray scale of [0, 1]. When the content below the affordance becomes increasingly lighter (e.g., with gray value increasing toward 1), the affordance becomes increasingly darker (e.g., with gray value decreasing toward 0) until it becomes completely black (e.g., reaching the end value of 0 on the gray scale of [0, 1]) when the content becomes completely white. FIG. 5G shows selection of a dark affordance based on an initial overall luminance state of the underlying content that is relatively dark, and FIG. 5L shows selection of a light affordance based on an initial overall luminance state of the underlying content that is relatively light. Allowing the application to dynamically select from two different variants of the affordance (e.g., for darker content vs. lighter content) further improves the appearance of the affordance based on application context, and thereby further improving the compatibility between the appearance of the affordance and the appearance of the underlying content, which enhances the operability of the device (e.g., by maintaining sufficient visibility of the affordance without undue distraction to the user, and helping the user to provide the required input to achieve a desired outcome) and makes the user-device operation more efficient (e.g., by reducing distraction to the user and reduce user mistakes when using or interacting with the device).

In some embodiments, displaying the affordance includes (6022) displaying the affordance with a first size (e.g., near the bottom edge of the device) while the device is in a first orientation, and the method includes: while displaying the affordance with the first size, detecting rotation of the device from the first orientation to a second orientation that is different from the first orientation (e.g., the rotation of the device causes the displayed content to change from a first user interface orientation (e.g., portrait orientation) to a second user interface orientation (e.g., landscape orientation)); and in response to detecting the rotation of the device from the first orientation to the second orientation, displaying the affordance with a second size that is different from the first size (and, optionally, displaying the affordance at a different location (e.g., near the new bottom edge of the device as defined based on the second orientation of the device)). In some embodiments, a longer version of the affordance is displayed when the device is in the landscape orientation, and a shorter version of the affordance is displayed when the device is in the portrait orientation. Displaying affordances of different sizes when the device is rotated improves the visual compatibility between the appearance of the affordance and the orientation of the device (and therefore, the orientation of the content), which enhances the operability of the device (e.g., by maintaining sufficient visibility of the affordance without undue distraction to the user, and helping the user to provide the required input to achieve a desired outcome) and makes the user-device operation more efficient (e.g., by reducing distraction to the user and reduce user mistakes when using or interacting with the device).

In some embodiments, the display property is (6024) gray value (e.g., the gray value has a full value range of [0, 1] representing a gray value range from black (e.g., gray value=0) to white (e.g., gray value=1). Providing an affordance that changes its gray value based on the gray value of the underlying content enhances the operability of the device (e.g., by maintaining sufficient visibility of the affordance without undue distraction to the user, and helping the user to provide the required input to achieve a desired outcome) and makes the user-device operation more efficient (e.g., by reducing distraction to the user and reduce user mistakes when using or interacting with the device).

In some embodiments, a current value of the display property of the content is (6026) obtained by blurring the portion of the content (e.g., by applying a blur function (e.g., a Gaussian blur function) with a predefined blur radius to a region of the content that underlies the affordance and at least one blur radius around the region of the content that directly underlies the affordance). In some embodiments, after blurring the content, other filters, such as desaturation and/or changing the opacity is applied. Providing an affordance with a display property that is derived based on the same display property of a blurred version of the underlying content enhances the operability of the device (e.g., by maintaining sufficient visibility of the affordance without undue distraction to the user, and helping the user to provide the required input to achieve a desired outcome) and makes the user-device operation more efficient (e.g., by reducing distraction to the user and reduce user mistakes when using or interacting with the device).

In some embodiments, a current value of the display property of the content is (6028) obtained by desaturating the portion of the content (e.g., by converting the color value (e.g., an RGB value, an HSL value, or an HSV value) of each pixel of a region of the content that underlies the affordance and at least one blur radius around that region into a corresponding scalar value (e.g., a gray value) on a monochromatic scale (e.g., a gray scale)). In some embodiments, after desaturating the content, other filters, such as blurring and/or changing the opacity is applied. Providing an affordance with a display property that is derived based on the same display property of a desaturated version of the underlying content enhances the operability of the device (e.g., by maintaining sufficient visibility of the affordance without undue distraction to the user, and helping the user to provide the required input to achieve a desired outcome) and makes the user-device operation more efficient (e.g., by reducing distraction to the user and reduce user mistakes when using or interacting with the device).

In some embodiments, the affordance indicates (6030) a reactive region for starting a predefined gesture input (e.g., a home/multitasking gesture for displaying the home screen and/or application switcher user interface). This is illustrated in FIGS. 5A-5D, for example. In some embodiments, the affordance is not an actual button. Tapping or pressing on the affordance does not trigger any function of the device. In some embodiments, when the affordance is no longer displayed (e.g., after it is faded out in a full screen mode of an application), the predefined gesture (e.g., the home/multi-tasking gesture) still works as it did when the affordance was displayed. In some embodiments, the affordance is redisplayed in the full screen content display mode when a user input (e.g., the home/multi-tasking gesture, or a tap input on the display, etc.) is detected. The affordance is a narrow affordance with a small height to length ratio. An affordance that indicates the reactive region for starting a predefined gesture generally does not need to have specially enhanced visibility relative to the underlying content, because the reactive region of the gesture is usually more forgiving than the reaction region of a button, thus, it is more beneficial to have an affordance that is less distraction to the user to help avoid user mistakes when interacting with the device. Therefore, using the affordance with the dynamically varied display property in the manner described herein enhances the operability of the device (e.g., by maintaining sufficient visibility of the affordance without undue distraction to the user, and helping the user to provide the required input to achieve a desired outcome) and makes the user-device operation more efficient (e.g., by reducing distraction to the user and reduce user mistakes when using or interacting with the device).

It should be understood that the particular order in which the operations in FIGS. 6A-6C have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 7000 and 8000) are also applicable in an analogous manner to method 6000 described above with respect to FIGS. 6A-6C. For example, the contacts, gestures, user interface objects, application views, control panels, controls, affordances, position thresholds, directional conditions, inversion curves, filters, value ranges, navigation criteria, movement parameters, focus selectors, and/or animations described above with reference to method 6000 optionally have one or more of the characteristics of the contacts, gestures, user interface objects, application views, control panels, controls, position thresholds, directional conditions, navigation criteria, movement parameters, focus selectors, and/or animations described herein with reference to other methods described herein (e.g., methods 7000, and 8000). For brevity, these details are not repeated here.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 6A-6C are, optionally, implemented by components depicted in FIGS. 1A-1B. For example, detection operation and changing operation are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

FIGS. 7A-7E are flow diagrams illustrating a method of changing an appearance of an affordance in accordance with a change in an appearance of the underlying content and a change in a mode of a user interface over which the affordance is displayed, in accordance with some embodiments. The method 7000 is performed at an electronic device (e.g., device 300, FIG. 3, or portable multifunction device 100, FIG. 1A) with a display and a touch-sensitive surface. In some embodiments, the electronic device includes one or more sensors to detect intensity of contacts with the touch-sensitive surface. In some embodiments, the touch-sensitive surface and the display are integrated into a touch-sensitive display. In some embodiments, the display is a touch-screen display and the touch-sensitive surface is on or integrated with the display. In some embodiments, the display is separate from the touch-sensitive surface. Some operations in method 600 are, optionally, combined and/or the order of some operations is, optionally, changed.

Method 7000 relates to displaying an affordance (e.g., an affordance that indicates the acceptable starting region of a gesture for displaying the home screen) over an application user interface in a manner where a set of display properties (e.g., gray value, luminance value, opacity, hue, saturation, etc.) of the affordance is changed based on a set of display properties of the underlying content in accordance with two different sets of rules depending on the current display mode of the application user interface. For example, when the application user interface is displayed in an interaction mode (e.g., in which frequent user inputs are expected), the appearance of the affordance changes in a first manner (e.g., based on a first set of rules) based on the appearance of the underlying content, such that the affordance is more visible; and while the application user interface is displayed in a full-screen content display mode (e.g., in which content viewing is likely the primary goal), the appearance of the affordance changes in a second manner (e.g., based on a second set of rules) based on the appearance of the underlying content, such that the affordance is less distracting to the user. Therefore, provide the affordance that changes its appearance in different manners based on the appearance of the underlying content based on the display mode of the application user interface enhances the operability of the device (e.g., by providing a suitable amount of guidance to the user about the required input for a desired outcome without undue distraction to the user, which reduces user mistakes when operating the device) and makes the user-device interface more efficient (e.g., by helping the user to achieve an intended outcome with required inputs and reducing user mistakes when operating/interacting with the device), which improves battery life of the device (e.g., by helping the user to use the device more quickly and efficiently). Providing an affordance in the manner described herein allows an on-screen affordance to effectively replace a hardware button which serves the same function (e.g., displaying the home screen) in many different user interface contexts, which helps to reduce manufacturing and maintenance cost of the device. Providing an affordance in the manner described herein also helps to reduce and eliminate burn-in issues of the display.

The method 7000 is performed at a device having a display and a touch-sensitive surface (e.g., a touch-screen display that serves both as the display and the touch-sensitive surface). The device displays (7002) a user interface of an application (e.g., a media player user interface, a browser user interface, an instant messaging user interface, a maps user interface, a telephony user interface, a gaming user interface, etc.) in a first mode (e.g., a content display mode that does not include full-screen content, a windowed mode, or a default mode). While displaying the user interface of the application in the first mode, the device displays (7004) an affordance (e.g., a home affordance that indicates a home gesture reactive region on the display) with a first appearance over the user interface, wherein: the affordance is displayed over a portion of the user interface (e.g., the affordance is displayed in a first predefined region of the display (e.g., a home affordance display region that is located in proximity to a bottom center region of the display), and values of a set of one or more display properties of the affordance with the first appearance change in accordance with a change in values of a set of one or more display properties of the portion of the user interface that underlies the affordance, in accordance with a first set of one or more rules (e.g., the set of one or more display properties of the affordance are obtained by applying a first set of filters for desaturating, blurring, changing the opacity of, and/or inverting the luminance or gray values of the image of the portion of the user interface that underlies the affordance)). While displaying the affordance with the first appearance over the portion of the user interface displayed in the first mode, the device detects (7006) a request (e.g., a request generated by the application program providing the user interface or the operating system based on current operating conditions (e.g., prolonged absence of input, predefined criteria for switching between operating modes, etc.) or a user request (e.g., a tap input by a contact on the touch-screen, or a swipe input, etc.)) to transition from displaying the user interface in the first mode to displaying the user interface in a second mode (e.g., a full-screen content display mode). In response to detecting the request: the device display (7008) the user interface in the second mode (e.g., in the full-screen content display mode, a portion of the original user interface is magnified, some of the user interface elements in the user interface, such as an application menu bar, a scroll bar, etc., are removed from the user interface, and the system status bar that is previously displayed with the user interface is also removed from the display); and the device displays the affordance with a second appearance over the user interface displayed in the second mode, wherein: the values of the set of one or more display properties of the affordance with the second appearance change in accordance with a change in the values of the set of one or more display properties of the portion of the user interface that underlies the affordance, in accordance with a second set of one or more rules that are different from the first set of one or more rules (e.g., the set of one or more display properties of the affordance are obtained by applying a second set of filters for desaturating, blurring, changing the opacity of, inverting the luminance or gray values of the image of the portion of the user interface that underlies the affordance) (e.g., the affordance with the second appearance is a variation of the affordance with the first appearance, but both are derived from the portion of the user interface underlying the affordance, but using different sets of filters, or the same sets of filters with different adjustment parameters). This is illustrated in FIGS. 5S-5W, where affordance 5002 is displayed in a second state (e.g., a low contrast state, in FIGS. 5V and 5W), when the device transitions from an interactive mode to a media consumption mode after the affordance has been displayed initially in a first state (e.g., a fully visible state, in FIGS. 5T and 5U), for example.

In some embodiments, while displaying the affordance with the second appearance over the user interface displayed in the second mode: in accordance with a determination that fade-out criteria are met, the device ceases (7010) to display the affordance over the user interface displayed in the second mode (e.g., while maintaining display of the user interface in the second mode); and in accordance with a determination that the fade-out criteria are not met, maintaining display of the affordance with the second appearance over the user interface displayed in the second mode. This is illustrated in FIG. 5X, for example, where the affordance 5002 in the low contrast state eventually completely disappeared after an additional period of time with no user input. In some embodiments, the fade-out criteria require that no user input has been detected on the touch-sensitive surface for at least a predefined threshold amount of time in order for the fade-out criteria to be met (e.g., the fade-out criteria are met when the device has not detected any touch input anywhere on the touch-sensitive surface for 30 seconds after the full-screen content display mode is entered, or when the device has not detected any touch-input near the bottom center region of the touchscreen display for 30 seconds after the full-screen content display mode is entered (e.g., other parts of the display may still continue to receive and respond to user inputs without impacting the determination regarding the fade-out criteria)). Fading out or maintaining display of the affordance that is displayed in the predefined display mode of the application user interface based on predefined criteria enhances the operability of the device (e.g., by providing a suitable amount of guidance to the user about the required input for a desired outcome without undue distraction to the user, which reduces user mistakes when operating the device) and makes the user-device interface more efficient (e.g., by helping the user to achieve an intended outcome with required inputs and reducing user mistakes when operating/interacting with the device), which improves battery life of the device (e.g., by helping the user to use the device more quickly and efficiently).

In some embodiments, the user interface of the application displayed in the first mode includes (7012) a representation of content (e.g., a video, game, document, album art for a song) that occupies less than all of a display region of the display (e.g., the user interface of the application displayed in the first mode is displayed concurrently with a system status bar on the display); and the user interface of the application displayed in the second mode includes a representation of the content that occupies all of the display region of the display (e.g., in the full-screen content display mode, a portion of the original user interface is magnified, some of the user interface elements in the user interface, such as an application menu bar, a scroll bar, etc., are removed from the user interface, and the system status bar that is previously displayed with the user interface is also removed from the display). Provide the affordance that changes its appearance based on the appearance of the underlying content in different manners depending on whether content is displayed in a regular display mode or a full-screen display mode enhances the operability of the device (e.g., by providing a suitable amount of guidance to the user about the required input for a desired outcome without undue distraction to the user, which reduces user mistakes when operating the device) and makes the user-device interface more efficient (e.g., by helping the user to achieve an intended outcome with required inputs and reducing user mistakes when operating/interacting with the device), which improves battery life of the device (e.g., by helping the user to use the device more quickly and efficiently).

In some embodiments, at least one of the first appearance and the second appearance of the affordance (e.g., as reflected in the luminance, intensity, or gray value of the affordance) is (7014) based on an inversion of the portion of the user interface that underlies the affordance. For example, in some embodiments, the portion of user interface underlying the affordance is desaturated to obtain a monochromatic image, the monochromatic image is blurred, and then the luminance or gray values of the pixels in the blurred monochromatic image are inverted to obtain the luminance or gray values of the pixels in the affordance. Providing an affordance with a display property that is derived based on an inversion of the underlying content enhances the operability of the device (e.g., by maintaining sufficient visibility of the affordance without undue distraction to the user, and helping the user to provide the required input to achieve a desired outcome) and makes the user-device operation more efficient (e.g., by reducing distraction to the user and reduce user mistakes when using or interacting with the device).

In some embodiments, the first set of rules require (7016) applying a first amount of inversion to the portion of the user interface that underlies the affordance to obtain the first appearance of the affordance, the second set of rules require applying a second amount of inversion to the portion of the user interface that underlies the affordance to obtain the second appearance of the affordance, and the second amount of inversion is smaller than the first amount of inversion (e.g., the second set of rules reduce the amount of inversion of the portion of the user interface that underlies the affordance to obtain the set of display properties of the affordance). Changing the amount of inversion applied to the underlying content to obtain the affordance helps to adjust the visibility of the affordance in accordance with the display mode of the application user interface, thereby enhancing the operability of the device (e.g., by intelligently balancing the requirement of sufficient visibility and the requirement of unobtrusiveness of the affordance, and helping the user to provide the required input to achieve a desired outcome) and making the user-device operation more efficient (e.g., by reducing distraction to the user and reduce user mistakes when using or interacting with the device).

In some embodiments, at least one of the first appearance and the second appearance of the affordance (e.g., as reflected in the luminance, intensity, or gray value of the affordance) is (7018) obtained by blurring the portion of the user interface that underlies the affordance. For example, in some embodiments, the portion of user interface underlying the affordance is desaturated to obtain a monochromatic image, the monochromatic image is blurred, and then the luminance or gray values of the pixels in the blurred monochromatic image are inverted to obtain the luminance or gray values of the pixels in the affordance. Providing an affordance with a display property that is obtained by blurring the underlying content enhances the operability of the device (e.g., by maintaining sufficient visibility of the affordance without undue distraction to the user, and helping the user to provide the required input to achieve a desired outcome) and makes the user-device operation more efficient (e.g., by reducing distraction to the user and reduce user mistakes when using or interacting with the device).

In some embodiments, the first set of rules require (7020) applying a first amount of blur (e.g., a Gaussian blur function) to the portion of the user interface that underlies the affordance to obtain the first appearance of the affordance, the second set of rules require applying a second amount of blur (e.g., a Gaussian blur function) to the portion of the user interface that underlies the affordance to obtain the second appearance of the affordance, and the second amount of blur is smaller than the first amount of blur (e.g., the second blur function has a smaller blur radius than the first blur function) (e.g., the second set of rules reduce an amount of blurring of a portion of the user interface that underlies the affordance to obtain the set of display properties of the affordance). Changing the amount of blurring applied to the underlying content to obtain the affordance helps to adjust the visibility of the affordance in accordance with the display mode of the application user interface, thereby enhancing the operability of the device (e.g., by intelligently balancing the requirement of sufficient visibility and the requirement of unobtrusiveness of the affordance, and helping the user to provide the required input to achieve a desired outcome) and making the user-device operation more efficient (e.g., by reducing distraction to the user and reduce user mistakes when using or interacting with the device).

In some embodiments, at least one of the first appearance and the second appearance of the affordance (e.g., as reflected in the luminance, intensity, or gray value of the affordance) is (7022) obtained by desaturating the portion of the user interface that underlies the affordance. For example, in some embodiments, the portion of user interface underlying the affordance is desaturated to obtain a monochromatic image, the monochromatic image is blurred, and then the luminance or gray values of the pixels in the blurred monochromatic image are inverted to obtain the luminance or gray values of the pixels in the affordance. Providing an affordance with a display property that is obtained by desaturating the underlying content enhances the operability of the device (e.g., by maintaining sufficient visibility of the affordance without undue distraction to the user, and helping the user to provide the required input to achieve a desired outcome) and makes the user-device operation more efficient (e.g., by reducing distraction to the user and reduce user mistakes when using or interacting with the device).

In some embodiments, the first set of rules require (7024) applying a first amount of desaturation to the portion of the user interface that underlies the affordance to obtain the first appearance of the affordance, the second set of rules require applying a second amount of desaturation to the portion of the user interface that underlies the affordance to obtain the second appearance of the affordance, and the second amount of desaturation is smaller than the first amount of desaturation (e.g., the second set of rules reduce an amount of desaturation of the portion of the user interface that underlies the affordance to obtain the set of display properties of the affordance). Changing the amount of desaturation applied to the underlying content to obtain the affordance helps to adjust the visibility of the affordance in accordance with the display mode of the application user interface, thereby enhancing the operability of the device (e.g., by intelligently balancing the requirement of sufficient visibility and the requirement of unobtrusiveness of the affordance, and helping the user to provide the required input to achieve a desired outcome) and making the user-device operation more efficient (e.g., by reducing distraction to the user and reduce user mistakes when using or interacting with the device).

In some embodiments, while displaying the user interface in the second mode without displaying the affordance, the device detects (7026) an input that meets first affordance-redisplay criteria, wherein the first affordance-redisplay criteria are met when the input is detected on the touch-sensitive surface (e.g., at a location that corresponds to the first display location); and in response to detecting the input that meets the affordance-redisplay criteria, the device redisplays the affordance over the user interface displayed in the second mode. This is illustrated in FIGS. 5X-5AA, for example. In some embodiments, when the affordance is redisplayed over the user interface displayed in the second mode, the values of the set of one or more display properties of the affordance change in accordance with a change in the values of the set of one or more display properties of the portion of the user interface in accordance with the second set of one or more rules. In some embodiments, when the affordance is redisplayed over the user interface displayed in the first mode, the values of the set of one or more display properties of the affordance change in accordance with a change in the values of the set of one or more display properties of the portion of the user interface in accordance with the first set of one or more rules. Redisplaying the affordance after fading out of the affordance based on predefined criteria enhances the operability of the device (e.g., by providing a suitable amount of guidance to the user about the required input for a desired outcome without undue distraction to the user, which reduces user mistakes when operating the device) and makes the user-device interface more efficient (e.g., by helping the user to achieve an intended outcome with required inputs and reducing user mistakes when operating/interacting with the device), which improves battery life of the device (e.g., by helping the user to use the device more quickly and efficiently).

In some embodiments, while displaying the user interface in the second mode without displaying the affordance, the device detects (7028) an input that meets second affordance-redisplay criteria, wherein the second affordance redisplay criteria is met when the input is a request to transition from displaying the user interface in the second mode to displaying the user interface in the first mode; and in response to detecting the input that meets the second affordance-redisplay criteria, the device redisplays the user interface in the first mode; and the device redisplays the affordance over the user interface redisplayed in the first mode. This is illustrated in FIGS. 5X-5AA, for example. In some embodiments, when the affordance is redisplayed over the user interface displayed in the first mode, the values of the set of one or more display properties of the affordance change in accordance with a change in the values of the set of one or more display properties of the portion of the user interface in accordance with the first set of one or more rules. Redisplaying the affordance when transitioning from the second display mode to the first display mode enhances the operability of the device (e.g., by providing a suitable amount of guidance to the user about the required input for a desired outcome without undue distraction to the user, which reduces user mistakes when operating the device) and makes the user-device interface more efficient (e.g., by helping the user to achieve an intended outcome with required inputs and reducing user mistakes when operating/interacting with the device), which improves battery life of the device (e.g., by helping the user to use the device more quickly and efficiently).

In some embodiments, at least one of the first appearance and the second appearance of the affordance is (7030) dynamically adjusted in accordance with changes that occur in the portion of the user interface that underlies the affordance (e.g., the portion of the user interface changes due to dynamic content changing in the user interface or due to navigation through the content displayed in the user interface). This is illustrated in FIGS. 5T-5W, for example. For example, when the user interface is scrolled, or when the user interface displayed in the second mode is a full-screen movie, game, or webpage that is continuously evolving and refreshed, the appearance of the affordance is also continuously updated to reflect the changes in the user interface underneath. The appearance of the affordance changes dynamically in accordance with the first set of rules when the user interface is displayed in the first mode, and the appearance of the affordance changes dynamically in accordance with the second set of rules when the user interface is displayed in the second mode. Dynamically changing the appearance of the affordance based on changes in the appearance of the underlying content enhances the operability of the device (e.g., by providing a suitable amount of guidance to the user about the required input for a desired outcome without undue distraction to the user while the content continues to change overtime) and makes the user-device interface more efficient (e.g., by helping the user to achieve an intended outcome with required inputs and reducing user mistakes when operating/interacting with the device), which improves battery life of the device (e.g., by helping the user to use the device more quickly and efficiently).

In some embodiments, the first appearance is (7032) generated based on a first set of filters (e.g., blurred, desaturated, and inverted) applied to the portion of the user interface that underlies the affordance (and an edge area surrounding that region), the second appearance is generated based on a second set of filters applied the portion of the user interface that underlies the affordance, and for two or more filters in the second set of filters, the first set of filters includes a corresponding filter of the same type and with different adjustment parameters (e.g., a blur filter with different blur radius, an inversion filter with a different inversion curve, an opacity filter with a different transparency level, a desaturation filter with a different desaturation ratio, etc.). Using a set of filters with different adjustment parameters to provide the affordance that changes its appearance in different manners based on the appearance of the underlying content allows the affordance to maintain a relative consistent appearance during switching of the display modes, and leads to less distraction to the user, thereby enhancing the operability of the device (e.g., by providing a suitable amount of guidance to the user about the required input for a desired outcome without undue distraction to the user, which reduces user mistakes when operating the device) and making the user-device interface more efficient (e.g., by helping the user to achieve an intended outcome with required inputs and reducing user mistakes when operating/interacting with the device).

In some embodiments, in response to detecting the request: the device generates (7034) one or more intermediate appearances for the affordance between the first appearance and the second appearance; and the device displays the one or more intermediate appearances of the affordance as a transition between displaying the affordance with the first appearance and displaying the affordance with the second appearance. In some embodiments, the intermediate appearances are displayed over the user interface in the second mode, and the intermediate appearances are interpolations between the first appearance and the second appearance of the affordance. Generating intermediate appearances of the affordance to bridge a transition of the affordance's appearance during a display mode switching of the application user interface leads to less distraction to the user, thereby enhancing the operability of the device (e.g., by providing a suitable amount of guidance to the user about the required input for a desired outcome without undue distraction to the user, which reduces user mistakes when operating the device) and making the user-device interface more efficient (e.g., by helping the user to achieve an intended outcome with required inputs and reducing user mistakes when operating/interacting with the device).

In some embodiments, generating the one or more intermediate appearances for the affordance between the first appearance and the second appearance includes (7036) gradually transitioning from the first set of rules to the second set of rules (e.g., changing a magnitude of one filter that is applied to the underlying content to generate the affordance without changing a magnitude of other filters that are applied to the underlying content to generate the affordance). Generating the intermediate appearances of the affordance by gradually transitioning the set of rules used to generate the appearance of the affordance leads to less distraction to the user, thereby enhancing the operability of the device (e.g., by providing a suitable amount of guidance to the user about the required input for a desired outcome without undue distraction to the user, which reduces user mistakes when operating the device) and making the user-device interface more efficient (e.g., by helping the user to achieve an intended outcome with required inputs and reducing user mistakes when operating/interacting with the device).

In some embodiments, the affordance with the first appearance has (7038) a first degree of opacity and the affordance with the second appearance has second degree of opacity that is less than the first degree of opacity (e.g., with color of the user interface showing through). Changing the opacity of the affordance based on the display mode of the application user interface helps to adjust the visibility of the affordance in accordance with the display mode of the application user interface, thereby enhancing the operability of the device (e.g., by intelligently balancing the requirement of sufficient visibility and the requirement of unobtrusiveness of the affordance, and helping the user to provide the required input to achieve a desired outcome) and making the user-device operation more efficient (e.g., by reducing distraction to the user and reduce user mistakes when using or interacting with the device).

In some embodiments, the affordance with the first appearance and the affordance with the second appearance have (7040) a same size and position on the display. Maintaining the size and position of the affordance in different display mode of the application user interface helps to maintain continuity in the appearance of the affordance during user interface switching, thereby enhancing the operability of the device (e.g., by maintaining context for the user and helping the user to provide the required input to achieve a desired outcome) and making the user-device operation more efficient (e.g., by reducing distraction to the user and reduce user mistakes when using or interacting with the device).

In some embodiments, the first set of one or more rules create (7042) a greater visual distinction between the affordance and the user interface of the application than the visual distinction between the affordance and the user interface of the application created by the second set of one or more rules. Changing the visual distinctness of the affordance based on the display mode of the application user interface helps to adjust the visibility of the affordance in accordance with the display mode of the application user interface, thereby enhancing the operability of the device (e.g., by intelligently balancing the requirement of sufficient visibility and the requirement of unobtrusiveness of the affordance, and helping the user to provide the required input to achieve a desired outcome) and making the user-device operation more efficient (e.g., by reducing distraction to the user and reduce user mistakes when using or interacting with the device).

It should be understood that the particular order in which the operations in FIGS. 7A-7E have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 6000 and 8000) are also applicable in an analogous manner to method 7000 described above with respect to FIGS. 7A-7E. For example, the contacts, gestures, user interface objects, application views, control panels, controls, affordances, position thresholds, directional conditions, inversion curves, filters, value ranges, navigation criteria, movement parameters, focus selectors, and/or animations described above with reference to method 7000 optionally have one or more of the characteristics of the contacts, gestures, user interface objects, application views, control panels, controls, position thresholds, directional conditions, navigation criteria, movement parameters, focus selectors, and/or animations described herein with reference to other methods described herein (e.g., methods 6000, and 8000). For brevity, these details are not repeated here.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 7A-7E are, optionally, implemented by components depicted in FIGS. 1A-1B. For example, detection operation and displaying operation are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

FIGS. 8A-8F are flow diagrams illustrating a method of changing an appearance and an affordance appearance type of an affordance in accordance with changes in an appearance of the underlying content, in accordance with some embodiments. The method 8000 is performed at an electronic device (e.g., device 300, FIG. 3, or portable multifunction device 100, FIG. 1A) with a display and a touch-sensitive surface. In some embodiments, the electronic device includes one or more sensors to detect intensity of contacts with the touch-sensitive surface. In some embodiments, the touch-sensitive surface and the display are integrated into a touch-sensitive display. In some embodiments, the display is a touch-screen display and the touch-sensitive surface is on or integrated with the display. In some embodiments, the display is separate from the touch-sensitive surface. Some operations in method 8000 are, optionally, combined and/or the order of some operations is, optionally, changed.

Method 8000 relates to displaying an affordance (e.g., an affordance that indicates the acceptable starting region of a gesture for performing a predefined operation in the user interface such as displaying a home screen or application switcher user interface) over content in a manner where a display property (e.g., gray value, or luminance value) of the affordance is dynamically changed based on a change in the same display property of the underlying content. In addition, the method requires that the affordance-appearance range of values switches between two different values ranges (e.g., a "dark affordance" value range, and a "light affordance" value range) depending on whether predefined range-switching criteria are met by the change in the display property of the underlying content. As a result, the device is able to adapt the appearance of the affordance to the changes in the underlying content in order to maintain a visual contrast between the affordance and the underlying content, and provide the affordance in a less distracting or intrusive manner (e.g., by avoiding rapid flickering of the affordance caused by changing the appearance of the affordance too rapidly which will, in some circumstances, be distracting to the user) without being constrained by an initial choice of the affordance appearance type (e.g., the "light" or "dark" affordance type). Providing an affordance with the dynamically changed appearance based on the appearance of the underlying content and allowing dynamic switching of the affordance-appearance value ranges over time based on the changes in the underlying content in the manner described herein enhance the operability of the device (e.g., by providing visual guidance to the user about the required input for a desired outcome without undue distraction to the user, which reduces user mistakes when operating the device) and make the user-device interface more efficient (e.g., by helping the user to achieve an intended outcome with required inputs and reducing user mistakes when operating/interacting with the device), which improve battery life of the device (e.g., by helping the user to use the device more quickly and efficiently). Providing an affordance in the manner described herein allows an on-screen affordance to effectively replace and improves over a hardware button that serves the same function (e.g., displaying the home screen) in many different user interface contexts, which helps to reduce manufacturing and maintenance cost of the device. Providing an affordance in the manner described herein also helps to reduce and eliminate burn-in issues of the display.

A method 8000 is performed at a device having a display and a touch-sensitive surface (e.g., a touch-screen display that serves both as the display and the touch-sensitive surface). The device displays (8002), on the display, content (e.g., a home screen, a widget screen, a desktop, a user interface of an application, a media player user interface, etc.) and an affordance (e.g., a home affordance that indicates a home gesture reactive region on the display), wherein: the affordance is displayed over a portion of the content; a value of a display property (e.g., a gray value or luminance value of an image (e.g., a color image or monochromatic image), an intrinsic display parameter other than the gray value or luminance value (e.g., hue, saturation, etc. of a full-colored image), or a derived display parameter calculated based on one or more intrinsic display parameters (e.g., a gray value or luminance value or minor variants or equivalents thereof of a full-colored image)) of the affordance is determined based a value of the same display property of the portion of the content over which the affordance is displayed; and the value of the display property of the content is permitted to vary within a first range of values (e.g., a range of [0, 1], optionally on a scale from 0% luminance to 100% luminance where 0% luminance is 0 and 100% luminance is 1), and the value of the display property of the affordance is constrained to vary within an affordance-appearance range of values that is smaller than the first range of values (e.g., the affordance-appearance range of values is [0, 0.4], optionally on a scale from black to white where black is 0 and white is 1, for the dark affordance type, or [0.6, 1] for the light affordance type, both of which are smaller than the value range of the content [0, 1], optionally on a scale from 0% luminance to 100% luminance where 0% luminance is 0 and 100% luminance is 1). While displaying the content and the affordance and while the affordance-appearance-range of values is a second range of values (e.g., the affordance-appearance range of values for the dark affordance [0, 0.4], optionally on a scale from black to white where black is 0 and white is 1), the device detects (8004) a change in appearance of the content over which the affordance is displayed. In response to detecting the change in appearance of the content over which the affordance is displayed, the device changes (8006) the appearance of the affordance (e.g., based on a short-timescale appearance change strategy and a long-timescale appearance change strategy), including: in accordance with a determination that the change in appearance of the content has met range-switching criteria (e.g., the range-switching criteria are met when a measure of the overall lightness or darkness of the content underneath and around the affordance (e.g., a cumulated and aggregated value for the display property (e.g., gray value or luminance) due to the changes in the appearance of the background content) crosses a first threshold value): shifting the affordance-appearance range of values to a third range of values (e.g., the affordance-appearance range of values for the light affordance [0.6, 1], optionally on a scale from black to white where black is 0 and white is 1), wherein the third range of values is different from the second range of values (e.g., the third range of values includes at least one value that is not included in the second range of values and is, optionally, non-overlapping with the second range of values) (e.g., the currently selected affordance type changes from the previously selected affordance type (e.g., the dark affordance) to an alternative affordance type (e.g., the light affordance) when the range-switching criteria are met), and the third range of values (e.g., [0.6, 1], optionally on a scale from black to white where black is 0 and white is 1) is smaller than the first range of values; and changing the value of the display property of the affordance in accordance with the value of the same display property of the content over which the affordance is displayed (e.g., the value of the display property for each pixel of the affordance is determined based on a first predefined value mapping corresponding to the currently selected affordance type (e.g., the light affordance)), wherein the display property of the affordance is constrained to vary within the affordance-appearance range of values; and in accordance with a determination that the change in appearance of the content has not met the range-switching criteria, changing the value of the display property of the affordance in accordance with the value of the same display property of the content over which the affordance is displayed (e.g., the value of the display property for each pixel of the affordance is determined based on a second predefined conversion relationship corresponding to the currently selected affordance type (e.g., the dark affordance)), while maintaining the affordance-appearance range of values as the second range of values (e.g., the currently selected affordance type remains the same as the previously selected affordance type (e.g., the dark affordance) when the first criteria are not met). This is illustrated in FIGS. 5AD-5AE, for example.

In some embodiments, the range-switching criteria include (8008) range-switching-trigger criteria and range-switching-completion criteria, the range-switching-trigger criteria require that the change in appearance of the content includes a first amount of change over a first period of time that causes a predefined measure of content appearance (e.g., a biased running average of a display property such as the aggregated luminance values for the portion of the content that is underneath the affordance and below the affordance) to cross a predefined threshold value (e.g., the predefined threshold value is a first threshold value when switching from the light affordance to the dark affordance, and is a second threshold value distinct from the first threshold value when switching from the dark affordance to the light affordance), and the range-switching-completion criteria require that the change in appearance of the content does not include a second amount of change over a second period of time after the first period of time to meet the range-switching-trigger criteria again before a predefined transition period (e.g., 5 seconds) expires after the range-switching-trigger criteria are met. Requiring that the range-switching trigger criteria are not met again within a predefined transition period after the range-switching trigger criteria is met for a first time in order to complete the affordance appearance range-switching between the two value ranges enhances the operability of the device (e.g., by avoiding unnecessary switching of the affordance appearance type and causing distraction to the user when the changes in the underlying content is transient) and makes the user-device operation more efficient (e.g., by reducing distraction to the user and reduce user mistakes when using or interacting with the device), which improves battery life of the device (e.g., reducing demands on the processors and screen due to the range switching).

In some embodiments, the predefined threshold value used for the range-switching-trigger criteria is (8010) selected based on a current range of values that is being used as the affordance-appearance range of values (e.g., the range of values for the currently used affordance type), including: using a first threshold value as the predefined threshold value when the affordance-appearance range of values is the second range of values; and using a second threshold value as the predefined threshold value when the affordance-appearance range of values is the third range of values. (In some embodiments, when the affordance-appearance range of values is between the second range of values (e.g., a range of values associated with a "dark affordance") and the third range of values (e.g., a range of values associated with a "light affordance"), the predefined threshold value is based on whichever range of values was most recently selected as the affordance-appearance range of values (e.g., once the "light affordance" range of affordance-appearance values has been selected as the target range of affordance-appearance values, the "light affordance" threshold value is used for determining when to switch back to the "dark affordance" range of affordance-appearance values, and once the "dark affordance" range of affordance-appearance values has been selected as the target range of affordance-appearance values, the "dark affordance" threshold value is used for determining when to switch back to the "light affordance" range of affordance-appearance values). Using different threshold values for the range-switching trigger criteria enhances the operability of the device (e.g., by adjusting a bias toward a currently selected affordance appearance type and avoiding unnecessary switching of the affordance appearance type and causing distraction to the user when the changes in the underlying content is transient) and makes the user-device operation more efficient (e.g., by reducing distraction to the user and reduce user mistakes when using or interacting with the device), which improves battery life of the device (e.g., reducing demands on the processors and screen due to the range switching).

In some embodiments, changing the appearance of the affordance in response to detecting the change in appearance of the content over which the affordance is displayed includes (8012): in accordance with a determination that the range-switching-trigger criteria are met by the first amount of change during the first period of time and before the range-switching-completion criteria are met: shifting the affordance-appearance range of values to an intermediate range of values that is different from the second range of values and the third range of values (e.g., an intermediate range of values [0.3-0.7], optionally on a scale from black to white where black is 0 and white is 1, that has a starting value that is between the starting value of the second range of values and the starting value of the third range of values, and has an ending value that is between the ending value of the second range of values and the ending value of the third range of values); and changing the value of the display property of the affordance in accordance with the value of the same display property of the content over which the affordance is displayed (e.g., the value of the display property for each pixel of the affordance is determined based on a first predefined value mapping corresponding to the currently selected affordance type (e.g., the light affordance)), wherein the display property of the affordance is constrained to vary within the affordance-appearance range of values. In some embodiments, there are multiple intermediate range of values between the second range of values and the third range of values, and the device sequentially move through each of the multiple intermediate ranges of values over the predefined transition period until the range-switching completion criteria are met. After the range-switching completion criteria are met, the display property of the affordance is constrained within the third range of values when the display property of the affordance is varied in accordance with any additional change in appearance of the content. Shifting the affordance-appearance range of values to an intermediate range of values that are different from (e.g., between) the appearance-range values of the two stable affordance appearance types as a transition during the switching between the two stable affordance appearance types enhances the operability of the device (e.g., by making the switching of the affordance appearance type more subtle and less distracting to the user) and makes the user-device operation more efficient (e.g., by reducing distraction to the user and reduce user mistakes when using or interacting with the device), which improves battery life of the device (e.g., by allowing the user to operate the device more quickly and efficiently).

In some embodiments, the change in appearance of the content includes (8014) a third amount of change over a third period of time that is after the first period of time, after the range-switching-trigger criteria are met, and before the range-switching-completion criteria are met. For example, after the range-switching-trigger criteria are met, the device selects an intermediate content-affordance appearance inversion curve that is located between the content-affordance appearance inversion curves for the light affordance and the dark affordance, and uses the intermediate inversion curve to determine how to change the luminance of the affordance based on the change in luminance of the content during the transition period (e.g., within 5 seconds after meeting the range-switching-trigger criteria). Allowing the appearance of the affordance to continue to change with the underlying content while the affordance appearance range is shifting from one stable value range to the other stable value range over a period of time enhances the operability of the device (e.g., by providing visual continuity in the appearance of the affordance during the switching of affordance appearance type) and makes the user-device operation more efficient (e.g., by reducing distraction to the user and reduce user mistakes when using or interacting with the device), which improves battery life of the device (e.g., by allowing the user to operate the device more quickly and efficiently).

In some embodiments, the change in appearance of the content over which the affordance is displayed is (8016) caused by scrolling of the content, and the range-switching criteria do not require absence of scrolling of the content in order for the range-switching criteria to be met. Allowing the appearance of the affordance to change with the underlying content while the underlying content is scrolled enhances the operability of the device (e.g., by providing visual continuity in the appearance of the affordance while the underlying content is scrolled) and makes the user-device operation more efficient (e.g., by reducing distraction to the user and reduce user mistakes when using or interacting with the device), which improves battery life of the device (e.g., by allowing the user to operate the device more quickly and efficiently).

In some embodiments, the change in appearance of the content over which the affordance is displayed is (8018) caused by movement of the content under the affordance (e.g., zooming or scrolling of the content), and the range-switching criteria require that the content under the affordance moves by less than a predefined amount for at least a predetermined amount of time in order for the range-switching criteria to be met. For example, in addition to requiring that the predefined measure of content appearance (e.g., a biased running average of a display property such as the aggregated luminance values for the portion of the content that is underneath the affordance and below the affordance) to cross the predefined threshold value, the range-switching criteria further require that the content remains substantially stationary for a brief moment around the time that the predefined threshold value is crossed. Requiring that the content underlying the affordance to be substantially stationary (e.g., stop scrolling) in order to fulfill the range-switching criteria enhances the operability of the device (e.g., by avoiding unnecessary switching of affordance appearance type back and forth when content is changing quickly due to continued scrolling) and makes the user-device operation more efficient (e.g., by reducing distraction to the user and reduce user mistakes when using or interacting with the device), which improves battery life of the device (e.g., by allowing the user to operate the device more quickly and efficiently).

In some embodiments, changing the value of the display property of the affordance in accordance with the value of the same display property of the content includes (8020): in accordance with a determination that the value of the display property of the content has decreased (and, optionally, that the value of the display property of the content is within a predefined sub-range of the first range of values (e.g., outside of the two special ranges of content values for which there exists a discontinuity for the affordance values)), increasing the value of the display property of the affordance in accordance with a magnitude of a change (e.g., the decrease) in the value of the display property of the content (e.g., when the content underlying the affordance becomes darker, the affordance becomes lighter); and in accordance with a determination that the value of the display property of the content has increased (and, optionally, that the value of the display property of the content is within a predefined sub-range of the first range of values (e.g., outside of the two special ranges of content values for which there exists a discontinuity for the affordance values)), decreasing the value of the display property of the affordance in accordance with a magnitude of the change (e.g., the increase) in the value of the display property of the content (e.g., when the content underlying the affordance becomes lighter, the affordance becomes darker). Using value inversion (e.g., increasing value for affordance with decreasing content value, and decreasing value for affordance when increasing content value) to determine the value of the display property of the affordance based on the value of the same display property of the underlying content enhances the operability of the device (e.g., by providing sufficient visibility of the affordance without being distracting or intrusive) and makes the user-device operation more efficient (e.g., by reducing distraction to the user and reduce user mistakes when using or interacting with the device), which improves battery life of the device (e.g., by allowing the user to operate the device more quickly and efficiently).

In some embodiments, a given magnitude of change in the value of the display property of the content causes (e.g., 8022) the same amount of change in the value of the display property of the affordance when the value of the display property of the affordance is varied within the second range of values (e.g., before the range-switching criteria are met) and when the value of the display property of the affordance is varied within the third range of values (e.g., after the range-switching criteria are met). This is illustrated in FIGS. 5AE and 5AF, for example. In some embodiments, the content-affordance appearance inversion curve between the display property of the affordance and the same display property of the content (e.g., the affordance luminance v. background luminance curve) has the same shape for the dark affordance and the light affordance, and the luminance value for each pixel of the affordance is looked up from a database of prestored luminance value pairs for a currently selected affordance type. Requiring that the content underlying the affordance to be substantially stationary (e.g., stop scrolling) in order to fulfill the range-switching criteria enhances the operability of the device (e.g., by avoiding unnecessary switching of affordance appearance type back and forth when content is changing quickly due to continued scrolling) and makes the user-device operation more efficient (e.g., by reducing distraction to the user and reduce user mistakes when using or interacting with the device), which improves battery life of the device (e.g., by allowing the user to operate the device more quickly and efficiently).

In some embodiments, the device shifts (8024) the affordance-appearance range of values from the second range of values (e.g., the affordance-appearance range of values for the dark affordance) to the third range of values (e.g., the affordance-appearance range of values for the light affordance) includes gradually shifting from the second range of values to the third range of values over a period of time (e.g., 5 seconds); and the method includes, while gradually shifting the affordance-appearance range of values from the second range of values to the third range of values: detecting an additional change in appearance of the content over which the affordance is displayed; and in response to detecting the additional change in appearance of the content over which the affordance is displayed, changing the appearance of the affordance in accordance with the affordance-appearance range of values (e.g., as the affordance-appearance range of values are shifted gradually over time), including: in accordance with a determination that the change in appearance of the content meets the range-switching criteria (e.g., meets the range-switching criteria for a second time), starting to gradually shift the affordance-appearance range of values back to the second range of values (e.g., shifting the start and end points of the range of values over a period of time such as 1, 2, 3, 4, 5, 10 seconds); and in accordance with a determination that the change in appearance of the content does not meet the range-switching criteria (e.g., meets the range-switching criteria for a second time), continuing to gradually shift the affordance-appearance range of values from the second range of values to the third range of values. In some embodiments, as noted above, the predefined threshold used to determine whether the range-switching criteria are met changes based on whether the target range of values for the affordance-appearance range of values is the second range of values (e.g., for the dark affordance) or the third range of values (e.g., for the light affordance). The method allows the affordance to switch from one appearance type to another appearance type gradually over a predefined transition period; and during the predefined transition period, the appearance value of the affordance continues to change in accordance with the change in the appearance value of the underlying content. Furthermore, during the shifting of the appearance value range, the range-switching criteria may be met again (e.g., due to the continued changes in the appearances of the content and the affordance). As a result, the range switching that has been triggered is enabled, by the device, to be reversed or proceed to complete depending on whether the range-switching criteria are met again during the transition period. The mechanism for reversing the range switching during the transition period enhances the operability of the device (e.g., by avoiding unnecessary switching of affordance appearance type back and forth when content is changing quickly) and makes the user-device operation more efficient (e.g., by reducing distraction to the user and reduce user mistakes when using or interacting with the device), which improves battery life of the device (e.g., by allowing the user to operate the device more quickly and efficiently).

In some embodiments, after changing the value of the display property of the affordance within the third range of values in accordance with a determination that the change in appearance of the content has met the range-switching criteria, the device detects (8026) an additional change in appearance of the content over which the affordance is displayed; and in response to detecting the additional change in appearance of the content over which the affordance is displayed, the device changes the appearance of the affordance, including: in accordance with a determination that the additional change in appearance of the content has met the range-switching-trigger criteria for a first time and has not met the range-switching-completion criteria, changing the value of the display property of the affordance in accordance with the value of the same display property of the content over which the affordance is displayed (e.g., the value of the display property for each pixel of the affordance is determined based on a first predefined value mapping corresponding to the currently selected affordance type (e.g., the light affordance)), wherein the display property of the affordance is constrained to vary within a first intermediate range of values between the second range of values and the third range of values; in accordance with a determination that the additional change in appearance of the content has met the range-switching-trigger criteria for a second time after the first time without having met the range-switching-completion-criteria, changing the value of the display property of the affordance in accordance with the value of the same display property of the content over which the affordance is displayed, wherein the display property of the affordance is constrained to vary within a second intermediate range of values between the third range of values and the first range of intermediate values; and in accordance with a determination that the additional change in appearance of the content has met the range-switching-trigger criteria only once before meeting the range-switching-completion-criteria, changing the value of the display property of the affordance in accordance with the value of the same display property of the content over which the affordance is displayed, wherein the display property of the affordance is constrained to vary within the second range of values. After the affordance has switched from a first appearance type to a second appearance type (e.g., in response to the range-switching criteria being met for a first time), the affordance may start to switch back from the second appearance type to the first appearance type if the range-switching-trigger criteria are met again. During a predefined transition period, the appearance value range continues to shift from the value range of the second appearance type to the value range of the first appearance type. During the shifting of the appearance value range, the range-switching-trigger criteria may be met another time (e.g., due to the continued changes in the appearances of the content and the affordance). As a result, the range switching that has been triggered may be reversed from its current state and proceeds toward the value range of the second appearance type again. The mechanism for reversing the range switching during the transition period enhances the operability of the device (e.g., by avoiding unnecessary switching of affordance appearance type back and forth when content is changing quickly) and makes the user-device operation more efficient (e.g., by reducing distraction to the user and reduce user mistakes when using or interacting with the device), which improves battery life of the device (e.g., by allowing the user to operate the device more quickly and efficiently).

In some embodiments, when the home affordance is initially displayed (e.g., a switch of context occurs which causes a change in the content displayed on the screen), the device has not accumulated sufficient amount of information on the underlying content to affirmatively select the light affordance versus the dark affordance based on the measure of content appearance in a manner as described in various embodiments. As such, the device optionally sets the value of the display property for the affordance to a predefined value such as an intermediate value (e.g., 0.5, or 50% of the full luminance value) and then let the dynamic algorithms described above update the affordance appearance value over time (e.g., in accordance with both the short-timescale and the long-timescale strategies described herein). In some embodiments, when the affordance is initially displayed, the rate of progression for switching the affordance appearance type is temporarily increased (e.g., the bias toward maintaining the currently selected affordance type is reduced) such that the home affordance adapts quickly either to the light affordance or the dark affordance based on the appearance of the underlying content. In some embodiments, the situations where the home affordance are initially displayed are triggered by a context switching event in the user interface, such as, when a new application user interface is displayed (e.g., via selection of a recently open application in a multitasking user interface or launching an application from an application icon on the home screen), when a coversheet user interface (e.g., a system level information screen) is pulled down from an edge of the display to cover a currently displayed application user interface or home screen, or when the user interface is rotated (e.g., due to a rotation of the device), etc. In some embodiments, the affordance is initially displayed with an animated transition that includes gradually increasing an opacity of the affordance over time, sliding the affordance onto the screen from an edge of the screen over time, and/or gradually increasing a size of the affordance over time.

It should be understood that the particular order in which the operations in FIGS. 8A-8F have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 6000 and 7000) are also applicable in an analogous manner to method 8000 described above with respect to FIGS. 8A-8E. For example, the contacts, gestures, user interface objects, application views, control panels, controls, affordances, position thresholds, directional conditions, inversion curves, filters, value ranges, navigation criteria, movement parameters, focus selectors, and/or animations described above with reference to method 8000 optionally have one or more of the characteristics of the contacts, gestures, user interface objects, application views, control panels, controls, position thresholds, directional conditions, navigation criteria, movement parameters, focus selectors, and/or animations described herein with reference to other methods described herein (e.g., methods 6000, and 7000). For brevity, these details are not repeated here.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 8A-8F are, optionally, implemented by components depicted in FIGS. 1A-1B. For example, detection operation, shifting operation, and changing operation are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A method, comprising:
at a device having a display and a touch-sensitive surface:
displaying, on the display, content and an affordance, wherein:
the affordance is displayed over a portion of the content;
a value of a display property of the affordance is determined based a value of the same display property of the portion of the content over which the affordance is displayed; and
the value of the display property of the content is permitted to vary within a first range of values, and the value of the display property of the affordance is constrained to vary within an affordance-appearance range of values that is smaller than the first range of values;
while displaying the content and the affordance and while the affordance-appearance range of values is a second range of values, detecting a change in appearance of the content over which the affordance is displayed; and
in response to detecting the change in appearance of the content over which the affordance is displayed, changing the appearance of the affordance, including:
in accordance with a determination that the change in appearance of the content has met range-switching criteria:
shifting the affordance-appearance range of values to a third range of values, wherein the third range of values is different from the second range of values, and the third range of values is smaller than the first range of values; and
changing the value of the display property of the affordance in accordance with the value of the same display property of the content over which the affordance is displayed, wherein the display property of the affordance is constrained to vary within the affordance-appearance range of values; and
in accordance with a determination that the change in appearance of the content has not met the range-switching criteria, changing the value of the display property of the affordance in accordance with the value of the same display property of the content over which the affordance is displayed, while maintaining the affordance-appearance range of values as the second range of values.

2. The method of claim 1, wherein:
the range-switching criteria include range-switching-trigger criteria and range-switching-completion criteria,
the range-switching-trigger criteria require that the change in appearance of the content includes a first amount of change over a first period of time that causes a predefined measure of content appearance to cross a predefined threshold value, and the range-switching-completion criteria require that the change in appearance of the content does not include a second amount of change over a second period of time after the first period of time to meet the range-switching-trigger criteria again before a predefined transition period expires after the range-switching-trigger criteria are met.

3. The method of claim 2, wherein, the predefined threshold value used for the range-switching-trigger criteria is selected based on a current range of values that is being used as the affordance-appearance range of values, including:

using a first threshold value as the predefined threshold value when the affordance-appearance range of values is the second range of values; and using a second threshold value as the predefined threshold value when the affordance-appearance range of values is the third range of values.

4. The method of claim 3, wherein changing the appearance of the affordance in response to detecting the change in appearance of the content over which the affordance is displayed includes:

in accordance with a determination that the range-switching-trigger criteria are met by the first amount of change during the first period of time and before the range-switching-completion criteria are met:

shifting the affordance-appearance range of values to an intermediate range of values that is different from the second range of values and the third range of values; and changing the value of the display property of the affordance in accordance with the value of the same display property of the content over which the affordance is displayed, wherein the display property of the affordance is constrained to vary within the affordance-appearance range of values.

5. The method of claim 4, wherein the change in appearance of the content includes a third amount of change over a third period of time that is after the first period of time, after the range-switching-trigger criteria are met, and before the range-switching-completion criteria are met.

6. The method of claim 1, wherein the change in appearance of the content over which the affordance is displayed is caused by scrolling of the content, and the range-switching criteria do not require absence of scrolling of the content in order for the range-switching criteria to be met.

7. The method of claim 1, wherein the change in appearance of the content over which the affordance is displayed is caused by movement of the content under the affordance, and the range-switching criteria require that the content under the affordance moves by less than a predefined amount for at least a predetermined amount of time in order for the range-switching criteria to be met.

8. The method of claim 1, wherein changing the value of the display property of the affordance in accordance with the value of the same display property of the content includes:

in accordance with a determination that the value of the display property of the content has decreased, increasing the value of the display property of the affordance in accordance with a magnitude of a change in the value of the display property of the content; and in accordance with a determination that the value of the display property of the content has increased, decreasing the value of the display property of the affordance in accordance with a magnitude of the change in the value of the display property of the content.

9. The method of claim 1, wherein a given magnitude of change in the value of the display property of the content causes the same amount of change in the value of the display property of the affordance when the value of the display property of the affordance is varied within the second range of values and when the value of the display property of the affordance is varied within the third range of values.

10. The method of claim 1, wherein:

shifting the affordance-appearance range of values from the second range of values to the third range of values includes gradually shifting from the second range of values to the third range of values over a period of time; and the method includes, while gradually shifting the affordance-appearance range of values from the second range of values to the third range of values:

detecting an additional change in appearance of the content over which the affordance is displayed; and in response to detecting the additional change in appearance of the content over which the affordance is displayed, changing the appearance of the affordance in accordance with the affordance-appearance range of values, including:

in accordance with a determination that the change in appearance of the content meets the range-switching criteria, starting to gradually shift the affordance-appearance range of values back to the second range of values; and in accordance with a determination that the change in appearance of the content does not meet the range-switching criteria, continuing to gradually shift the affordance-appearance range of values from the second range of values to the third range of values.

11. The method of claim 2, including:

after changing the value of the display property of the affordance within the third range of values in accordance with a determination that the change in appearance of the content has met the range-switching criteria, detecting an additional change in appearance of the content over which the affordance is displayed; and in response to detecting the additional change in appearance of the content over which the affordance is displayed, changing the appearance of the affordance, including:

in accordance with a determination that the additional change in appearance of the content has met the range-switching-trigger criteria for a first time and has not met the range-switching-completion criteria, changing the value of the display property of the affordance in accordance with the value of the same display property of the content over which the affordance is displayed, wherein the display property of the affordance is constrained to vary within a first intermediate range of values between the second range of values and the third range of values;

in accordance with a determination that the additional change in appearance of the content has met the range-switching-trigger criteria for a second time after the first time without having met the range-switching-completion criteria, changing the value of the display property of the affordance in accordance with the value of the same display property of the content over which the affordance is displayed, wherein the display property of the affordance is constrained to vary within a second intermediate range of values between the third range of values and the first range of intermediate values; and in accordance with a determination that the additional change in appearance of the content has met the range-switching-trigger criteria only once before meeting the range-switching-completion criteria, changing the value of the display property of the affordance in accordance with the value of the same display property of the content over which the affordance is displayed, wherein the display property of the affordance is constrained to vary within the second range of values.

12. A non-transitory computer readable storage medium storing one or more programs, the one or more programs comprising instructions, which when executed by an electronic device with a display and a touch-sensitive surface, cause the device to:
display, on the display, content and an affordance, wherein:
the affordance is displayed over a portion of the content;
a value of a display property of the affordance is determined based a value of the same display property of the portion of the content over which the affordance is displayed; and
the value of the display property of the content is permitted to vary within a first range of values, and the value of the display property of the affordance is constrained to vary within an affordance-appearance range of values that is smaller than the first range of values;
while displaying the content and the affordance and while the affordance-appearance range of values is a second range of values, detect a change in appearance of the content over which the affordance is displayed; and
in response to detecting the change in appearance of the content over which the affordance is displayed, change the appearance of the affordance, including:
in accordance with a determination that the change in appearance of the content has met range-switching criteria:
shift the affordance-appearance range of values to a third range of values, wherein the third range of values is different from the second range of values, and the third range of values is smaller than the first range of values; and
change the value of the display property of the affordance in accordance with the value of the same display property of the content over which the affordance is displayed, wherein the display property of the affordance is constrained to vary within the affordance-appearance range of values; and
in accordance with a determination that the change in appearance of the content has not met the range-switching criteria, change the value of the display property of the affordance in accordance with the value of the same display property of the content over which the affordance is displayed, while maintaining the affordance-appearance range of values as the second range of values.

13. The computer readable storage medium of claim 12, wherein:
the range-switching criteria include range-switching-trigger criteria and range-switching-completion criteria;
the range-switching-trigger criteria require that the change in appearance of the content includes a first amount of change over a first period of time that causes a predefined measure of content appearance to cross a predefined threshold value, and
the range-switching-completion criteria require that the change in appearance of the content does not include a second amount of change over a second period of time after the first period of time to meet the range-switching-trigger criteria again before a predefined transition period expires after the range-switching-trigger criteria are met.

14. The computer readable storage medium of claim 13, wherein, the predefined threshold value used for the range-switching-trigger criteria is selected based on a current range of values that is being used as the affordance-appearance range of values, including:
using a first threshold value as the predefined threshold value when the affordance-appearance range of values is the second range of values; and
using a second threshold value as the predefined threshold value when the affordance-appearance range of values is the third range of values.

15. The computer readable storage medium of claim 14, wherein changing the appearance of the affordance in response to detecting the change in appearance of the content over which the affordance is displayed includes:
in accordance with a determination that the range-switching-trigger criteria are met by the first amount of change during the first period of time and before the range-switching-completion criteria are met:
shifting the affordance-appearance range of values to an intermediate range of values that is different from the second range of values and the third range of values; and
changing the value of the display property of the affordance in accordance with the value of the same display property of the content over which the affordance is displayed, wherein the display property of the affordance is constrained to vary within the affordance-appearance range of values.

16. The computer readable storage medium of claim 15, wherein the change in appearance of the content includes a third amount of change over a third period of time that is after the first period of time, after the range-switching-trigger criteria are met, and before the range-switching-completion criteria are met.

17. The computer readable storage medium of claim 12, wherein the change in appearance of the content over which the affordance is displayed is caused by scrolling of the content, and the range-switching criteria do not require absence of scrolling of the content in order for the range-switching criteria to be met.

18. The computer readable storage medium of claim 12, wherein the change in appearance of the content over which the affordance is displayed is caused by movement of the content under the affordance, and the range-switching criteria require that the content under the affordance moves by less than a predefined amount for at least a predetermined amount of time in order for the range-switching criteria to be met.

19. The computer readable storage medium of claim 12, wherein changing the value of the display property of the affordance in accordance with the value of the same display property of the content includes:
in accordance with a determination that the value of the display property of the content has decreased, increasing the value of the display property of the affordance in accordance with a magnitude of a change in the value of the display property of the content; and in accordance with a determination that the value of the display property of the content has increased, decreasing the value of the display property of the affordance in accordance with a magnitude of the change in the value of the display property of the content.

20. The computer readable storage medium of claim 12, wherein a given magnitude of change in the value of the display property of the content causes the same amount of change in the value of the display property of the affordance when the value of the display property of the affordance is varied within the second range of values and when the value of the display property of the affordance is varied within the third range of values.

21. The computer readable storage medium of claim 12, wherein:
shifting the affordance-appearance range of values from the second range of values to the third range of values includes gradually shifting from the second range of values to the third range of values over a period of time; and
the instructions, when executed by the electronic device with the display and the touch-sensitive surface, cause the device to:
while gradually shifting the affordance-appearance range of values from the second range of values to the third range of values:
detect an additional change in appearance of the content over which the affordance is displayed; and
in response to detecting the additional change in appearance of the content over which the affordance is displayed, change the appearance of the affordance in accordance with the affordance-appearance range of values, including:
in accordance with a determination that the change in appearance of the content meets the range-switching criteria, starting to gradually shift the affordance-appearance range of values back to the second range of values; and
in accordance with a determination that the change in appearance of the content does not meet the range-switching criteria, continuing to gradually shift the affordance-appearance range of values from the second range of values to the third range of values.

22. The computer readable storage medium of claim 13, the instructions, when executed by the electronic device with the display and the touch-sensitive surface, cause the device to:
after changing the value of the display property of the affordance within the third range of values in accordance with a determination that the change in appearance of the content has met the range-switching criteria, detect an additional change in appearance of the content over which the affordance is displayed; and
in response to detecting the additional change in appearance of the content over which the affordance is displayed, change the appearance of the affordance, including:
in accordance with a determination that the additional change in appearance of the content has met the range-switching-trigger criteria for a first time and has not met the range-switching-completion criteria, changing the value of the display property of the affordance in accordance with the value of the same display property of the content over which the affordance is displayed, wherein the display property of the affordance is constrained to vary within a first intermediate range of values between the second range of values and the third range of values;
in accordance with a determination that the additional change in appearance of the content has met the range-switching-trigger criteria for a second time after the first time without having met the range-switching-completion criteria, changing the value of the display property of the affordance in accordance with the value of the same display property of the content over which the affordance is displayed, wherein the display property of the affordance is constrained to vary within a second intermediate range of values between the third range of values and the first range of intermediate values; and
in accordance with a determination that the additional change in appearance of the content has met the range-switching-trigger criteria only once before meeting the range-switching-completion criteria, changing the value of the display property of the affordance in accordance with the value of the same display property of the content over which the affordance is displayed, wherein the display property of the affordance is constrained to vary within the second range of values.

23. An electronic device, comprising:
a display;
a touch-sensitive surface;
one or more processors;
memory; and
one or more programs, wherein the one or more programs are stored in the memory and configured to be executed by the one or more processors, the one or more programs including instructions for:
displaying, on the display, content and an affordance, wherein:
the affordance is displayed over a portion of the content;
a value of a display property of the affordance is determined based a value of the same display property of the portion of the content over which the affordance is displayed; and
the value of the display property of the content is permitted to vary within a first range of values, and the value of the display property of the affordance is constrained to vary within an affordance-appearance range of values that is smaller than the first range of values;
while displaying the content and the affordance and while the affordance-appearance range of values is a second range of values, detecting a change in appearance of the content over which the affordance is displayed; and
in response to detecting the change in appearance of the content over which the affordance is displayed, changing the appearance of the affordance, including:
in accordance with a determination that the change in appearance of the content has met range-switching criteria:
shifting the affordance-appearance range of values to a third range of values, wherein the third range of values is different from the second range of values, and the third range of values is smaller than the first range of values; and
changing the value of the display property of the affordance in accordance with the value of the same display property of the content over which the affordance is displayed, wherein the display property of the affordance is constrained to vary within the affordance-appearance range of values; and in accordance with a determination that the change in appearance of the content has not met the range-switching criteria, changing the value of the display property of the affordance in accordance with the value of the same display property of the content over which the affordance is displayed, while maintaining the affordance-appearance range of values as the second range of values.

24. The electronic device of claim 23, wherein:
the range-switching criteria include range-switching-trigger criteria and range-switching-completion criteria,
the range-switching-trigger criteria require that the change in appearance of the content includes a first amount of change over a first period of time that causes a predefined measure of content appearance to cross a predefined threshold value, and
the range-switching-completion criteria require that the change in appearance of the content does not include a second amount of change over a second period of time after the first period of time to meet the range-switching-trigger criteria again before a predefined transition period expires after the range-switching-trigger criteria are met.

25. The electronic device of claim 24, wherein, the predefined threshold value used for the range-switching-trigger criteria is selected based on a current range of values that is being used as the affordance-appearance range of values, including:
using a first threshold value as the predefined threshold value when the affordance-appearance range of values is the second range of values; and
using a second threshold value as the predefined threshold value when the affordance-appearance range of values is the third range of values.

26. The electronic device of claim 25, wherein changing the appearance of the affordance in response to detecting the change in appearance of the content over which the affordance is displayed includes:
in accordance with a determination that the range-switching-trigger criteria are met by the first amount of change during the first period of time and before the range-switching-completion criteria are met:
shifting the affordance-appearance range of values to an intermediate range of values that is different from the second range of values and the third range of values; and
changing the value of the display property of the affordance in accordance with the value of the same display property of the content over which the affordance is displayed, wherein the display property of the affordance is constrained to vary within the affordance-appearance range of values.

27. The electronic device of claim 26, wherein the change in appearance of the content includes a third amount of change over a third period of time that is after the first period of time, after the range-switching-trigger criteria are met, and before the range-switching-completion criteria are met.

28. The electronic device of claim 23, wherein the change in appearance of the content over which the affordance is displayed is caused by scrolling of the content, and the range-switching criteria do not require absence of scrolling of the content in order for the range- switching criteria to be met.

29. The electronic device of claim 23, wherein the change in appearance of the content over which the affordance is displayed is caused by movement of the content under the affordance, and the range-switching criteria require that the content under the affordance moves by less than a predefined amount for at least a predetermined amount of time in order for the range-switching criteria to be met.

30. The electronic device of claim 23, wherein changing the value of the display property of the affordance in accordance with the value of the same display property of the content includes:
in accordance with a determination that the value of the display property of the content has decreased, increasing the value of the display property of the affordance in accordance with a magnitude of a change in the value of the display property of the content; and
in accordance with a determination that the value of the display property of the content has increased, decreasing the value of the display property of the affordance in accordance with a magnitude of the change in the value of the display property of the content.

31. The electronic device of claim 23, wherein a given magnitude of change in the value of the display property of the content causes the same amount of change in the value of the display property of the affordance when the value of the display property of the affordance is varied within the second range of values and when the value of the display property of the affordance is varied within the third range of values.

32. The electronic device of claim 23, wherein:
shifting the affordance-appearance range of values from the second range of values to the third range of values includes gradually shifting from the second range of values to the third range of values over a period of time; and
the one or more programs include instructions for, while gradually shifting the affordance-appearance range of values from the second range of values to the third range of values:
detecting an additional change in appearance of the content over which the affordance is displayed; and
in response to detecting the additional change in appearance of the content over which the affordance is displayed, changing the appearance of the affordance in accordance with the affordance-appearance range of values, including:
in accordance with a determination that the change in appearance of the content meets the range-switching criteria, starting to gradually shift the affordance-appearance range of values back to the second range of values; and
in accordance with a determination that the change in appearance of the content does not meet the range-switching criteria, continuing to gradually shift the affordance-appearance range of values from the second range of values to the third range of values.

33. The electronic device of claim 24, wherein the one or more programs include instructions for:
after changing the value of the display property of the affordance within the third range of values in accordance with a determination that the change in appearance of the content has met the range-switching criteria, detecting an additional change in appearance of the content over which the affordance is displayed; and in response to detecting the additional change in appearance of the content over which the affordance is displayed, changing the appearance of the affordance, including:
- in accordance with a determination that the additional change in appearance of the content has met the range-switching-trigger criteria for a first time and has not met the range-switching-completion criteria, changing the value of the display property of the affordance in accordance with the value of the same display property of the content over which the affordance is displayed, wherein the display property of the affordance is constrained to vary within a first intermediate range of values between the second range of values and the third range of values;
- in accordance with a determination that the additional change in appearance of the content has met the range-switching-trigger criteria for a second time after the first time without having met the range-switching-completion criteria, changing the value of the display property of the affordance in accordance with the value of the same display property of the content over which the affordance is displayed, wherein the display property of the affordance is constrained to vary within a second intermediate range of values between the third range of values and the first range of intermediate values; and
- in accordance with a determination that the additional change in appearance of the content has met the range-switching-trigger criteria only once before meeting the range-switching-completion criteria, changing the value of the display property of the affordance in accordance with the value of the same display property of the content over which the affordance is displayed, wherein the display property of the affordance is constrained to vary within the second range of values.

* * * * *

UNITED STATES PATENT AND TRADEMARK OFFICE
CERTIFICATE OF CORRECTION

PATENT NO. : 11,119,642 B2
APPLICATION NO. : 16/877298
DATED : September 14, 2021
INVENTOR(S) : Wan et al.

It is certified that error appears in the above-identified patent and that said Letters Patent is hereby corrected as shown below:

On the Title Page

Item (57) ABSTRACT, Lines 1-2, please delete "based a value" and insert --based on a value--;

In the Claims

Claim 1, Column 76, Line 21, please delete "based a value" and insert --based on a value--;

Claim 12, Column 79, Line 21, please delete "based a value" and insert --based on a value--;

Claim 23, Column 82, Line 39, please delete "based a value" and insert --based on a value--.

Signed and Sealed this
Seventh Day of December, 2021

Drew Hirshfeld
*Performing the Functions and Duties of the*
*Under Secretary of Commerce for Intellectual Property and*
*Director of the United States Patent and Trademark Office*